United States Patent
Takagi

(10) Patent No.: US 7,418,143 B2
(45) Date of Patent: Aug. 26, 2008

(54) ENCODING DEVICE AND METHOD, DECODING DEVICE AND METHOD, AND IMAGE INFORMATION PROCESSING SYSTEM AND METHOD

(75) Inventor: Satoshi Takagi, Tokyo (JP)

(73) Assignee: Sony Corporation, Tokyo (JP)

( * ) Notice: Subject to any disclaimer, the term of this patent is extended or adjusted under 35 U.S.C. 154(b) by 798 days.

(21) Appl. No.: 10/840,128

(22) Filed: May 6, 2004

(65) Prior Publication Data

US 2005/0001928 A1 Jan. 6, 2005

(30) Foreign Application Priority Data

May 8, 2003 (JP) .............................. 2003-130793

(51) Int. Cl.
*G06K 9/36* (2006.01)
(52) U.S. Cl. .................................................... 382/233
(58) Field of Classification Search ......... 382/232–236, 382/238–250; 358/426.01–426.08, 426.11–426.16; 348/384.1, 419.1–421.1; 375/240, 240.14–240.15, 375/240.24–240.26
See application file for complete search history.

(56) References Cited

U.S. PATENT DOCUMENTS 5,761,343 A * 6/1998 Haruma et al. .............. 382/236

FOREIGN PATENT DOCUMENTS

| JP | 06-334870 | 12/1994 |
| JP | 2000-278693 | 10/2000 |
| JP | 2002-159009 | 5/2002 |
| JP | 2002-165098 | 6/2002 |
| JP | 2002-204356 | 7/2002 |
| JP | 2002-359850 | 12/2002 |
| JP | 2003-008445 | 1/2003 |
| JP | 2003-008906 | 1/2003 |

OTHER PUBLICATIONS

Japanese Office Action mailed by Japanese Patent Office for counterpart Japanese Application No. 2003-130793.

* cited by examiner

Primary Examiner—Jose L Couso
(74) Attorney, Agent, or Firm—Finnegan, Henderson, Farabow, Garrett & Dunner, L.L.P.

(57) ABSTRACT

An encoding device and method, a decoding device and method, and an image information processing system and method, which can speed up encoding processing and/or decoding processing, are proposed. There is provided a first storing unit which, when an encoding unit or a decoding unit applies encoding processing or decoding processing to image information, stores state quantity information representing a predetermined state quantity which is used while being sequentially updated according to a processing state of the encoding processing or the decoding processing. The encoding unit or the decoding unit reads out only a necessary part of the state quantity information from the first storing unit and changes the state quantity information according to the processing state of the encoding processing or the decoding processing with respect to the image information, and then writes back the state quantity information to the first storing unit. In addition, plural kinds of encoding processing with respect to the image information are performed in parallel with a predetermined first phase difference according to processing contents of respective kinds of encoding processing.

23 Claims, 31 Drawing Sheets

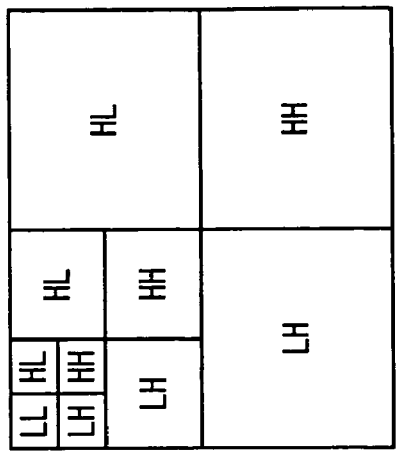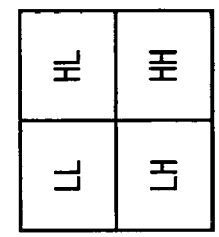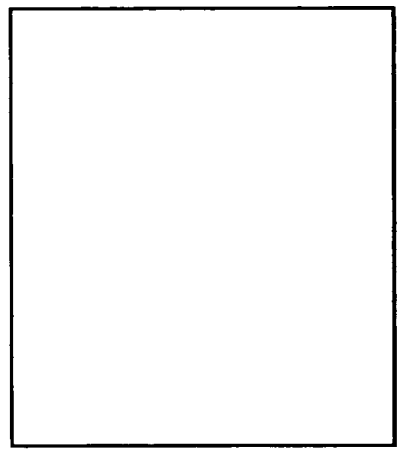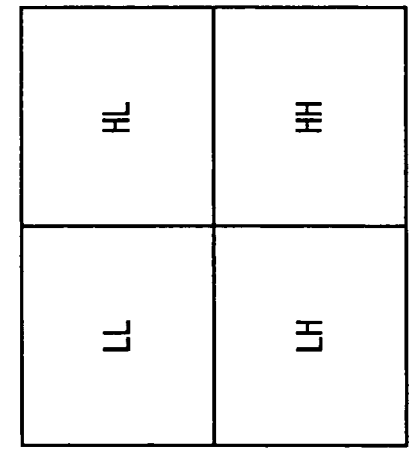
FIG. 2A
(RELATED ART)
FIG. 2B
(RELATED ART)

Xc AND Yc ARE POWERS OF 2
· 4≦Xc≦1024、 4≦Yc≦1024
· Xc×Yc≦4096

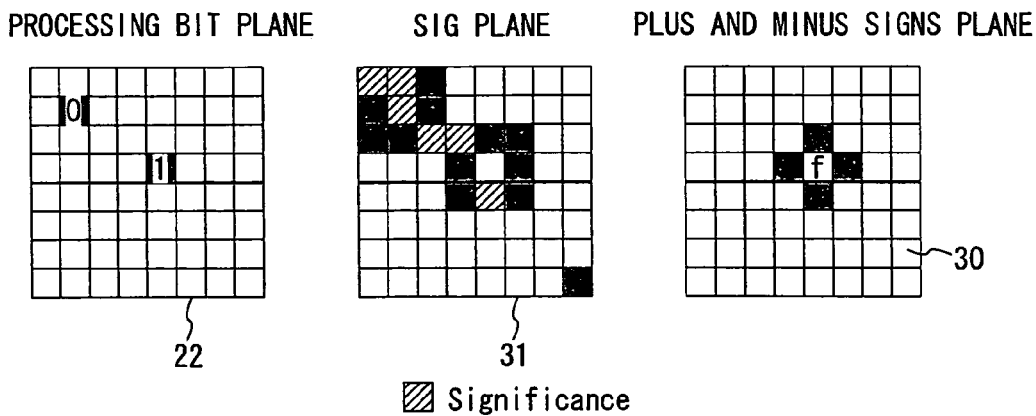

PROCESSING BIT PLANE    SIG PLANE    PLUS AND MINUS SIGNS PLANE

FIG. 15A    FIG. 15B    FIG. 15C

| CONDITIONS | Context | Symbol |
|---|---|---|
| DATA, WHICH IS INSIGNIFICANT ITSELF AND IN THE VICINITY OF WHICH SIGNIFICANT EXISTS, IS 0 | Cx | 0 |
| DATA, WHICH IS INSIGNIFICANT ITSELF AND IN THE VICINITY OF WHICH SIGNIFICANT EXISTS, IS 1 | Cx | 1 |
| CHANGE TO SIGNIFICANT WITH DATA OF 1, AND SUBSEQUENTLY SIGN IS CHANGED TO BIT MODEL | Sign cx | f |

FIG. 15D

| LL OR LH COMPONENT | | | HL COMPONENT | | | HH COMPONENT | | CX | BIT |
|---|---|---|---|---|---|---|---|---|---|
| ΣH | ΣV | ΣD | ΣH | ΣV | ΣD | ΣH+ΣV | ΣD | | |
| 2 | - | - | - | 2 | - | - | >=3 | 8 | |
| 1 | >=1 | 1 | >=1 | 1 | - | >=1 | 2 | 7 | |
| 1 | 0 | >=1 | 0 | 1 | >=1 | 0 | 2 | 6 | |
| 1 | 0 | 0 | 0 | 1 | 0 | >=2 | 1 | 5 | |
| 0 | 2 | - | 2 | 0 | - | 1 | 1 | 4 | X |
| 0 | 1 | - | 1 | 0 | - | 0 | 1 | 3 | |
| 0 | 0 | >=2 | 0 | 0 | >=2 | >=2 | 0 | 2 | |
| 0 | 0 | 1 | 0 | 0 | 1 | 1 | 0 | 1 | |
| 0 | 0 | 0 | 0 | 0 | 0 | 0 | 0 | 0 | |

FIG. 16

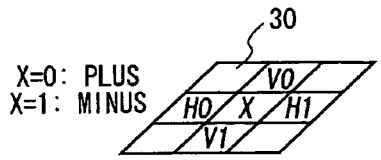

FIG. 17A

| | | VALUE |
|---|---|---|
| {V0,V1}<br>{H0,H1} | {SIGNIFICANT OF PLUS, SIGNIFICANT OF PLUS}<br>{SIGNIFICANT OF PLUS, INSIGNIFICANT} | 1 |
| | {SIGNIFICANT OF PLUS, SIGNIFICANT OF MINUS}<br>{INSIGNIFICANT, INSIGNIFICANT} | 0 |
| | {SIGNIFICANT OF MINUS, SIGNIFICANT OF MINUS}<br>{SIGNIFICANT OF MINUS, INSIGNIFICANT} | -1 |

FIG. 17B

BIT=X xor XR

| H値 | V値 | CX | XR |
|---|---|---|---|
| 1 | 1 | 13 | 0 |
| 1 | 0 | 12 | |
| 1 | -1 | 11 | |
| 0 | 1 | 10 | |
| 0 | 0 | 9 | |
| 0 | -1 | 10 | 1 |
| -1 | 1 | 11 | |
| -1 | 0 | 12 | |
| -1 | -1 | 13 | |

FIG. 17C

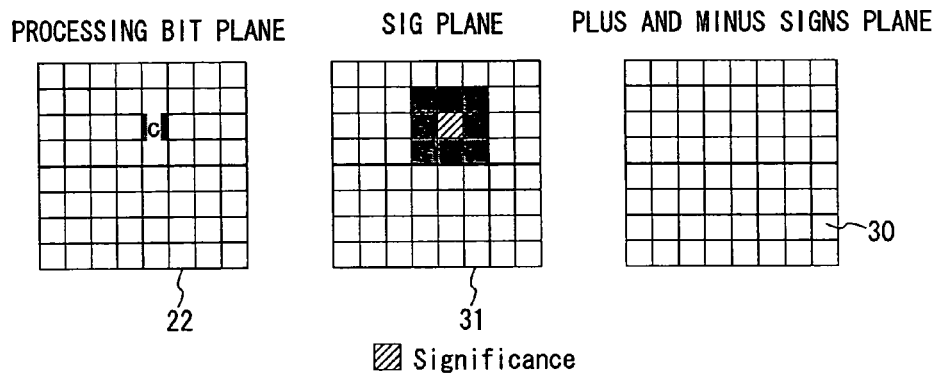

FIG. 18A  FIG. 18B  FIG. 18C

| CONDITION | Cx | bit |
|---|---|---|
| CHANGE OF SIGNIFICANT DATA TO BIT MODEL<br>CHANGE TO MR PASS FOR THE FIRST TIME<br>WHEN CHANGED TO SIGNIFICANT | Cx | c |

| ΣH+ΣV+ΣD | PERTINENT COEFFICIENT IS ENCODED WITH THIS PASS FIRST | Cx | BIT |
|---|---|---|---|
| Don't care | No | 16 | |
| >=1 | Yes | 15 | X |
| ==0 | Yes | 14 | |

FIG. 19B

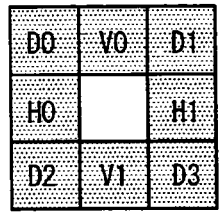

ΣD IS THE NUMBER OF SIGNIFICANT ONES IN D0-3

PROCESSING BIT PLANE

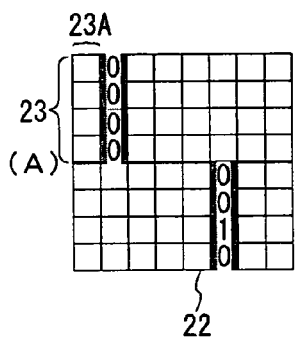

(A)

SIG PLANE

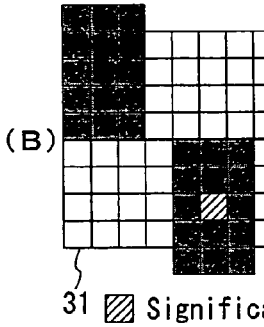

(B)

31 ▨ Significance

PLUS AND MINUS SIGNS PLANE

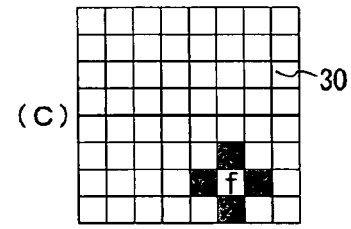

| CONDITIONS | Cx | bit |
|---|---|---|
| ALL DATA OF STRIPE ARE 0, AND ALL CORRESPONDING VICINITIES ARE NOT SIGNIFICANT | run | c |
| AT LEAST ONE OF DATA OF STRIPE IS 1, THERE IS NO SIGNIFICANT IN THE VICINITY CHANGE TO SIGNIFICANT WITH DATA OF 1 SAME PROCESSING AS SP PASS IS PERFORMED AFTER THAT | run | c |
| | uniform | c |
| | uniform | c |
| | Sign CX | f |
| | CX | 0 |

FIG. 20D

PROCESSING BIT PLANE

SIG PLANE

REF PLANE

PLUS AND MINUS SIGNS PLANE

DONE PLANE

ENCODING DEVICE AND METHOD, DECODING DEVICE AND METHOD, AND IMAGE INFORMATION PROCESSING SYSTEM AND METHOD

BACKGROUND OF THE INVENTION

1. Field of the Invention

The present invention relates to an encoding device and method, a decoding device and method, and an image information processing system and method. The present invention is preferably applied to an encoding device and a decoding device which abide by, for example, the Joint Photographic Experts Group (JPEG) 2000 standard as well as an image information processing system which is constituted by the encoding device and the decoding device.

2. Description of the Related Art

In recent years, a compression method called a JPEG 2000 standard has been standardized as a new data compression system.

FIG. 1 shows a structure of an encoding device 1 abiding by such a JPEG 2000 standard. Image data D1 to be supplied is subjected to predetermined input image processing such as DC level shift processing and color conversion processing in an input image processing unit 2. Then, obtained signal processing image data D2 is sent to a Discrete Wavelet Transform (DWT) unit 3.

The DWT unit 3 applies wavelet conversion processing to the signal processing image data D2 to be supplied. More specifically, as shown in FIGS. 2A and 2B, the DWT unit 3 passes the signal processing image data D2 through a filter divided into a low frequency pass filter and a high frequency pass filter to thereby subject an image, which is based upon the signal processing image data D2, to band (sub-band) division to divide the image into a horizontal direction and a vertical direction, for example, as shown in FIGS. 2A and 2B.

Note that FIGS. 2A and 2B show the number of divisions of three levels. In the figure, reference sign 'LL' denotes a component on a low frequency side both in the horizontal direction and the vertical direction in the signal processing image data D2; 'LH', a component of a low frequency side in the horizontal direction and of a high frequency side in the vertical direction in the signal processing image data D2; 'HL', a component of a high frequency side in the horizontal direction and of a low frequency side in the vertical direction in the signal processing image data D2; 'HH', a component of a high frequency side both in the horizontal direction and the vertical direction in the signal processing image data D2.

Further, the DWT unit 3 sends a wavelet coefficient obtained by such wavelet conversion processing to a quantization unit 4 as DWT data D3.

The quantization unit 4 sequentially quantizes the DWT data D3 to be supplied, divides an obtained quantization-coefficient into code blocks of a predetermined size, and sends the DWT data D3 to a bit model unit 6 of an Embedded Block Coding with Optimized Truncation (EBCOT) block 5 as code block data D4 by a unit of code block.

The bit model unit 6 changes the code block data D4 to be supplied to a coefficient bit model according to (Coefficient Bit Modeling (CBM) processing while scanning the data for each bit plane. Then, the bit model unit 6 sends respective data D5 and D6 of a symbol and a context obtained in this way to an arithmetic coder unit 7.

The arithmetic coder 7 executes predetermined arithmetic encoding operation processing with the symbol data D5 and the context data D6 to be supplied as inputs to thereby generate an encoding column. The arithmetic coder 7 sends this encoding column as encoded data D7 to a packetize stream generation unit 8.

A packetize stream generation unit 8 packetizes the encoded data D7 to a packet format according to the JPEG 2000 standard.

Consequently, encoded packet data D8 complying with a syntax of the JPEG 2000 standard can be obtained.

On the other hand, FIG. 3 shows a structure of a decoding device 10 abide by the JPEG 2000 standard.

In this decoding device 10, encoded data D11, which is an image information part, is extracted from the coded packet data D10 complying with the syntax of the JPEG 2000 standard generated as described above, and the encoded data D11 is sent to an arithmetic decoding unit 13 of the EBCOT block 12.

The arithmetic decoding unit 13 executes predetermined arithmetic decoding operation processing with encoding data D11 and context data D12, which is given from a bit demodel unit 14 in a later stage, as inputs and sends symbol data D13 obtained in this way to the bit demodel unit 14.

The bit demodel unit 14 changes the symbol data D13 to be supplied to a coefficient bit model according to CBM processing and sends decoded code lock data D14 obtained in this way to an inverse quantization unit 15. In addition, the bit demodel unit 14 sends a contax, which is obtained at this point, to the arithmetic decoding unit 13 as contax data D12.

The inverse quantization unit 15 applies inverse quantization processing to the decoded quantization data D14 to be supplied to obtain a wavelet coefficient and sends this wavelet coefficient to an IDWT unit 16 as decoded DWT data D16.

The IDWT unit 16 applies wavelet inverse converted image data D16 obtained in this way to an input image processing unit 17.

Then, the input image processing unit 17 applies predetermined signal processing to this wavelet inverse converted image data D16. Consequently, image data D17 obtained by decoding the image data D1 (FIG. 1) encoded by the encoding device 1 (FIG. 1) can be obtained.

Note that, as a prior art document concerning an encoding device and a decoding device abiding by the JPEG 2000 standard, there is Japanese Patent Laid-Open No. 2002-159009.

However, there is a problem in that encoding processing and decoding processing according to such a JPEG 2000 standard are complicated in contents of the processing, and speedup of the processing is hardly realized.

SUMMARY OF THE INVENTION

In view of foregoing, an object of this invention is to provide an encoding device and method, a decoding device and method, and an image information processing system and method which can speed up encoding processing and/or decoding processing.

In order to solve such a problem, in the present invention, an encoding device includes first storing means which, when encoding means applies encoding processing to image information, stores state quantity information representing a predetermined state quantity which is used while being sequentially updated according to a processing state of the encoding processing. The encoding means reads out only a necessary part of the state quantity information, which is stored in the first storing means, from the first storing means and changes the state quantity information according to the processing state of the encoding processing with respect to the image information, and then writes back the state quantity information to the first storing means.

As a result, in this encoding device, accessibility to the state quantity information at the time when the image information is subjected to the encoding processing can be improved.

In the present invention, an encoding method includes: a first step of, when predetermined encoding processing is applied to image information, storing state quantity information representing a predetermined state quantity, which is used while being sequentially updated according to a processing state of the encoding processing, in first storing means; and a second step of applying encoding processing to the image information. In the second step, only a necessary part of the state quantity information, which is stored in the first storing means, is read out from the first storing means, and the state quantity information is changed according to the processing state of the encoding processing with respect to the image information, and then the state quantity information is written back to the first storing means.

As a result, according to this encoding method, accessibility to the state quantity information at the time when the image information is subjected to the encoding processing can be improved.

In the present invention, a decoding device includes first storing means which, when decoding means applies decoding processing to encoded image information, stores state quantity information representing a predetermined state quantity which is used while being sequentially updated according to a processing state of the decoding processing. The decoding means reads out only a necessary part of the state quantity information, which is stored in the first storing means, from the first storing means and changes the state quantity information according to the processing state of the decoding processing with respect to the encoded image information, and then writes back the state quantity information to the first storing means.

As a result, in this decoding device, accessibility to the state quantity information at the time when the image information is subjected to the decoding processing can be improved.

In the present invention, a decoding method includes: a first step of, when decoding processing is applied to encoded image information, storing state quantity information representing a predetermined state quantity, which is used while being sequentially updated according to a processing state of the decoding processing; and a second step of applying predetermined decoding processing to the encoded image information. In the second step, only a necessary part of the state quantity information, which is stored in the first storing means, is read out from the first storing means, and the state quantity information is changed according to the processing state of the decoding processing with respect to the encoded image information, and then the state quantity information is written back to the first storing means.

As a result, according to this decoding method, accessibility to the state quantity information at the time when the image information is subjected to the decoding processing can be improved.

In the present invention, an encoding device, which applies plural kinds of predetermined encoding processing in order to image information to be inputted, includes plural encoding processing means which are provided in association with the respective kinds of encoding processing. The plural kinds of encoding processing with respect to the image information are performed in parallel with the preceding encoding processing by the respective corresponding encoding processing means with a predetermined first phase difference according to contents of the encoding processing.

As a result, in this encoding device, the encoding processing with respect to the image information can be performed at remarkably higher speed compared with the case in which the respective kinds of encoding processing are performed independently in order.

In the present invention, the encoding method includes an encoding step of performing the plural kinds of encoding processing with respect to the image information in parallel with the respective preceding encoding processing with a predetermined first phase difference according to contents of the encoding processing.

As a result, according to this encoding method, the encoding processing with respect to the image information can be performed at remarkably higher speed compared with the case in which the respective kinds of encoding processing are performed independently in order.

In the present invention, in an image information processing system, an encoding device includes: encoding means which applies predetermined encoding processing to image information; and first storing means which, when the encoding means applies encoding processing to image information, stores state quantity information representing a predetermined state quantity which is used while being sequentially updated according to a processing state of the encoding processing. The encoding means reads out only a necessary part of the state quantity information, which is stored in the first storing means, from the first storing means and changes the state quantity information according to the processing state of the encoding processing with respect to the image information, and then writes back the state quantity information to the first storing means. A decoding device includes: decoding means which applies predetermined decoding processing to encoded image information; and first storing means which, when the decoding means applies decoding processing to encoded image information, stores state quantity information representing a predetermined state quantity which is used while being sequentially updated according to a processing state of the decoding processing. The decoding means reads out only a necessary part of the state quantity information, which is stored in the first storing means, from the first storing means and changes the state quantity information according to the processing state of the decoding processing with respect to the encoded image information, and then writes back the state quantity information to the first storing means.

As a result, in this image information processing system, accessibility to the state quantity information at the time when the image information is subjected to the encoding processing or the decoding processing can be improved.

In the present invention, in an image information processing method, an encoding step includes: a first step of, when predetermined encoding processing is applied to image information, storing state quantity information representing a predetermined state quantity, which is used while being sequentially updated according to a processing state of the encoding processing, in first storing means; and a second step of applying encoding processing to the image information. In the second step, only a necessary part of the state quantity information, which is stored in the first storing means, is read out from the first storing means, and the state quantity information is changed according to the processing state of the encoding processing with respect to the image information, and then the state quantity information is written back to the first storing means. A decoding step includes: a first step of, when decoding processing is applied to encoded image information, storing state quantity information representing a predetermined state quantity, which is used while being sequentially updated according to a processing state of the decoding processing; and a second step of applying predetermined decoding processing to the encoded image information. In the second step, only a necessary part of the state quantity information, which is stored in the first storing means, is read out from the first storing means, and the state quantity information is changed according to the processing state of the decoding processing with respect to the encoded image information, and then the state quantity information is written back to the first storing means.

As a result, according to this image information processing method, accessibility to the state quantity information at the time when the image information is subjected to the encoding processing or the decoding processing can be improved.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 2A and 2B are conceptual diagrams served for explanation of wavelet conversion;

FIGS. 15A to 15D are conceptual diagrams served for explanation of an SP pass;

FIG. 16 is a conceptual diagram served for explanation of a context encoding rule in an SP pass;

FIGS. 17A to 17C are conceptual diagrams served for explanation of a context encoding rule of plus and minus signs in an SP pass;

FIGS. 18A to 18D are conceptual diagrams served for explanation of an MR pass;

FIGS. 19A and 19B are conceptual diagrams served for explanation of a context encoding rule in an MR pass;

FIGS. 20A to 20D are conceptual diagrams served for explanation a CU pass;

FIGS. 21A to 21D are conceptual diagrams served for explanation of a context encoding rule of uniform;

DETAILED DESCRIPTION OF THE PREFERRED EMBODIMENTS

An embodiment of the present invention will be hereinafter described in detail with reference to the accompanying drawings.

(1) Contents of CBM Processing

The present invention relates to CBM processing which is performed in a bit model unit 6 (FIG. 1) of an encoding device 1 abiding by the JPEG 2000 standard and a bit demodel unit 13 (FIG. 3) of a decoding device 10. Thus, first, specific processing contents of the CBM processing will be described in detail.

(1-1) One Code Block and a Code Block Size

Figure 4:
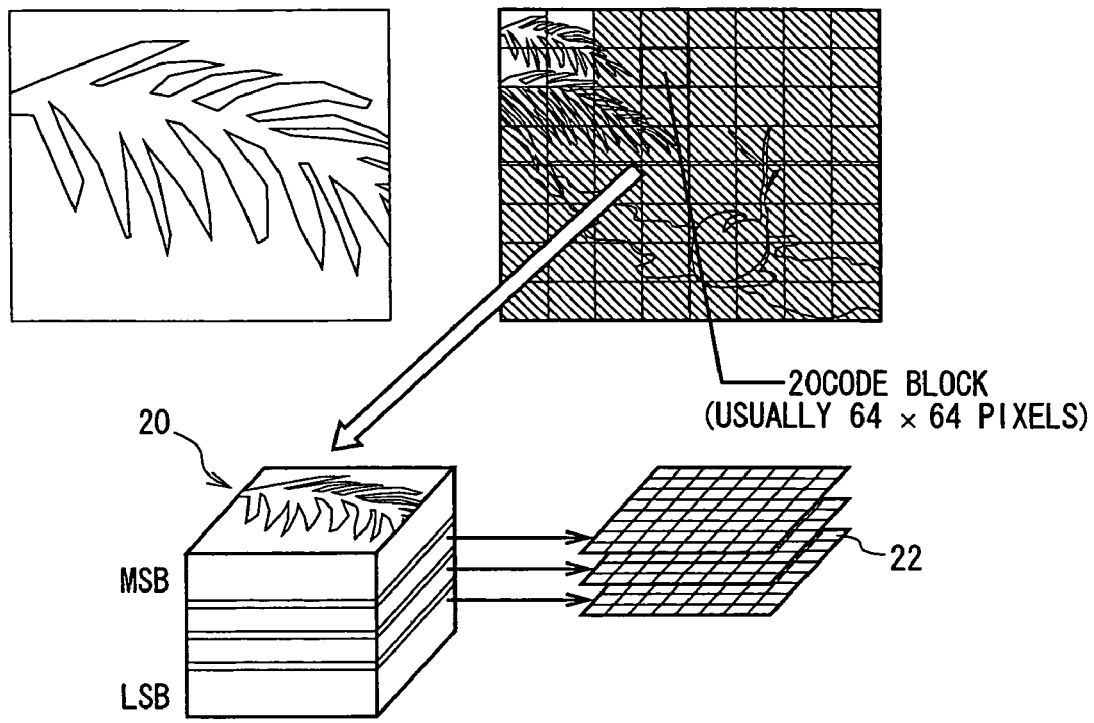
FIG. 4 is a conceptual diagram served for explanation of a code block and a bit plate.

As described above with reference to FIG. 1, a quantization unit 4 of the encoding device 1 abiding by, for example, the JPEG 2000 standard cuts out a quantized wavelet coefficient by a unit called code block and gives the quantized wavelet coefficient to the bit model unit 6. Then, as shown in FIG. 4, the bit model unit 6 performs the CBM processing with this code block 20 as a unit to generate a symbol and a context.

Figure 5:
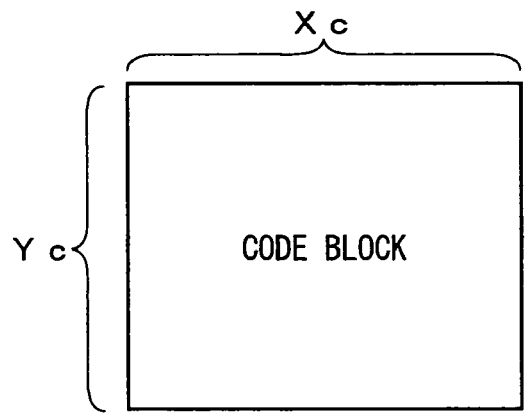
FIG. 5 is a conceptual diagram served for explanation of a code block size.

Here, as shown in FIG. 5, a size of the code block 20 is roughly decided. Therefore, the size of the code block 20 is selected in accordance with this rule at the time of encoding.

Figure 6:
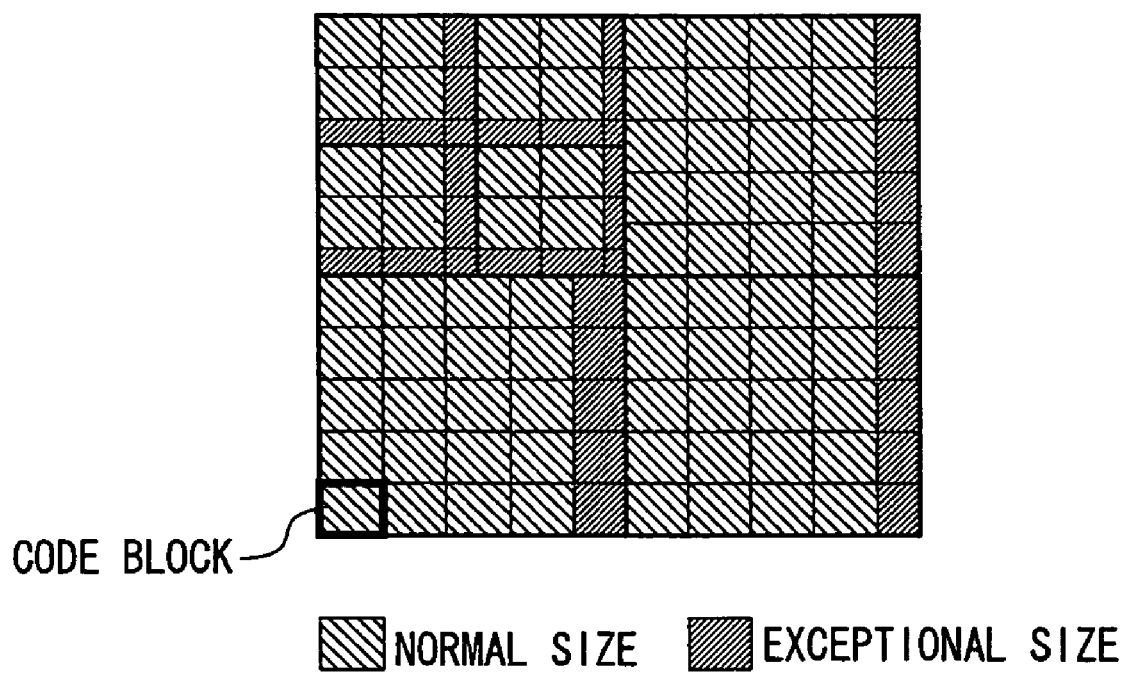
FIG. 6 is a conceptual diagram served for explanation of a code block size.

In this case, since the code block 20 is basically positioned starting from an upper left boundary of a sub-band, as shown in FIG. 6, a mismatch occurs depending upon a relation between an image size and a code lock size. The size determined at the time of encoding is called a normal size, and a size with a mismatch is called an exceptional size.

Since the exceptional size is always smaller than the normal size and is basically different from the normal size only in that a quantity of stored data is different. Thus, the exceptional size is discussed only here. In the following description, the code block 20 of the normal size will be illustrated.

(1-2) Bit Plane

As described above, in the CBM processing, processing (modeling, symbol/context output) is performed with the code block 20 as a unit. This processing is performed in order by dividing data of the code block 20 into bit planes. The bit plane is a plane on which data representing 'bit (0/1)' are collected as indicated by the name.

Figure 7:
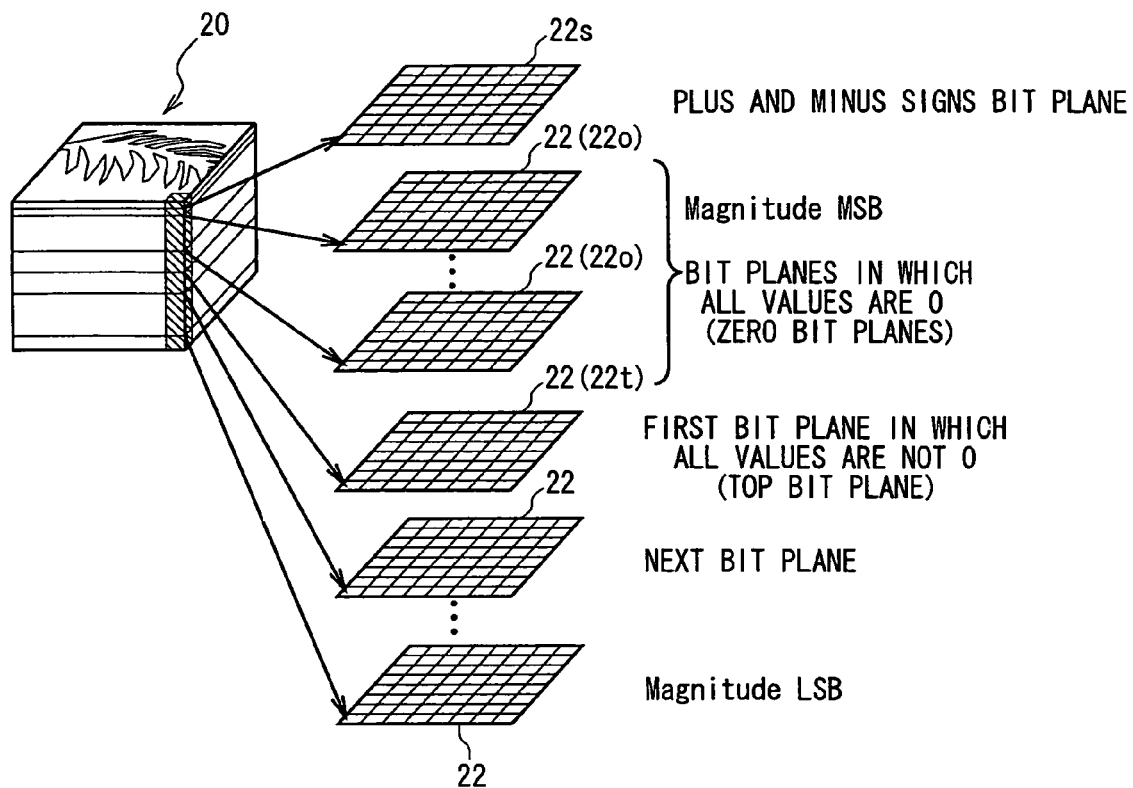
FIG. 7 is a conceptual diagram served for explanation of a bit plane in a code block.

A shown in FIG. 7, data divided into the code block 20 is represented by 'Sign-Magnitude representation', that is, a numerical value representation by plus and minus signs and an absolute value. Plus and minus signs of respective pixels are stored in a top bit plane 22, which is called a plus and minus signs bit plane $22_S$. Absolute value data of the respective pixels is stored in order for the respective bits in bit planes 22 lower than the plus and minus signs bit plane $22_S$.

Here, when it is assumed that data of each pixel is represented by 16 bits, the code block data 20 is divided into sixteen bit planes 22 from a plane constituted by collecting most significant bits (bits 15) of respective pixels to a plane constituted by collecting least significant bits (bits 0).

When viewed from the upper bit plane 22 in order, the bit plate 22 constituted by collecting the most significant bits is the plus and minus signs bit plane $22_S$, in which plus and minus signs of the respective pixels are stored.

Absolute values of data of the respective pixels are divided for each bit and stored in the respective total fifteen bit plane 22 from the bit plane 22 constituted by collecting bits following the most significant bits of the respective pixels to the bit plane 22 constituted by collecting the least significant bits. In this case, statistically, all bit values are often 0 in several upper bit planes 22. Such a bit plane is called a zero bit plane $22_O$.

When such fifteen bit planes 22 are viewed in order from the top one, the bit plane 22, which is not the zero bit plane $22_O$, is found for the first time. The bit plane 22 is called a top bit plane $22_T$. Here, it is assumed that the top bit plane $22_T$ is the bit plane 22 constituted by collecting tenth bits (bits 9) counted from the least significant bits (bits 0) of the respective pixels. The bit planes 22 lower than the top bit plane $22_T$ (the respective bit planes 22 constituted by collecting ninth and subsequent bits of the respective pixels) are not specifically classified here whether data exists or not.

In summary, in this embodiment, the bit plane 22, which is constituted by collecting most significant bits (bits 15) of each pixels, is the plus and minus signs bit plane $22_S$, the bit planes 22 from the bit plane 22 constituted by collecting the bits (bits 14) following the most significant bits of the respective pixels to the bit plane constituted by collecting the eleventh bits (bits 10) are bit planes $22_O$, (10 planes), the bit plane 22 constituted by collecting the tenth bits (bits 9) is the top bit plane $22_T$, and the bit planes 22 from the bit plane 22 constituted by collecting the ninth bits (bits 8) to the bit plane 22 constituted by collecting the least significant bits are the remaining bit planes 22 (9 planes) which should be processed.

Figure 3:
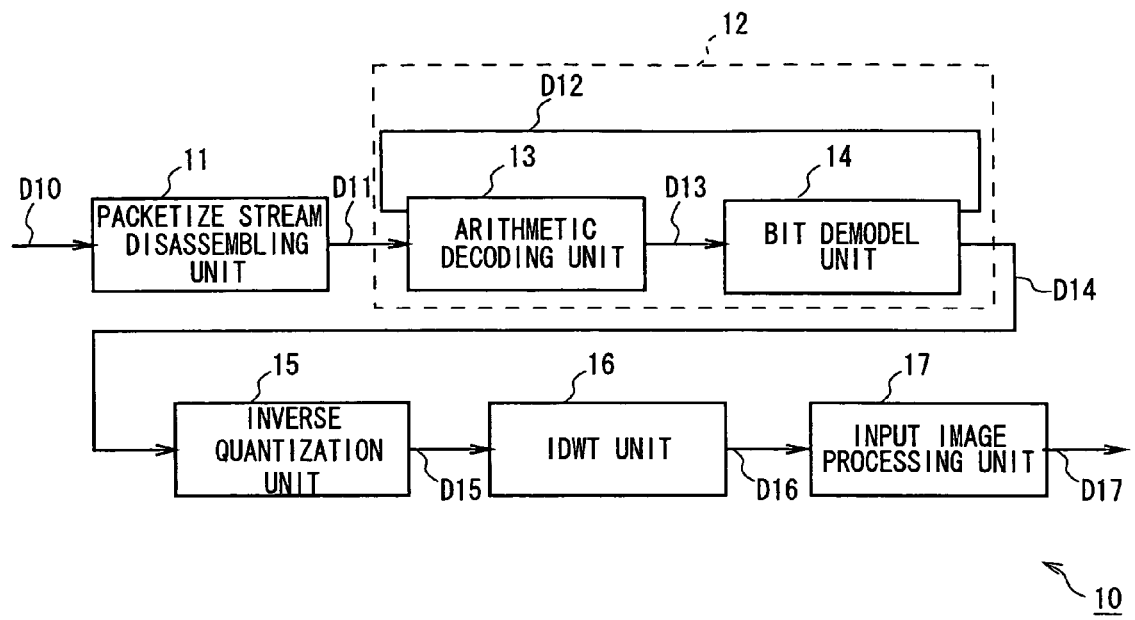
FIG. 3 is a block diagram showing a structure of a conventional JPEG 2000 decoding device.

The CBM processing is applied to the code block 20 with such a bit plane structure as described below in the bit model unit 6 (FIG. 1) and the bit demodel unit 13 (FIG. 3).

(1) Processing with respect to the sign bit plane $22_S$ is performed later.

(2) The CBM processing is not applied to the zero bit plane $22_O$.

(3) The CBM processing is applied to the top bit plane $22_T$ for the first time. This CBM processing is called "Clean-up Pass" (hereinafter referred to as CU pass).

(4) A "Significance Propagation Pass" (hereinafter referred to as SP pass), "Magnitude Refinement Pass" (hereinafter referred to as MR pass), and the CU pass are applied to the remaining bit planes 22, which should be processed, for each bit plane 22 in order from the upper bit planes 22.

Note that details of the SP pass, the MR pass, and the CU pass will be described later.

(1-3) Scanning Order in a Bit Plane

Figure 8:
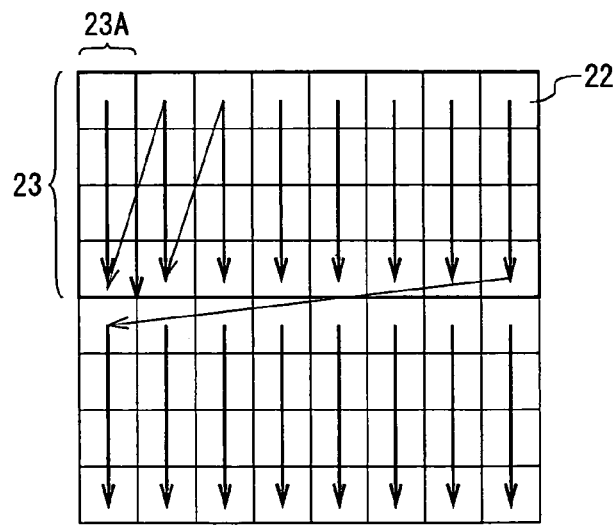
FIG. 8 is a conceptual diagram served for explanation of an order of scanning in a bit plane.

An access order with respect to the respective bit planes 22 in the code block 20 is as described above. FIG. 8 shows in which order data of the respective pixels are accessed in the bit plane 22. In FIG. 8, the bit plane 22 of 8 pixels×8 pixels will be illustrated.

The bit plane 22 is divided into stripes 23 which are respective rows in the case in which the bit plane 22 is divided in a horizontal direction for every vertical four pixels. A vertical one column in the stripes 23 is called a stripe column 23A. Processing is started from the stripe column 23A at the left end in the uppermost stripe 23 of the bit plane 22 and, when one stripe column 23A has been processed, the processing shifts to the adjacent stripe column 23A. This processing is repeated for the entire stripe 23. When the processing for one strip 23 has been completed, the processing shifts to the lower stripe 23, and this processing is repeated until all the pixels in the bit plane 22 are processed. This is a scanning order in the bit plane 22 (hereinafter referred to as scanning order in a bit plane).

Moreover, a relation between the scanning in the bit plane 22 and the three passes (SP pass, MR pass, and CU pass) will be hereinafter described.

As described above, only the CU pass is applied to the top bit plane 22T, and the three passes of the SP pass, MR pass, and the CU pass are applied to the bit planes 22 lower than the top bit plane 22T. A relation between the three passes and the scanning in the bit plane 22 is shown in FIGS. 9 to 12.

Figure 9:
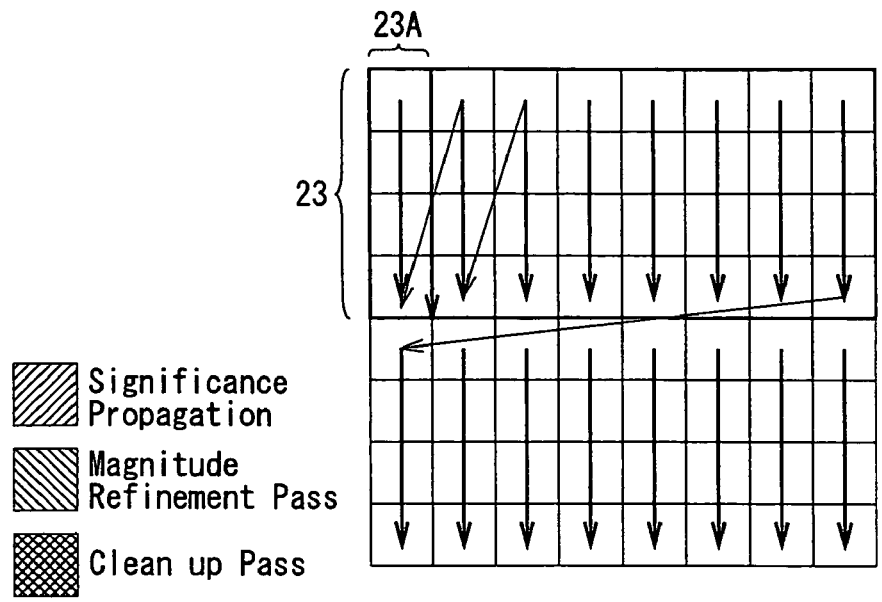
FIG. 9 is a conceptual diagram served for explanation of an order of scanning in a bit plane.
Figure 10:
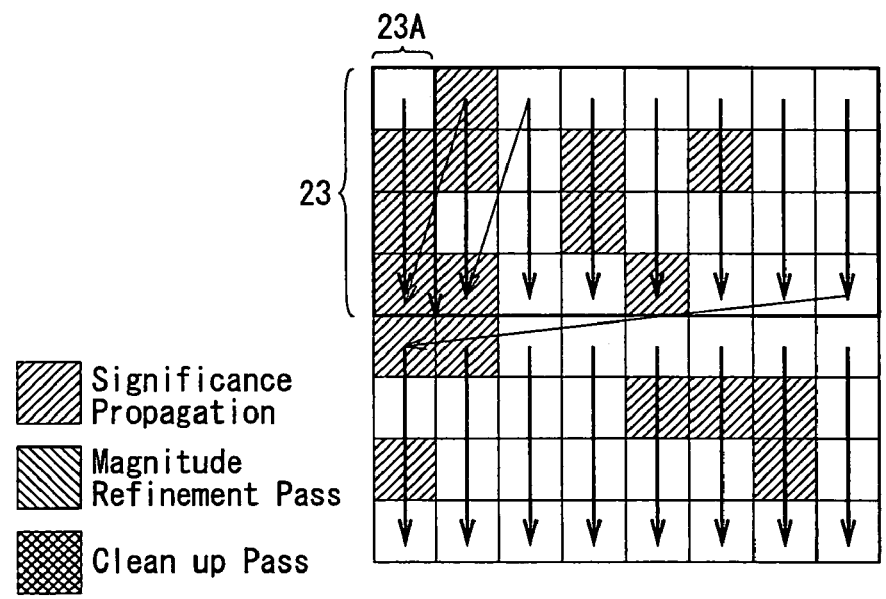
FIG. 10 is a conceptual diagram served for explanation of an order of scanning in a bit plane.

First, in the case in which it is attempted to subject the bit plane 22 to the CBM processing anew, FIG. 9 shows a state in which no data has been processed yet and the processing is about to start. FIG. 10 shows a state in which processing for the SP pass has been applied to necessary pixels, and this SP pass processing has ended. The SP pass is performed complying with the scanning order in a bit plane.

Figure 11:
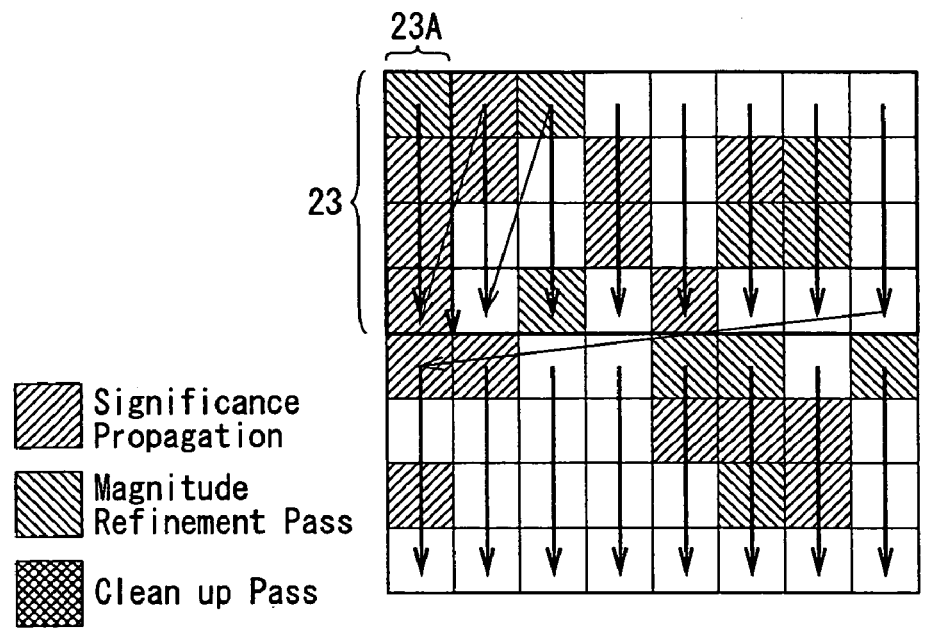
FIG. 11 is a conceptual diagram served for explanation of an order of scanning in a bit plane.

The next MR pass applies processing only to pertinent pixels avoiding the pixels processed by the SP pass. FIG. 11 shows a state in which this MR pass has ended. In this MR pass, the scanning order in a bit plane is also complied with.

Figure 12:
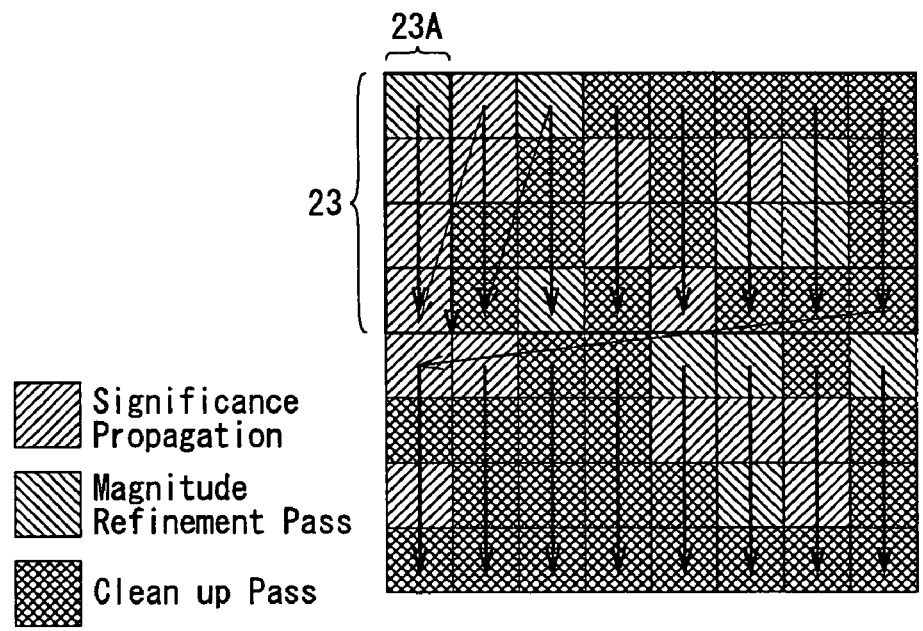
FIG. 12 is a conceptual diagram served for explanation of an order of scanning in a bit plane.

Moreover, processing is applied to unprocessed remaining pixels by the CU pass also complying with the scanning order in a bit plane. FIG. 12 shows a state in which this CU pass has been completed. As a result, since all the pixels have been processed, the change of this bit plane 22 to a bit model has been completed.

Note that the processing of the CU pass is applied to all the pixels concerning the 'top bit plane $22_T$'.

(1-4) "Significance"

Next, before explaining the respective coding pass (SP pas, MR pass, and CU pass), a state quantity called "significance" will be described. "Significance" represents that a pertinent pixel is 'significant/insignificant'.

'Significant' means "a state in which it has been found by the CBM processing up to a certain point that a coefficient of attention is not 0". In other words, 'significant' means "a pixel (bit) with a value of '1' has already been modeled (encoded)".

In addition, 'insignificant' means "a state in which a coefficient value is 0 or is likely to be 0'. In other words, 'insignificant' means that "a pixel (bit) with a value of '1' has not been modeled (encoded) yet (for the time being)'.

Moreover, 'pertinent pixel' means a pixel, to which attention is directed, on the bit plane 22.

Note that "significance" is stored and held while being updated for the entire code block 20 (FIG. 4). Therefore, concerning the code block 20 consisting of sixteen bit planes 22 of 8 pixels×8 pixels illustrated above, a "significance" state quantity for 64 pixels (8 pixels×8 pixels) are stored and held for the entire code block 20.

In the CBM processing, three coding passes (only the CU pass in the top bit plane $22_T$) are processed (modeling, symbol/context output) in accordance with the scanning order in a bit plane in the bit plane 22 in order from the top bit plane $22_T$ temporally. A state of a coefficient (more accurately, a coefficient obtained by quantizing a wavelet conversion coefficient) of a certain pixel is represented by this "significance".

Incidentally, in the code block 20 in which the CBM processing is not performed, values of all SIG planes start with "insignificant", and a pertinent one changes to "significant" in a course of processing the respective bit planes 22. A value once changed to "significant" never returns to "insignificant" in the course of the CBM processing.

(1-5) Three Coding Pass

Next, a Significance Propagation Pass (SL pass), a Magnitude Refinement Pass (MR pass), and a Clean-up Pass (CU pass) will be described.

Figure 13:
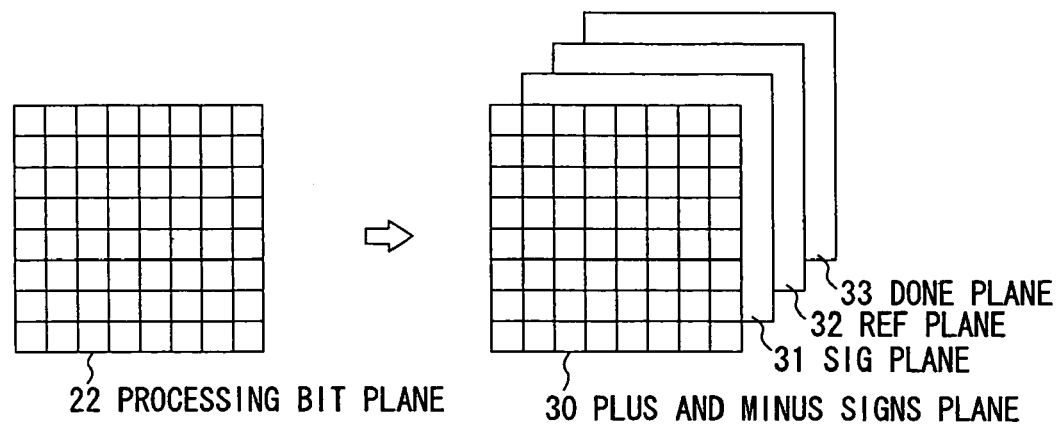
FIG. 13 is a conceptual diagram served for explanation of a plane for recording various state quantities.

In the case in which processing for bit modeling is performed in accordance with the three coding passes, it is a general practice to prepare, as shown in FIG. 13, other than the bit plane 22 which is about to be processed (hereinafter referred to as process bit plane 22), a plane storing and retaining data of the plus and minus signs bit plane $22_S$ (FIG. 7) (hereinafter referred to as plus and minus signs plane) 30, a plane recording "significance" (hereinafter referred to as SIG plane) 31, a plane indicating whether or not a pass is a first "refinement pass" (hereinafter referred to as REF plane) 32, and a plane representing whether or not a bit of attention has been processed in the process bit plane (hereinafter referred to as done plane) 33 as a recording RAM for a state quantity.

The plus and minus signs plane 30, the SIG plane 31, the REF plane 32, and the DONE plane 33 are planes having the same size as the process bit plane 22 (in the examples described above, the size is 8 pixels×8 pixels).

In this case, in the plus and minus signs plane 30, a value thereof is stored and held without changing while the code block 22 is processed. A value of the SIG plane 31 is likely to be changed by the SP pass or the CU pass. A value of the REF plane 32 is likely to be changed by the MR pass. The DONE plane 33 is reset in a state quantity of setting a flag indicating completion of processing in association with a pixel, for which processing of the respective coding passes is completed, at a stage in which processing with respect to the process bit plane 22 has been completed.

(1-5-1) Processing of the SP Pass

The SP pass is a coding pass which is carries out first in the process bit plane 22 excluding the top bit plane $22_T$ (FIG. 7). This SP pass proceeds with processing with reference to data on the SIG plane 31 in the same coordinate position as the pertinent pixel on the process bit plane 22.

Figures 14A, 14B, 14C:
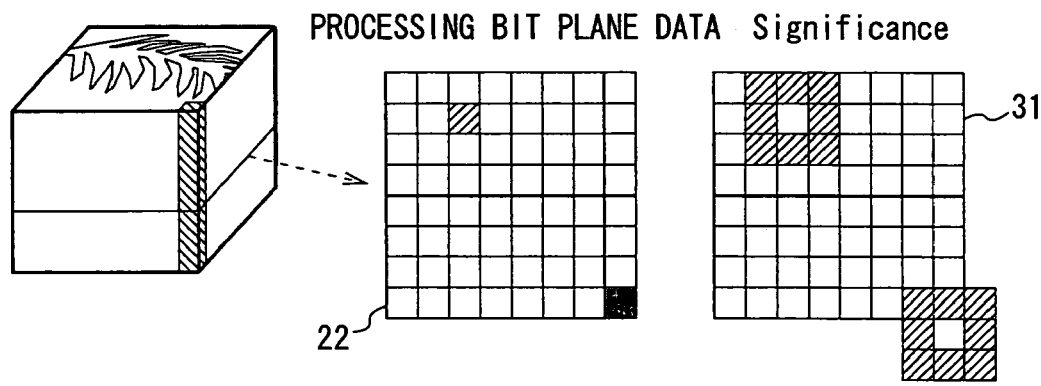
FIGS. 14A to 14C are conceptual diagrams served for explanation of an SP pass.

In other words, as shown in FIGS. 14A to 14C, for example, when coordinates of the pertinent pixel on the process bit plane 22 is (2, 1) (FIG. 14B), the SP pass refers to data of respective coordinate positions (1, 0), (2, 0), (3, 0), (1, 1), (2, 1), (3, 1), (1, 2), (2, 2), and (3, 2) which are obtained by combining a bit corresponding to this pertinent pixel on the SIG plane 31 (a bit of coordinates (2, 1) in FIG. 14C) and bits in eight vicinities thereof. Note that all bits located outside the process bit plane 22 among the bits in the eight vicinities to be referred to are set to "insignificant".

In performing the processing of the SP pass, it is checked for each pixel whether or not the processing can be performed on the process bit plane 22 with an upper left part of the process bit plane 22 as a starting point in accordance with the scanning order in a bit plane. More specifically, it is checked whether or not a condition that "'the pertinent pixel is not "significant" (insignificant)' and 'at least one pixel of "significant" exists in the eight vicinities of the pertinent pixel'" is satisfied.

Then, when this condition is satisfied, the processing of the SP pass is applied to the pertinent pixel. When this condition is not satisfied, the processing of the SP pass is not performed, and the next pixel is evaluated in accordance with the scanning order in a bit plane.

Next, a flow in the case in which the processing of the SP pass is started will be described.

In the case in which the processing of the SP pass is started, a value (0/1) of the pertinent pixel of the process bit plane 22 shown in FIG. 15A is outputted as a symbol. At the same time, the number of bits of "significant" among bits of eight vicinities surrounding a bit on the SIG plane 31 shown in FIG. 15B corresponding to the pertinent pixel on the process bit plane 22 is counted. A context is outputted in accordance with a rule shown in FIG. 16.

Note that, in FIG. 16, 'ΣH', 'ΣV', 'ΣD' and 'ΣH+ΣV' represent a total value of bits of "significant" among left and right two bits, upper and lower two bits, diagonal four bits, and upper, lower, left and right four bits in the eight vicinities of the bit on the SIG plane 31 corresponding to the pertinent pixel on the process bit plane 22, respectively.

In addition, 'CX' represents a context at the time of such a state. For example, the code block 20 (FIG. 4) including the process bit plane 22 is an LL component (FIGS. 2A and 2B) of an image, and a context in the case in which 'ΣH', 'ΣV' and 'ΣD' are 0, 0 and 1, respectively, at this time is 1, and a context in the case in which 'ΣH', 'ΣV' and 'ΣD' are 1, 0 and 0, respectively is 5.

In the case in which a value of the symbol is 0, the processing of the SP pass with respect to the pertinent pixel is completed here. A flag indicting that the bit modeling has been completed is set in a coordinate position on the DONE plane 33 (FIG. 13) which is the same as the coordinate position of this pertinent pixel.

On the other hand, in the case in which a value of the symbol is 1 (i.e., a value of a pertinent pixel is 1), this pertinent pixel is a pixel in which 1 has appeared for the first time.

The pertinent pixel, which has been "insignificant" so far, is changed to "significant" for the first time, and a flag is set in the same coordinate position on the SIG plane 31. At this point, a flag is also set in the same coordinate position on the REF plane 32 (FIG. 13). This is processing for the next MR pass.

Moreover, the SP pass outputs a context in accordance with a rule shown in FIGS. 17A to 17C with reference to bits in upper, lower, left and right four vicinities of a bit on the plus and minus signal plane 30 in the same coordinate position as the pertinent pixel (i.e., plus and minus signs corresponding to the pertinent pixel).

Simultaneously with this, an XOR signal is also outputted. XOR of this XOR signal and the pertinent context is outputted as a symbol of plus and minus sings, whereby the bit modeling of plus and minus signs corresponding to the pertinent pixel is completed, and at this stage, the processing of the SP pass for the pertinent pixel is also completed. AT this point, a flag indicating that the bit modeling has been completed is set in the same coordinate position as the pertinent pixel on the DONE plane 33 (FIG. 13).

Note that, as it is evident from the above description, depending upon a scanning order, a pixel changed to "significant" anew by the SP pass may affect at the time when eight vicinities on the SIG plane 31 of other (near) pixels.

(1-5-2) Processing of the MR Pass

The MR pass is a coding pass which is carried out following the SP pass with respect to the process bit plane 22 excluding the top bit plane $22_T$ (FIG. 7). FIGS. 18A to 18D schematically shows processing of the MR pass.

In performing this processing of the MR pass, it is checked for each pixel whether or not the processing can be performed with an upper left part of the process bit plane 22 as a starting point in accordance with the scanning order in a bit plane. More specifically, it is checked whether or not a condition that "'a pixel is the pertinent pixel on the unprocessed (a flag is not set in the same coordinate position as the pertinent pixel on the DONE plane 33) process bit plane 22' and 'the pertinent pixel is "significant"'" is satisfied.

Then, when this condition is satisfied, the processing of the MR pass is applied to the pertinent pixel. When this condition is not satisfied, the processing of the MR pass is not performed, and the next pixel on the process bit plane 22 is evaluated in accordance with the scanning order in a bit plane.

In the case in which the processing of the MR pass has started, the MR pass refers to bits in eight vicinities of a bit in the same coordinate position on the SIG plane 31 as the pertinent pixel, outputs a context in accordance with a rule shown in FIGS. 19A and 19B, and at the same time, outputs a value (0/1) of the pertinent pixel as a symbol ('X' in FIG. 19A).

In FIG. 19B, a state of whether or not 'the pertinent pixel is encoded by this pass (MR pass) first' is found by referring to a flag in the same coordinate position as the pertinent pixel of the REF plane 32 (FIG. 13). If this flag is set, it is seen that the pertinent pixel is a pixel on the process bit plane 22 immediately after the processing is performed in the SP pass. However, this flag is cleared after the reference such that it is referred to by mistake at the time of processing of the lower bit plane 22 after that.

(1-5-3) Processing of the CU Pass

The CU pass is an only coding pass which is carried out with respect to the top bit plane $22_T$, and is a coding pass which is carried out last with respect to the bit plane 22 of an object of processing excluding the top bit plane $22_T$.

In the CU pass, it is checked for each pixel whether or not the processing of the CU pass can be performed with an upper left part of the process bit plane 22 as a starting point in accordance with the scanning order in a bit plane. At this stage, "pixels on the unprocessed (a flag is not set in the same coordinate position as the pertinent pixel on the DONE plane 33) process bit plane 22", that is, all remaining pixels, which are not an object of the processing of the SP pass and the MR pass on the process bit plane 22, are objects of processing of the CU pass.

In the CU pass, as shown in FIGS. 20A to 20D, in addition to referring to values of eight vicinities of a bit on the SIG plane 31 which is in the same coordinate position as the pertinent pixel as in the SP pass and the MR pass, a slightly larger run-length encoding is performed.

First, the processing of the CU pass checks whether or not run-length processing can be performed with an upper left part of the process bit plane 22 as a starting point. More specifically, it is checked by a unit of stripe column 23A whether or not a condition that "'all four pixels in the stripe column 23A are pixels which should be processed in the CU pass' and 'all four pixels in the stripe column 23A are "insignificant"' and '"significance" does not exist in respective eight vicinities of four bits on the SIG plane 31 in the same coordinate positions as the four pixels in the strip column 23A, respectively'" is satisfied.

Then, when this condition is satisfied, the CU pass starts the run-length processing and outputs "run" as a context. After that, when 'all values of the four pixels in the stripe column 23A are 0', the CU pass outputs 0 as a symbol. On the other hand, when 'all values of the four pixels of the stripe column 23A are not 0', that is, at least one 1 exists in the four pixels, the CU pass outputs 1 as a symbol (after outputting "run"), and subsequently outputs a symbol corresponding to a context "uniform" twice.

In this case, the symbol corresponding to the "uniform" context performs encoding according to a rule as shown in FIGS. 21A to 21D. When this is described with reference to FIGS. 21A to 21D, the four pixels in the stripe column 23A are 0, 0, 1 and 0 in order from the top, and a column '1, 0' representing the position where 1 appears for the first time becomes a symbol in this order. Since 1 has appeared for the first time in an "insignificant" pixel, the coordinate changes to "significant". As shown in FIG. 20B, a flag is set in the same coordinate position on the SIG plane 31 as the pixel with a value 1. It is needless to mention that, at the same time, a flat is also set in the same coordinate position of the REF plane 32 (FIG. 13).

Subsequently, plus and minus signs of the pertinent pixel are modeled. A way of modeling is the same as the modeling of plus and minus signs in the SP pass which is described above with reference to FIGS. 17A to 17C. Moreover, in this example, the fourth pixel in the stripe column 23A remains without being modeled. This pixel is modeled in the same manner as in the SP pass.

(1-6) Dependency Relation Among Three Coding Passes

In the CBM processing, three coding passes are processed. A pixel on the process bit plane 22, which has been modeled once in a certain coding pass, is never reevaluated in other coding passes in the process bit plane 22. This is because a processed pixel and an unprocessed pixel are managed using the DONE plane 33.

However, since "significance" is affected by the eight vicinities as described above, in general, there is a dependency relation of "significance". In other words, if there is a pixel changed to "significance", pixels in the vicinity thereof is affected by "significance" when the pixels are modeled.

(1-7) Problems of the Conventional CBM Processing

The CBM processing has been schematically described. Points of the CBM processing are as described below.
(1) Three coding passes have to be processed for one bit plane 22.
(2) The three coding passes have a dependency relation in the bit plane 22.
(3) Bit modeling of the lower bit plane 22 is performed while a value of the SIG plane 31 generated by the upper bit plane 22 is evaluated.

Under such limitations, in the CBM processing according to the conventional method, the CBM processing is sequential processing in a form as described below.
(1) A bit model unit performs processing in order from the upper bit plane 22.
(2) The bit model unit performs processing of the CU pass in the top bit plane $22_T$. At this point, the SIG plane 31 is generated.
(3) After completing the processing with respect to the top bit plane $22_T$, the bit model unit shifts to the bit plane 22 immediately below the top bit plane $22_T$ and updates the SIG plane 31 while performing processing of the SP pass.
(4) After completing the processing of the SP pass, the bit model unit performs processing of the MR pass. In performing the processing, the bit model unit refers to the SIG plane 31.
(5) After completing the processing for the MR pass, the bit model unit performs processing of the CU pass. With reference to the SIG plane 31, the bit model unit updates the SIG plane 31 while capturing a bit which has been modeled anew. Here, the bit model unit completes processing for one bit plane 22.
(6) The bit model unit shifts to the next bit plane 22.
(7) . . .

In addition, in the CBM processing for the bit plane 22 (e.g., 8 pixels×8 pixels) in the conventional method, pixels are evaluated in order one by one in accordance with a scanning order in a bit plane for each coding pass.

However, in the bit plane 22 for processing three coding passes (this is mainly predominant), in order to evaluate 64 pixels, coefficient reference of at least 192 times in total consisting of sixty-four times at the time of SP pass processing and sixty-four times at the time of MR pass processing is required. In addition, actually, coefficient reference for evaluating plus and minus signs is also required.

Moreover, in the SIG plane 31 which is accessed simultaneously, values of a bit of the same coordinates as the pixel and bits of eight vicinities are required to be referred to. Thus, 192 times×(8+1)=1728 times, that is, data access of 27 times as many as 64 pixels which should be processed is required, which poses a limit on an operation speed of a circuit.

On the other hand, the CBM processing in the case in which the bit plane 22 is 8 pixels×8 pixels has been described. However, in cutting out a code block with respect to a coefficient which is subjected to wavelet conversion and quantized, actually, a code block size of 32 pixels×32 pixels or 64 pixels×64 pixels is often used.

In this case, for example, in a code block size of 32 pixels× 32 pixels×16 bits, an amount of data is 32×32×16=16384 [bit]=16[Kbit]. In a code block size of 64 pixels×64 pixels×16 bits, an amount of data is 64×64×16=65536 [bit]=64 [Kbit].

Figure 1:
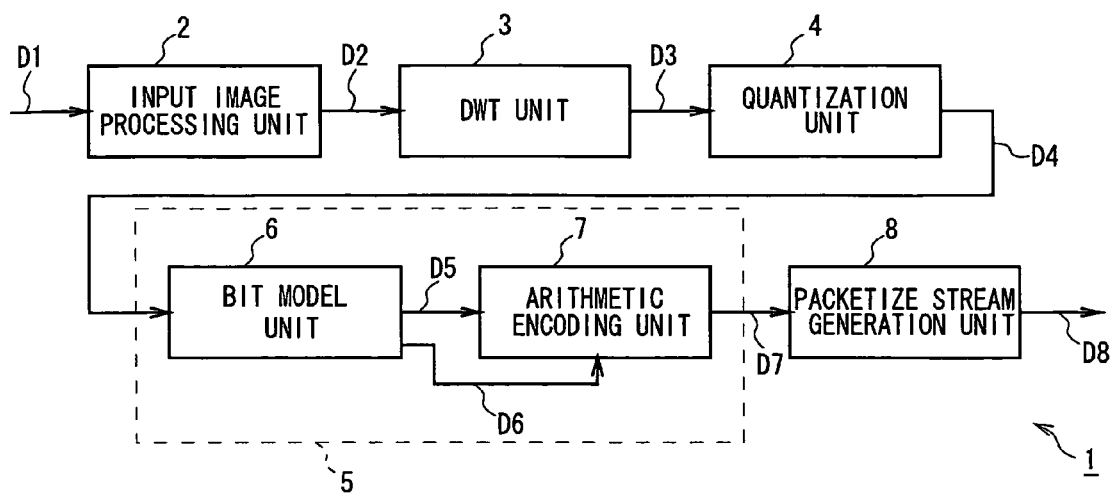
FIG. 1 is a block diagram showing a structure of a conventional JPEG 2000 encoding device.

Therefore, for example, in the case in which it is considered to constitute the encoding device 1 abiding by the JPEG 2000 standard shown in FIG. 1 and the decoding device 10 shown in FIG. 3 as an Integrated Circuit (IC), the code block size of 32 pixels×32 pixels×16 bits or 64 pixels×64 pixels×16 bits, which is often used actually is just too large to be stored and held in a Static RAM (SRAM) inside the IC.

Thus, in this embodiment, the following structural contrivance is added:
(1) whereas a Dynamic RAM (DRAM) for storing and retaining code block data is provided outside the encoding device and the decoding device constituted as ICs, an SRAM for storing and retaining process bit plane data required for coefficient bit modeling is provided inside the ICs and, further, a Read-Modify-Write form is adopted in which only data parts required for processing are read in a bit model part from the SRAM while being sequentially cut and are written back to the SRAM after being subjected to the CBM processing,
(2) in the CBM processing which conventionally processes pixels one by one, four pixels corresponding to a size of the stripe column 23A in the process bit plane 22 are collectively constituted as an operator to perform processing,
(3) all operators extended by four pixels are constituted as operators using a shift register, whereby pipeline processing, in which five pieces of information consisting of process bit plane data, SIG plane data, REF plane data, plus and minus signs plane data, and DONE plane data are synchronized, is performed, and
(4) such operators constituted by using a shift register are prepared in parallel by the number of SP pass, MR pass, and CU pass and are operated with a phase difference.

According to this structure, useless time, which does not contribute to code output, existing in the conventional processing method is reduced significantly to realize reduction in processing time. The encoding device and the decoding device to which the present invention is applied will be hereinafter described.

(2) First Embodiment (2-1) Structure of an Encoding Device 40 According to a First Embodiment (2-1-1) Overall Structure of the Encoding Device 40

Figure 22:
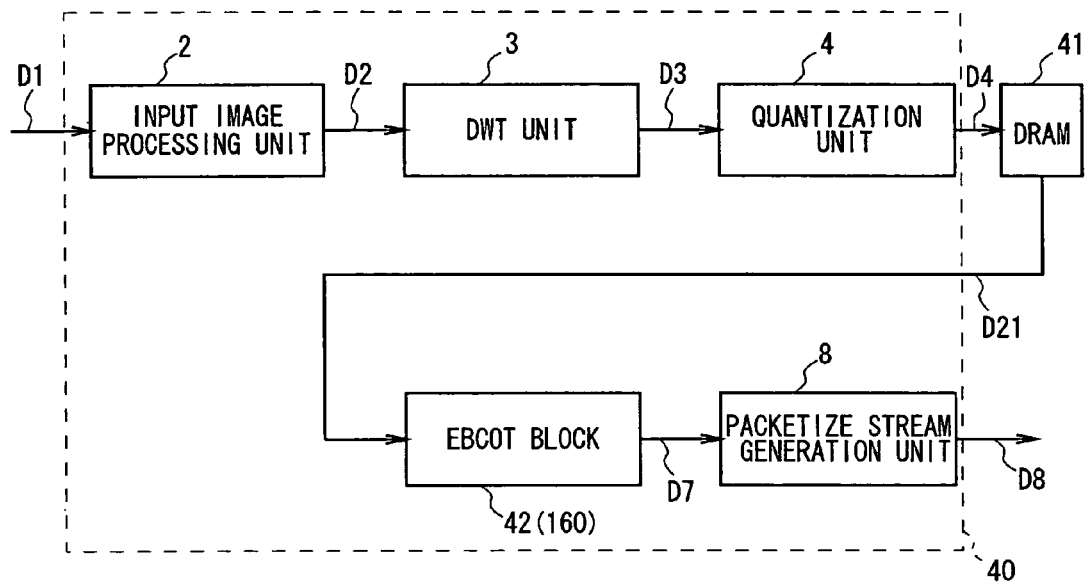
FIG. 22 is a block diagram showing a structure of a JPEG 2000 encoding device according to a first embodiment.

FIG. 22, in which components corresponding to those in FIG. 1 are denoted by the same reference numerals and signs, shows an encoding device 40 according to this embodiment abiding by the JPEG 2000 standard. The encoding device 40 is constituted in the same manner as the encoding device 1 shown in FIG. 1 except that the encoding device 40 is constituted integrally as an integrated circuit (IC) as a whole, that a DRAM 41 for storing and retaining code block data D4 outputted from the quantization unit 4 is provided in the outside of the IC, and that a structure of an EBCOT block 42 is different.

Figure 23:
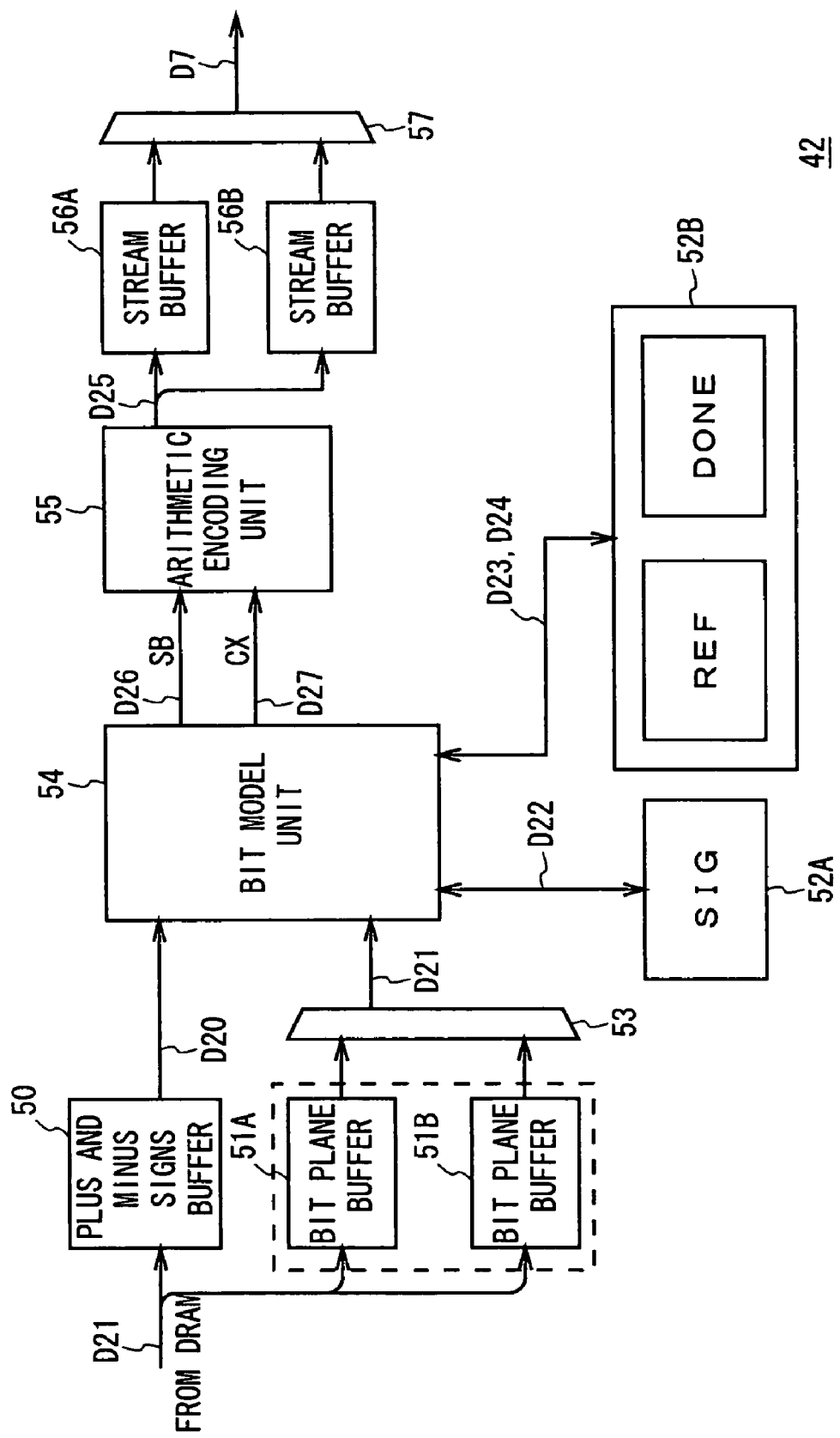
FIG. 23 is a block diagram showing a structure of an EBCOT block in the coding device shown in FIG. 22.

Actually, as shown in FIG. 23, in the EBCOT block 42, plus and minus signs plane buffer 50 and process bit plane buffers 51A and 51B, which consist of an SRAM, respectively, are provided in an input stage. Data of the plus minus signs bit plane 22S (hereinafter simply referred to as plus and minus plane data) D20 and data of the necessary process bit plane 22 (hereinafter simply referred to as bit plane data) D21 of the code block data D4 stored and retained in the DRAM 41 (FIG. 22) can be read out and stored and retained in the plus and minus signs buffer 50 or the bit plane buffer 51A and 51B consisting of the SRAM, respectively.

In this case, there are provided two process bit plane buffers 51A and 51B. Consequently, while the process bit plane data D21 stored and retained in one of the process bit plane buffers 51A and 51B is subjected to the CBM processing, the next process bit plane data D21 can be written in the other of the process bit plane buffers 51A and 51B.

In addition, SRAMs 52A and 52B, which have at least storage capacities for data of one bit plane and data of two bit plane, respectively, are provided in the EBCOT block 42. Consequently, data of the SIG plane 31 (FIG. 13) (hereinafter referred to as SIG plane data) D22, which is used at the time of CBM processing, can be stored and retained in the SRAM 52A, and data of the REF plane 32 (FIG. 13) (hereinafter referred to as REF plane data) D23 and data of the DONE plane 33 (FIG. 13) (hereinafter referred to as DONE plane data) D24 can be stored and retained in the SRAM 52B.

On the other hand, the process bit plane data D21 stored and retained in the process bit plane buffers 51A and 51B are read out sequentially by a bit mode unit 54 via a switcher 53 by a predetermined unit. Then, the bit model unit 54 subjects this read-out process bit plane data D21 to the CBM processing while using the plus and minus signs plane data D20, which is stored and retained in the plus and minus signs plane buffer 50, and the SIG plane data D22, the REF plane data D23, and the DONE plane data D24, which are stored and held in the SRAM 52A ad 52B. The bit mode unit 54 sends a symbol SB and a context CX obtained in this way to an arithmetic encoding unit 55.

The arithmetic encoding unit 55 generates an encoding column while performing arithmetic encoding processing with the symbols SB and the context CX to be supplied as inputs. The arithmetic encoding unit 55 alternately stores encoded data D25 obtained in this way in first and second bit stream buffers 56A and 56B sequentially for each code block 20.

Then, the encoded data D25 stored in the first or the second bit stream buffers 56A or 56B is sent to a packetize stream generation unit 8 (FIG. 22) of a later stage via the switcher 57.

In this way, in this encoding device 40, while only the necessary process bit plane data D21 is read out from the code block data D4 stored in the DRAM 41 and stored and retained in the bit plane buffers 51A and 51B, the CBM processing can be applied to the stored and retained process bit plane data D21 sequentially.

(2-1-2) Structure of the Bit Model Unit 54

Figure 24:
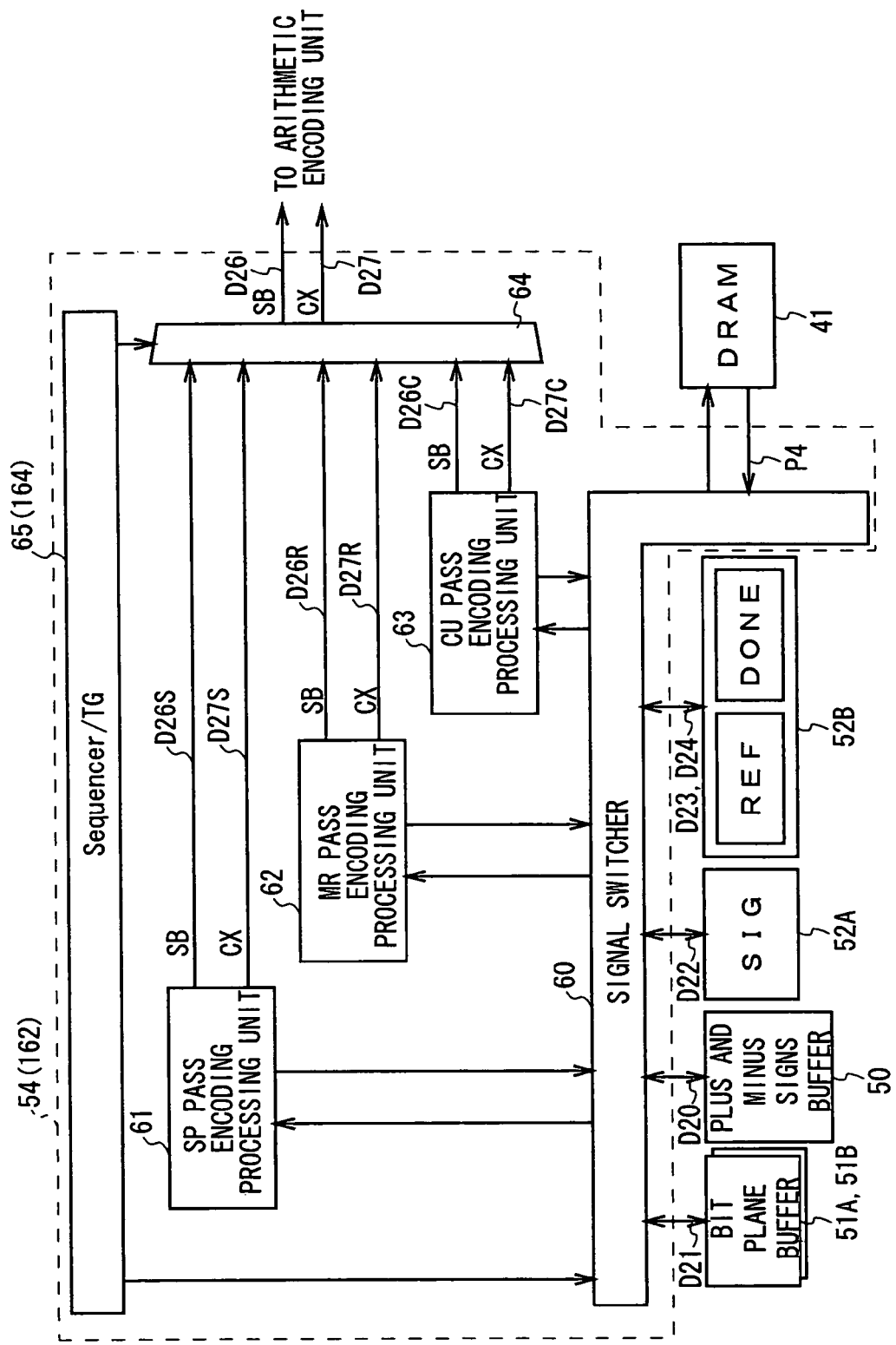
FIG. 24 is a block diagram showing a structure of a bit model unit in the EBCOT block shown in FIG. 23.

Here, as shown in FIG. 24, the bit model unit 54 includes a signal switcher 60, an SP pass encoding processing unit 61, an MR pass encoding processing unit 62, a CU pass encoding processing unit 63, an output switcher 64, and a control unit 65.

Figure 25A:
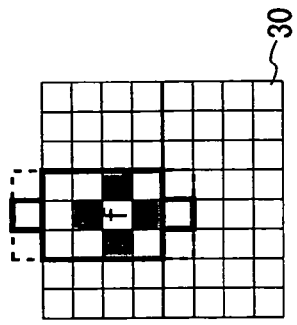
FIGS. 25A to 25E are conceptual diagrams served for explanation of bit plane access according to this embodiment.

In this case, at the time of the CBM processing with respect to the process bit plane 22 other than the top bit plane 22$_T$, the signal switcher 60 reads out samples of the process bit plane data D21 one by one from the process bit plane buffers 51A and 51B in accordance with a scanning order in a bit plane with four pixels constituting the one stripe column 23A shown in FIG. 25A as one sample under the control of the control unit 65 having functions as a sequencer and a timing generator. Then, first, the signal switcher 60 sends the process bit plane data D21 to the SP pass encoding processing unit 61.

In addition, in synchronization with the above, the signal switcher 60 reads out the plus and minus signs plane data D20 for four bits and bits above and below the four bits (total six bits, see FIG. 25C) on the plus and minus signs plane 30 on the same coordinates as four pixels, which have been sequentially read out from the process bit plane buffers 51A and 51B, respectively, from the plus and minus signal plane buffer 50. The plus and minus signs plane data D20 is required in applying encoding processing by the SP pass (hereinafter referred to as SP pass encoding processing) to the process bit plane data D21 for the four pixels. Then, the signal switcher 60 sends the plus and minus signs plane data D20 to the SP pass encoding processing unit 61.

Moreover, in synchronization with the above, the signal switcher 60 sequentially reads out the SIG plane data D22 for four bits and bits above and below the four bits (total six bits, see FIG. 25B) on the SIG plane 31 on the same coordinates as the four pixels, respectively, from the SRAM 52A. The SIG plane data D22 is required in subjecting the process bit plane data D21 for the four pixels to the SP pass encoding processing. Then, the signal switcher 60 sends the SIG plane data D22 to the SP pass encoding processing unit 61.

Moreover, in synchronization with the above, the signal switcher 60 sequentially reads out the REF plane data D23 for four bits (see FIG. 25E) on the REF plane 32 on the same coordinates as the four pixels, respectively, and the DONE plane data D24 for four bits (see FIG. 25D) on the DONE plane 33 on the same coordinates as the four pixels from the SRAM 52B. The REF plane data D23 and the DONE plane data D24 are required in subjecting the process bit plane data D21 for the four pixels to the SP pass encoding processing. Then, the signal switcher 60 sends the REF plane data D23 and the DONE plane data D24 to the SP pass encoding processing unit 61.

In this case, the SP pass encoding processing unit 61 can store and retain the process bit plane data D21 for the four pixels, and the plus and minus signs plane data D20, the SIG plane data D22, the REF plane data D23, and the DONE plane data D24 corresponding to the process bit plane data D21, which are supplied from the signal switcher 60 sequentially, by at least an amount of three samples in the past, respectively.

Then, when the process bit plane data D21 and the like for the next sample are given from the signal switcher 60, the SP pass encoding processing unit 61 executes detection on whether or not the SP pass encoding processing can be performed and, if the SP pass encoding processing can be performed, executes the SP pass encoding processing with respect to the process bit plane data D21 (for the four pixels) for the immediately preceding sample surrounded by bold lines in FIG. 25A using the SIG plane data D22, the plus and minus signs plane data D20, the REF plane data D23, and the DONE plane data D24, which are surrounded by bold lines in FIGS. 25B to 25E, respectively, stored and retained at that time.

Then, in the case in which the SP pass encoding processing has been performed, the SP pass encoding processing unit 61 sends a symbol SB for the pixel and respective symbols SB for the plus and minus signs, which are obtained by the SP pass encoding processing, to the output switcher 64 as symbol data D26S, and sends a context CX for the pixel and a context CX for plus and minus signs to the output switcher 64 as context data D27S.

In addition, when the SP pass encoding processing has been performed, the SP pass encoding processing unit 61 updates such SIG plane data D22, REF plane data D23 and/or DONE plane data D24 according to the SP pass encoding processing and, then, gives these data to the corresponding SRAMs 52A and 52B via a signal switch 60 to thereby write back the SIG plane data D22, the REF plane data D23, and the DONE plane data D24 to original address positions in the SRAMS 52A and 52B, respectively (Read-Modify-Write).

On the other hand, when the SP pass encoding processing with respect to data for one bit plane (process bit plane data D21) stored in the process bit plane buffers 51A and 51B ends in this way, thereafter, in the same manner, the signal switcher 60 reads out samples of the same process bit plane data D21 one by one from the process bit plane buffers 51A and 51B in accordance with a scanning order in a bit plane with four pixels constituting the one stripe column 23A shown in FIG. 25A as one sample under the control of the control unit 65. Then, first, the signal switcher 60 sends the process bit plane data D21 to the MR pass encoding processing unit 62.

In addition, in synchronization with the above, the signal switcher 60 sequentially reads out the SIG plane data D22 for four bits and bits above and below the four bits (total six bits, see FIG. 25B) on the SIG plane 31 on the same coordinates as four pixels, which have been read out from the process bit plane buffers 51A and 51B, respectively, from the SRAM 52A. The SIG plane data D22 is required in applying encoding processing by the MR pass (hereinafter referred to as MR pass encoding processing) to the process bit plane data D21 for the four pixels. Then, the signal switcher 60 sends the SIG plane data D22 to the MR pass encoding processing unit 62.

Moreover, in synchronization with the above, the signal switcher 60 sequentially reads out the REF plane data D23 for four bits (see FIG. 25E) on the REF plane 32 on the same coordinates as the four pixels and the DONE plane data D24 for four bits (see FIG. 25D) on the DONE plane 33 on the same coordinates as the four pixels from the SRAM 52B. The REF plane data D23 and the DONE plane data D24 are required in subjecting the process bit plane data D21 for the four pixels to the MR pass encoding processing. Then, the signal switcher 60 sends the REF plane data D23 and the DONE plane data D24 to the MR pass encoding processing unit 62.

In this case, the MR pass encoding processing unit 62 can store and retain the process bit plane data D21 for the four pixels, and the SIG plane data D22, the REF plane data D23, and the DONE plane data D24 corresponding to the process bit plane data D21, which are supplied from the signal switcher 60 sequentially, by at least an amount of three samples in the past, respectively.

Figure 25B:
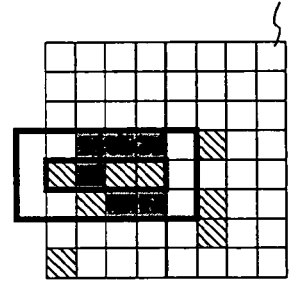
Figure 25E:
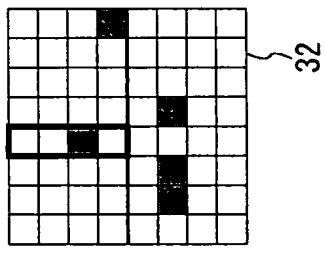
Figure 25C:
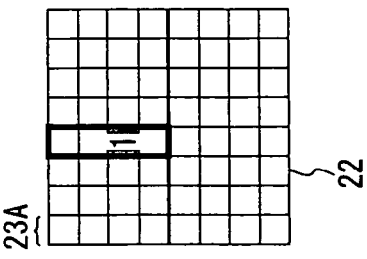
Figure 25D:
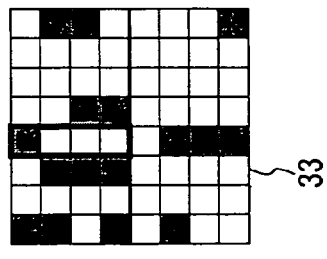

Then, when the process bit plane data D21 and the like for the next sample are given from the signal switcher 60, the MR pass encoding processing unit 62 executes detection on whether or not the MR pass encoding processing can be performed and, if the MR pass encoding processing can be performed, executes the MR pass encoding processing with respect to the process bit plane data D21 (for the four pixels) for the immediately preceding sample surrounded by bold lines in FIG. 25A using the necessary SIG plane data D22, REF plane data D23, and DONE plane data D24, which are surrounded by bold lines in FIGS. 25B, 25D and 25E, respectively, stored and retained at that time.

Then, in the case in which the MR pass encoding processing has been performed, the MR pass encoding processing unit 62 sends a symbol SB for the pixel and respective symbols SB for the plus and minus signs, which are obtained by the MR pass encoding processing, to the output switcher 64 as symbol data D26R, and sends a context CX for the pixel and a context CX for plus and minus signs to the output switcher 64 as context data D27R.

In addition, when the MR pass encoding processing has been performed, the MR pass encoding processing unit 62 updates such SIG plane data D22, REF plane data D23 and/or DONE plane data D24 according to the MR pass encoding processing and, then, gives these data to the corresponding SRAMs 52A and 52B via the signal switch 60 to thereby write back the SIG plane data D22, the REF plane data D23, and the DONE plane data D24 to original address positions in the SRAMs 52A and 52B, respectively (Read-Modify-Write).

Moreover, when the MR pass encoding processing with respect to data for one bit plane (process bit plane data D21) stored in the process bit plane buffers 51A and 51B ends in this way, thereafter, in the same manner, the signal switcher 60 reads out samples of the same process bit plane data D21 one by one from the process bit plane buffers 51A and 51B in accordance with a scanning order in a bit plane with four pixels constituting the one stripe column 23A shown in FIG. 25A as one sample under the control of the control unit 65. Then, the signal switcher 60 sends the process bit plane data D21 to the CU pass encoding processing unit 63.

In addition, in synchronization with the above, the signal switcher 60 sequentially reads out the plus and minus signs plane data D20 for four bits and bits above and below the four bits (total six bits, see FIG. 25C) on the plus and minus signs plane 30 on the same coordinates as four pixels, which have been read out from the process bit plane buffers 51A and 51B, respectively, from the plus and minus signs plane buffer 50. The plus and minus signs plane data D20 is required in applying encoding processing by the CU pass (hereinafter referred to as CU pass encoding processing) to the process bit plane data D21 for the four pixels. Then, the signal switcher 60 sends the plus and minus signs plane data D20 to the CU pass encoding processing unit 63.

Moreover, in synchronization with the above, the signal switcher 60 sequentially reads out the SIG plane data D22 for four bits and bits above and below the four bits (total six bits, see FIG. 25B) on the SIG plane 31 on the same coordinates as the four pixels from the SRAM 52A. The SIG plane data D22 is required in subjecting the process bit plane data D21 for the four pixels to the CU pass encoding processing. Then, the signal switcher 60 sends the SIG plane data D22 to the CU pass encoding processing unit 63.

Moreover, in synchronization with the above, the signal switcher 60 reads out the REF plane data D23 for four bits (see FIG. 25E) on the REF plane 32 on the same coordinates as the four pixels and the DONE plane data D24 for four bits (see FIG. 25D) on the DONE plane 33 on the same coordinates as the four pixels from the SRAM 52B. The REF plane data D23 and the DONE plane data D24 are required in subjecting the process bit plane data D21 for the four pixels to the CU pass encoding processing. Then, the signal switcher 60 sends the REF plane data D23 and the DONE plane data D24 to the CU pass encoding processing unit 63.

In this case, the CU pass encoding processing unit 63 can store and retain the process bit plane data D21 for the four pixels, and the plus and minus signs plane data D20, the SIG plane data D22, the REF plane data D23, and the DONE plane data D24 corresponding to the process bit plane data D21, which are supplied from the signal switcher 60 sequentially, by at least an amount of three samples in the past, respectively.

Then, when the process bit plane data D21 and the like for the next sample are given from the signal switcher 60, the CU pass encoding processing unit 63 executes detection on whether or not the CU pass encoding processing can be performed and, if the CU pass encoding processing can be performed, executes the CU pass encoding processing with respect to the process bit plane data D21 (for the four pixels) for the immediately preceding sample surrounded by bold lines in FIG. 25A using the SIG plane data D22, the plus and minus signs plane data D20, the REF plane data D23, and the DONE plane data D24, which are surrounded by bold lines in FIGS. 25B to 25E, respectively, stored and retained at that time.

Then, in the case in which the CU pass encoding processing has been performed, the CU pass encoding processing unit 63 sends a symbol SB for the pixel and symbols SB for the plus and minus signs, which are obtained by the CU pass encoding processing, to the output switcher 64 as symbol data D26C, and sends a context CX for the pixel and a context CX for plus and minus signs to the output switcher 64 as context data D27C.

In addition, when the CU pass encoding processing has been performed, the CU pass encoding processing unit 63 updates such SIG plane data D22, REF plane data D23 and/or DONE plane data D24 according to the CU pass encoding processing and, then, gives these data to the corresponding SRAMs 52A and 52B via the signal switch 60 to thereby write back the SIG plane data D22, the REF plane data D23, and the DONE plane data D24 to original address positions in the SRAMs 52A and 52B, respectively (Read-Modify-Write).

On the other hand, in the output switcher 64, the symbol data D26S, D26R and D26C and the context data D27S, D27R and D27C, which are given from the SP pass encoding processing unit 61, the MR pass encoding processing unit 62, and the CU pass encoding processing unit 63, respectively, are sent to the arithmetic encoding unit 55 as symbol data D26 and context data D27, respectively, under the control of the control unit 65.

In this way, in this bit model unit 54, the SP pass encoding processing, the MR pass encoding processing, and the CU pass encoding processing can be performed with four pixels on the process bit plane 22 as a unit, whereby the CBM processing can be performed at high speed.

(2-1-3) Specific Structure of the Respective Encoding Pass Processing Units

Next, respective structure of the SP pass encoding processing unit 61, the MR pass encoding processing unit 62, and the CU pass encoding processing unit 63 will be described in order.

(2-1-3-1) Structure of the SP Pass Encoding Processing Unit 61

Figure 26:
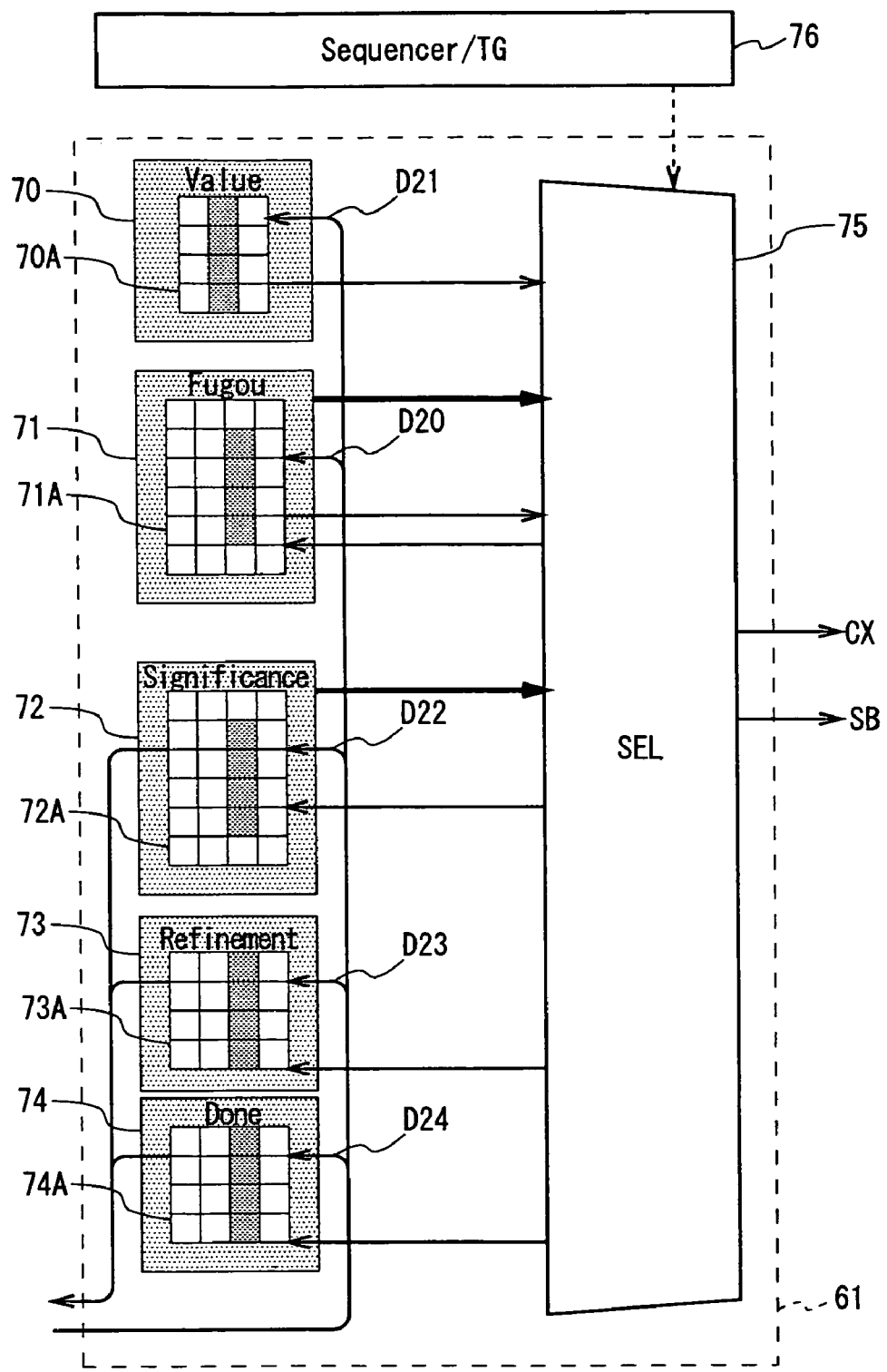
FIG. 26 is a block diagram showing a schematic structure of an SP pass encoding processing unit in the encoding device.

As shown in FIG. 26, the SP pass encoding processing unit 61 includes a process bit shift register unit 70, a plus sign shift register unit 71, an SIG shift register unit 72, an REF shift register unit 73, a DONE shift register unit 74, and a selector 75, all of which have a hardware configuration, and a control unit 76 which performs output switching control and the like with respect to the selector 75 as described later.

In addition, a shift register 70A of three stages is provided in the process bit shift register unit 70, and shift registers 71A to 74A of four stages are provided in the plus sign shift register unit 71, the SIG shift register unit 72, the REF shift register unit 73, and the DONE shift register unit 74, respectively.

Consequently, the SP pass encoding processing unit 61 can store and retain the process bit plane data D21, the plus and minus signs plane data D20, the SIG plane data D22, the REF plane data D23, and the DONE plane data D24 for one sample, which are given from the signal switcher 60 (FIG. 24) sequentially as described above, by an amount of three samples or four samples while shifting the data sequentially in the shift registers 70A to 74A of the process bit shift register unit 70, the plus sign shift register unit 71, the SIG shift register unit 72, the REF shift register unit 73, and the DONE shift register unit 74, respectively.

Then, when the process bit plane data D21 for one sample is given from the signal switcher 60, the process bit shift register unit 70 outputs the process bit plane data D21 for one sample, which has been shifted to a second stage of the shift register 70A of the process bit shift register unit 70, to the selector 75.

In addition, in this case, in synchronization with the above, the SIG shift register unit 72 applies detection processing for finding whether or not conditions for performing the SP pass encoding processing are satisfied to each of four pixels, which have been shifted to the second stage of the shift register 70A of the process bit shift register unit 70 at this point, using the SIG plane data D22 stored and retained in the shift register 72A of the SIG shift register unit 72. Then, the SIG shift register unit 72 outputs a result of the detection to the selector 75.

Moreover, in synchronization with the above, the SIG shift register unit 72 calculates a context CX for every four pixels in accordance with the rule described with reference to FIG. 16 with respect to the four pixels, which have been shifted to the second stage of the shift register 70A of the process bit shift register unit 70, respectively. Then, the SIG shift register unit 72 outputs a result of the calculation to the selector 75.

Then, in this case, if all results of the detection about whether or not the condition for performing the SP pass encoding processing with respect to the four pixels, which have been shifted to the second stage of the shift register 70A of the process bit shift register unit 70, detected by the SIG shift register unit 72 are negative, nothing is outputted from the selector 75. The processing with respect to the process bit plane data D21 for one sample (four pixels), which has been shifted to the second stage of the shift register 70A of the process bit shift register unit 70 ends.

On the other hand, if a result of the detection about any one pixel (hereinafter referred to as SP pass encoding processing object pixel) of one sample, which has been shifted to the second stage of the shift register 70A of the process bit shift register unit 70, is affirmative, a data value (0/1) of the SP pass encoding processing object pixel, which has been outputted from the process bit shift register unit 70, and a result of the calculation of the context CX about the SP pass encoding processing object pixel, which has been outputted from the SIG shift register unit 72 in synchronization with this, are outputted from the selector 75 as a symbol SB and a context CX of the SP pass encoding processing object pixel, respectively.

In addition, if a value of this symbol SB is '0', thereafter, on the basis of update information to be given from the selector 75 to the DONE shift register unit 74, a value of a bit of the same coordinates as the SP pass encoding processing object pixel of the DONE plane data D24, which is stored and retained in the shift register 74A of the DONE shift register unit 74, is updated to '1' representing that bit modeling has been completed. Then, the SP pass encoding processing with respect to this SP pass encoding processing object pixel is completed.

On the other hand, if a value of this symbol SB is '1', the information is given to the SIG shift register unit 72, the REF shift register unit 73, and the plus and minus signs shift register unit 71, respectively.

In this case, in the SIG shift register unit 72, a value of a bit of the same coordinates as the SP pass encoding processing object pixel in the SIG plane data D22, which is stored and retained in the shift register 72A of the SIG shift register unit 72, is updated to '1' indicating that the value is "significant". In addition, in the REF shift register unit 73, a value of a bit of the same coordinates as the SP pass encoding processing object pixel in the REF plane data D23, which is stored and retained in the shift register 73A of the REF shift register unit 73, is updated to '1' indicating that the value has changed to "significant".

Moreover, in this case, the plus and minus signs shift register unit 71 calculates a symbol SB and a context CX of plus and minus signs of this SP pass encoding processing object pixel in accordance with the rule described with reference to FIGS. 17A to 17C. Then, the plus and minus signs shift register unit 71 sends a result of the calculation to the selector 75. In this way, the symbol SB and the context CX are outputted via the selector 75.

Thereafter, update information is given to the DONE shift register unit 74 from the selector 75. A value of a bit of the same coordinates as the SP pass encoding processing object pixel in the DONE plane data D24, which has been stored and retained in the shift register 74A of the DONE shift register unit 74, is updated to '1' on the basis of the update information. Then, the SP pass encoding processing with respect to the SP pass encoding processing object pixel is completed.

In addition, thereafter, concerning each pixel lower in a scanning order in a bit plane than the SP pass encoding processing object pixel in the same sample (one sample stored and retained in the second stage of the shift register 70A of the process bit shift register unit 70 at this point), if the condition for performing the SP pass encoding processing is not satisfied, the SP pass encoding processing unit 61 skips the pixel. If the condition for performing the SP pass encoding processing is satisfied, the SP pass encoding processing unit 61 performs the SP pass encoding processing in the same manner as the above-described SP pass encoding processing object pixel. Then, when such processing is finished for all the pixels in the sample, the SP pass encoding processing unit 61 ends the processing with respect to the sample.

Then, thereafter, the SP pass encoding processing unit 61 repeats the same processing every time the process bit plane data D21 or the like for the next one sample is given from the signal switcher 60 in response to a transfer request for the process bit plane data D21 or the like for the next one sample which is given from the control unit 76 to the control unit 65 (FIG. 24).

In addition, in this case, every time the process bit plane data D21 or the like for the next one sample is given, the SP pass encoding processing unit 61 gives the SIG plane data D22, the REF plane data D23, and the DONE plane data D24, which are stored and retained in the fourth stages of the shift registers 72A to 74A of the SIG shift register unit 72, the REF shift register unit 73, and the DONE shift register unit 74, respectively, to the corresponding SRAMs 52A and 52B via the signal switch 60, respectively, to thereby write back these data to original positions of the SRAMs 52A and 52B.

In this way, in the SP pass encoding processing unit 61, the SP pass encoding processing with respect to the process bit plane data D21 stored in the bit plane buffers 51A and 51B can be performed.

(2-1-3-2) Structure of the MR Pass Encoding Processing Unit 62

Figure 27:
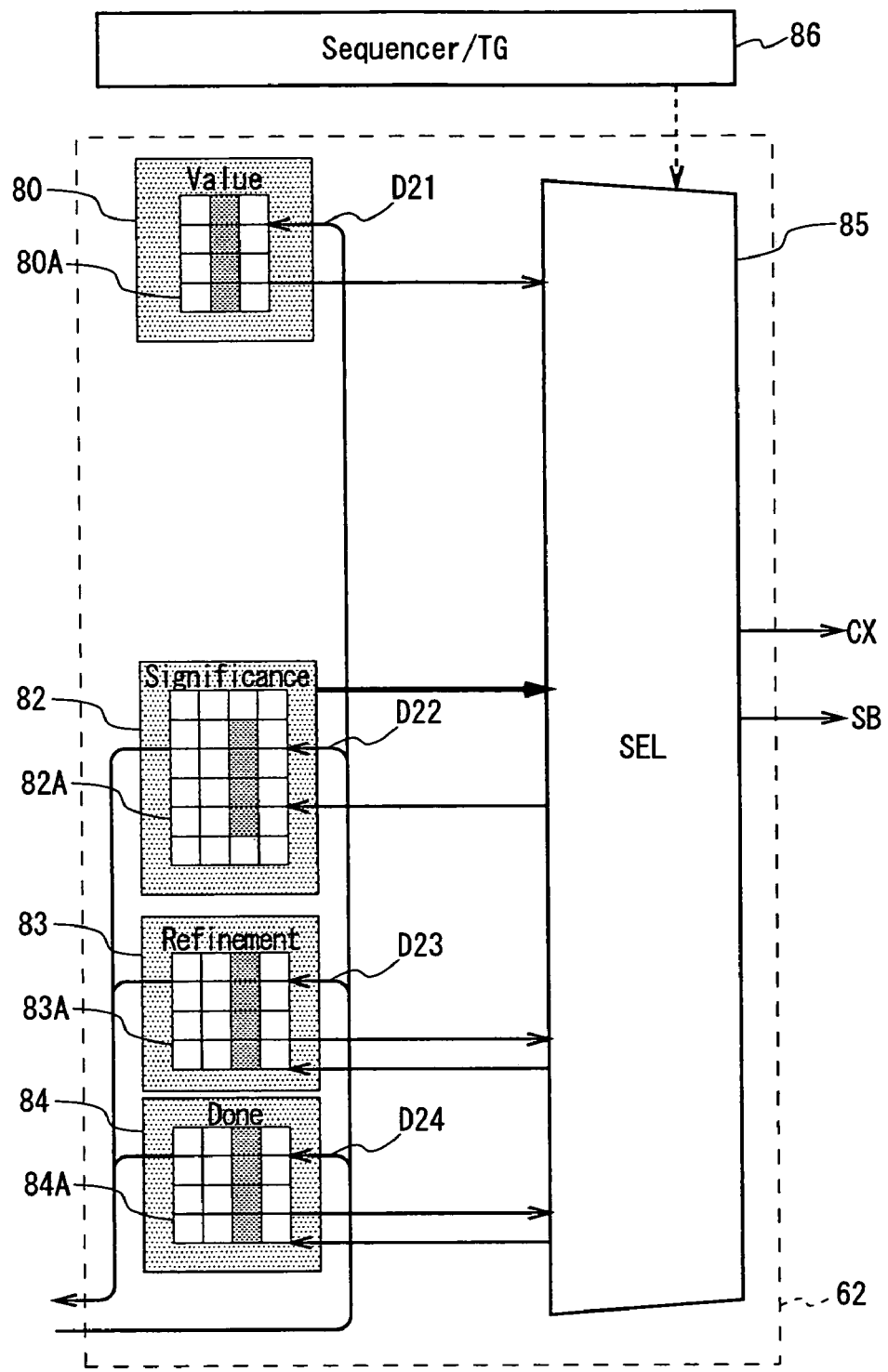
FIG. 27 is a block diagram showing a schematic structure of an MR pass encoding processing unit in the encoding device.

As shown in FIG. 27, the MR pass encoding processing unit 62 includes a process bit shift register unit 80, an SIG shift register unit 82, an REF shift register unit 83, a DONE shift register unit 84, and a selector 85, all of which have a hardware configuration, and a control unit 86 which performs output switching control and the like with respect to the selector 85 as described later.

In addition, a shift register 80A of three stages is provided in the process bit shift register unit 80, and shift registers 82A to 84A of four stages are provided in the SIG shift register unit 82, the REF shift register unit 83, and the DONE shift register unit 84, respectively.

Consequently, the MR pass encoding processing unit 62 can store and retain the process bit plane data D21, the SIG plane data D22, the REF plane data D23, and the DONE plane data D24 for one sample, which are given from the signal switcher 60 (FIG. 24) sequentially as described above, by an amount of three samples or four samples while shifting the data sequentially in the shift registers 80A and 82A to 84A of the process bit shift register unit 80, the SIG shift register unit 82, the REF shift register unit 83, and the DONE shift register unit 84, respectively.

Then, when the process bit plane data D21 for one sample is given from the signal switcher 60, the process bit shift register unit 80 outputs the process bit plane data D21 for one sample, which has been shifted to a second stage of the shift register 80A of the process bit shift register unit 80, to the selector 85.

In addition, in this case, in synchronization with the above, the REF shift register unit 83 and the DONE shift register unit 84 output the REF plane data D23 and the DONE plane data D24 for one sample, which has been shifted to second stages of the shift registers 83A and 84A of the REF shift register unit 83 and the DONE shift register unit 84, to the selector 85.

Then, the SIG shift register unit 82 calculates a context CX with respect to four pixels, which have been shifted to the second stage of the process bit shift register unit 80, in accordance with the rule described about FIGS. 19A and 19B with reference to an output of the REF shift register unit 83 using the SIG plane data D22 stored and retained in the shift register 82A of the SIG shift register unit 82. Then, the SIG shift register unit 82 outputs a result of the calculation to the selector 85.

Then, in this case, if all values of the DONE plane data D24 are '1' (i.e., processed), nothing is outputted from the selector 85. The processing with respect to the process bit plane data D21 for one sample, which has been shifted to the second stage of the shift register 80A of the process bit shift register unit 80, ends.

In addition, if any one data value of the DONE plane data D24 for one sample is '0' (i.e., unprocessed) and a pixel, which has been shifted to the second stage of the shift register 80A of the process bit shift register unit 80 corresponding to the DONE plane data D24 is not "significant", nothing is outputted from the selector 85 either. The processing with respect to the process bit plane data D21 for one sample, which has been shifted to the second stage of the shift register 80A of the process bit shift register unit 80, ends.

On the other hand, if any one data value of the DONE plane data D24 for one sample is '0', and a pixel, which has been shifted to the second stage of the shift register 80A of the process bit shift register unit 80 corresponding to the DONE plane data D24, is "significant", this means that the pixel (hereinafter referred to as MR pass encoding processing object pixel) is a pixel which should be subjected to MR pass encoding processing.

In this way, in this case, the selector 85 outputs a data value (0/1) of this MR bus encoding processing object pixel, which has been outputted from the process bit shift register unit 80, as a symbol SB. In addition, the selector 85 also outputs a context CX of this MR pass encoding processing object pixel outputted from the SIG shift register unit 82.

In addition, in this case, in the REF shift register unit 83, if a bit of the same coordinates as the MR pass encoding processing object pixel is '1', (i.e., a flag is set), this bit is cleared. In the DONE shift register unit 84, a bit of the same coordinates as the MR pass encoding processing object pixel is updated to '1' which means that the MR pass encoding processing object pixel has been processed.

Then, thereafter, concerning a remaining pixel shifted to the second stage of the shift register 80A of the process bit shift register unit 80 at that time, if the pixel is a pixel which should be subjected to the MR pass encoding processing, the MR pass encoding processing unit 62 subjects the pixel to the MR pass encoding processing in the same manner as above.

Moreover, thereafter, the MR pass encoding processing unit 62 repeats the same processing every time the process bit plane data D21 or the like for the next one sample is given from the signal switcher 60 in response to a transfer request for the process bit plane data D21 or the like for the next one sample which is given from the control unit 86 to the control unit 65 (FIG. 24).

In addition, in this case, every time the process bit plane data D21 or the like for the next one sample is given, the MR pass encoding processing unit 62 gives the SIG plane data D22, the REF plane data D23, and the DONE plane data D24, which are stored and retained in the fourth stages of the shift registers 82A to 84A of the SIG shift register unit 82, the REF shift register unit 83, and the DONE shift register unit 84, respectively, to the corresponding SRAMs 52A and 52B via the signal switch 60, respectively, to thereby write back these data to original positions of the SRAMs 52A and 52B.

In this way, in the MR pass encoding processing unit 62, the MR pass encoding processing with respect to the process bit plane data D21 stored in the bit plane buffers 51A and 51B can be performed.

(2-1-3-3) Structure of the CU Pass Encoding Processing Unit 63

Figure 28:
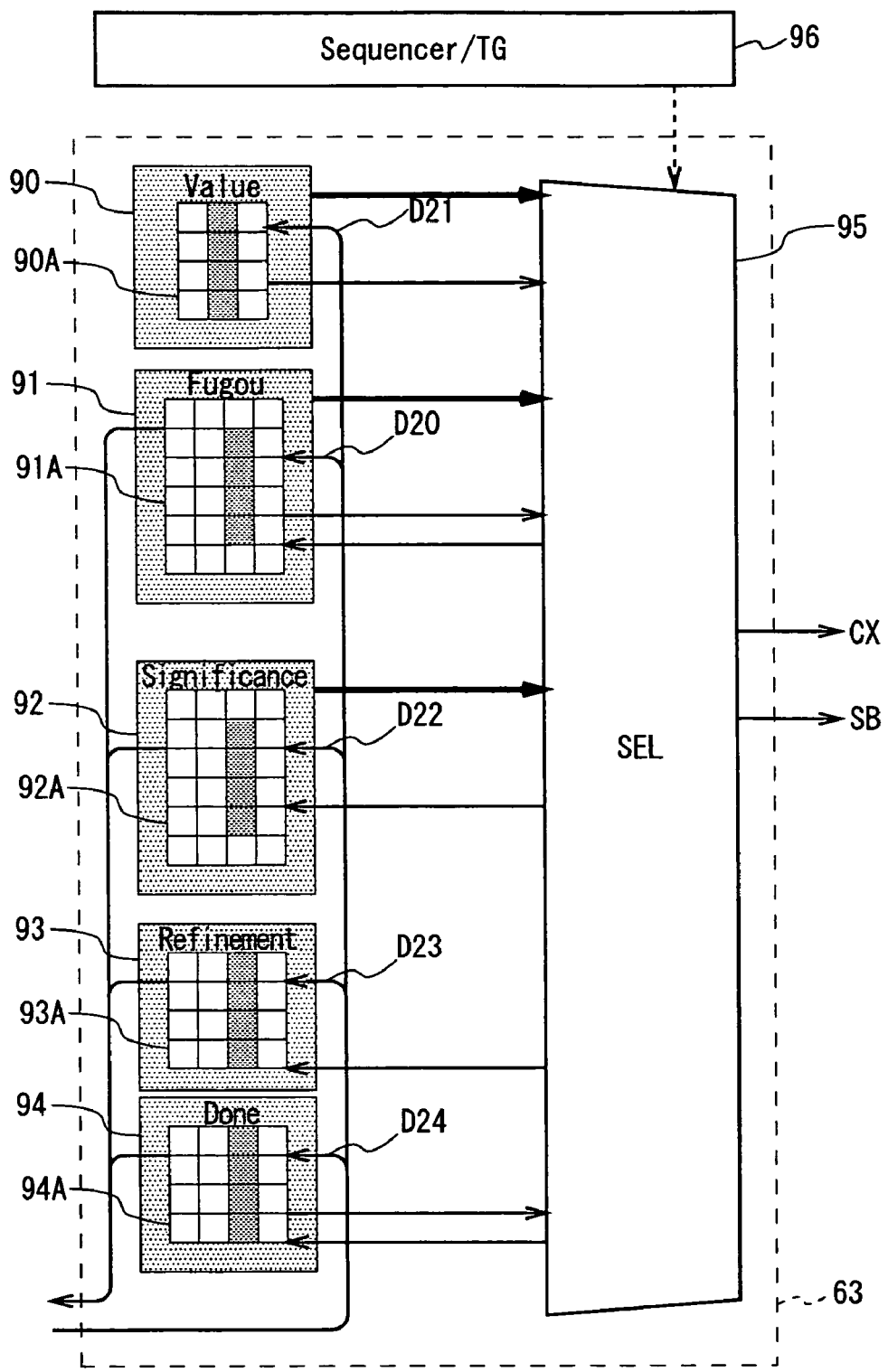
FIG. 28 is a block diagram showing a schematic structure of a CU pass encoding processing unit in the encoding device.

As shown in FIG. 28, the CU pass encoding processing unit 63 includes a process bit shift register unit 90, a plus and minus signs shift register unit 91, an SIG shift register unit 92, an REF shift register unit 93, a DONE shift register unit 94, and a selector 95, all of which have a hardware configuration, and a control unit 96 which performs output switching control and the like with respect to the selector 95 as described later.

In addition, a shift register 90A of three stages is provided in the process bit shift register unit 90, and shift registers 91A to 94A of four stages are provided in the plus and minus signs shift register unit 91, the SIG shift register unit 92, the REF shift register unit 93, and the DONE shift register unit 94, respectively.

Consequently, the CU pass encoding processing unit 63 can store and retain the process bit plane data D21, the plus and minus signs plane data D20, the SIG plane data D22, the REF plane data D23, and the DONE plane data D24 for one sample, which are given from the signal switcher 60 sequentially as described above, by an amount of three samples or four samples while shifting the data sequentially in the shift registers 90A to 94A of the process bit shift register unit 90, the plus and minus signs shift register unit 91, the SIG shift register unit 92, the REF shift register unit 93, and the DONE shift register unit 94, respectively.

Then, when the process bit plane data D21 for one sample is given from the signal switcher 60 (FIG. 24), the process bit shift register unit 90 outputs the process bit plane data D21 for one sample, which has been shifted to a second stage of the shift register 90A of the process bit shift register unit 90, to the selector 95.

In addition, in this case, in synchronization with the above, the SIG shift register unit 92 detects whether or not run-length processing can be performed with respect to four pixels, which have been shifted to a second stage of the shift register 90A of the process bit shift register unit 90, with reference to the DONE plane data D24, which is stored and retained in the shift register 94A of the DONE shift register unit 94, using the SIG plane data D22 which is stored and retained in the shift register 92A of the SIG shift register unit 92.

Then, if the run-length processing cannot be performed, the above-described SP pass encoding processing is sequentially performed with respect to the four pixels, respectively.

On the other hand, if the run-length processing can be performed, first, the SIG shift register unit 92 outputs "run" as a context in accordance with the rule described with reference to FIGS. 20 and 21. After that, the SIG shift register unit 92 outputs 0 as a symbol SB when all values of the four pixels in the sample are '0'. In this way, the context CX and the symbol SB are sent to the output switcher 62 (FIG. 24) via the selector 95.

In addition, when all the values of the four pixels in the sample are not 0, that is, if at least one pixel with a value of 1 exists in the four pixels, the SIG shift register unit 92 outputs 1 as a symbol SB. Subsequently, the SIG shift register unit 92 outputs a symbol SB corresponding to a context CX of "uniform" twice in accordance with the rule described with reference to FIGS. 21A to 21D. In this way, the context CX and the symbol SB are sent to the output switcher 64 (FIG. 24) via the selector 95.

In this case, in the SIG shift register unit 92, a value of a bit of the same coordinates as a pixel with the value of 1 in the SIG plane data D22, which is stored and retained in the shift register 92A of the SIG shift register unit 92, is updated to '1' indicating that the value is "significant". In addition, in the REF shift register unit 93, a value of a bit of the same coordinates as the pixel in the REF plane data D23, which is stored and retained in the shift register 93A of the REF shift register unit 93, is updated to '1' indicating that the value has changed to "significant".

Moreover, thereafter, the plus and minus signs shift register unit 91 calculates a symbol SB and a context CX of plus and minus signs of the pixel in accordance with the rule described with reference to FIGS. 17A to 17C. Then, the plus and minus signs shift register unit 91 sends a result of the calculation to the selector 95. In this way, the symbol SB and the context CX are sent to the output switcher 64 (FIG. 24) via the selector 95 following the context CX of "uniform" and the symbol SB corresponding to the pixel.

Then, update information is given to the DONE shift register unit 94 from the selector 95. A value of a bit of the same coordinates as the pixel in the DONE plane data D24, which has been stored and retained in the shift register 94A of the DONE shift register unit 94, is updated to '1' on the basis of the update information. Then, the CU pass encoding processing with respect to the pixel is completed.

Moreover, thereafter, concerning each pixel lower in a scanning order in a bit plane than the pixel in the same sample (one sample stored and retained in the second stage of the shift register 90A of the process bit shift register unit 90 at this point), the CU pass encoding processing unit 63 applies the SP pass encoding processing while sequentially updating the SIG plane data D22, the REF plane data D23, and the DONE plane data D24, which are stored and retained in the shift registers 90A to 94A of the SIG shift register unit 92, the REF shift register unit 93, and the DONE shift register unit 94, respectively, as required. Then, when such processing is finished for all the pixels in the sample, the CU pass encoding processing unit 63 ends the processing with respect to the sample.

Then, the CU pass encoding processing unit 63 repeats the same processing every time the process bit plane data D21 or the like for the next one sample is given from the signal switcher 60 in response to a transfer request for the process bit plane data D21 or the like for the next one sample which is given from the control unit 96 to the control unit 65 (FIG. 24).

In addition, in this case, every time the process bit plane data D21 or the like for the next one sample is given, the CU pass encoding processing unit 63 gives the SIG plane data D22, the REF plane data D23, and the DONE plane data D24, which are stored and retained in the fourth stages of the shift registers 92A to 94A of the SIG shift register unit 92, the REF shift register unit 93, and the DONE shift register unit 94, respectively, to the corresponding SRAMs 52A and 52B via the signal switch 60, respectively, to thereby write back these data to original positions of the SRAMs 52A and 52B.

In this way, in the CU pass encoding processing unit 63, the CU pass encoding processing with respect to the process bit plane data D21 stored in the bit plane buffers 51A and 51B can be performed.

(2-2) Structure of a Decoding Device 100 According to the First Embodiment (2-2-1) Overall Structure of the Decoding Device 100

Figure 29:
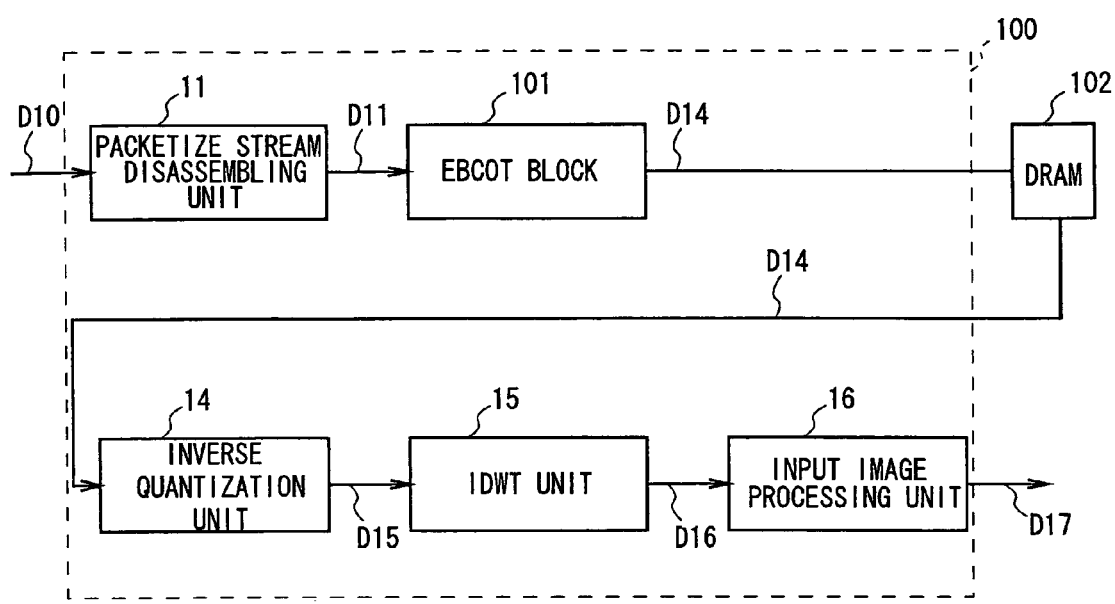
FIG. 29 is a block diagram showing a structure of a JPEG 2000 decoding device according to the first embodiment.

FIG. 29, in which components corresponding to those in FIG. 3 are denoted by the same reference numerals and signs, shows the decoding device 100 according to this embodiment abiding by the JPEG 2000 standard. The decoding device 100 is constituted in the same manner as the decoding device 10 shown in FIG. 3 except that the decoding device 100 is constituted integrally as an integrated circuit (IC) as a whole, that a structure of an EBCOT block 101 is different, and that a DRAM 102, which stores and retains code block data D14 to be outputted from the EBCOT block 101, is provided in the outside of the IC.

Figure 30:
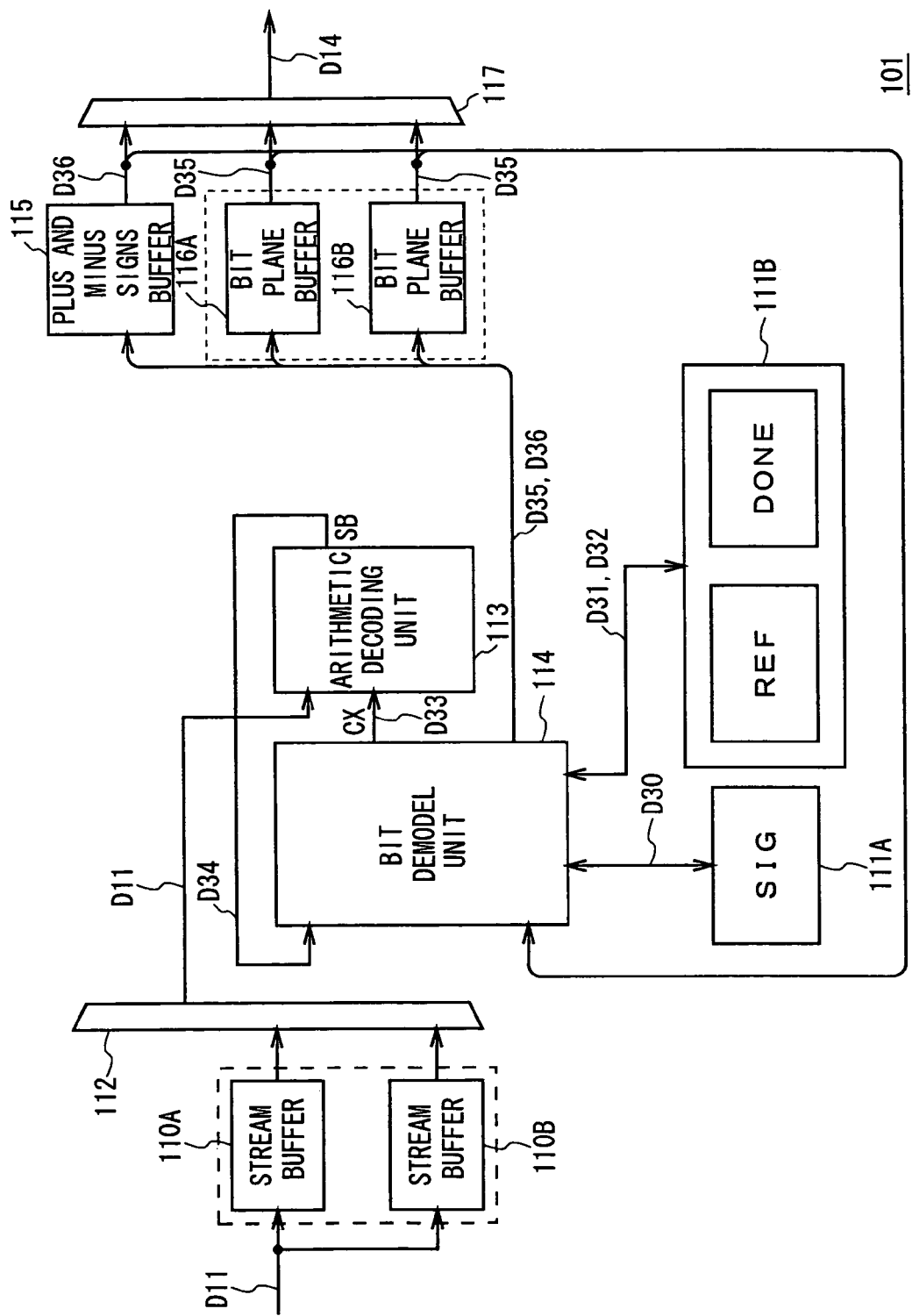
FIG. 30 is a block diagram showing a structure of an EBCOT block in the decoding device shown in FIG. 29.

Actually, as shown in FIG. 30, in the EBCOT block 101, stream buffers 110A and 110B, which consist of an SRAM, respectively, are provided in an input stage such that encoded data D11 given from a packetize stream disassembling unit 11 can be stored and retained in the stream buffers 110A and 110B.

In this case, there are provided two stream buffers 110A and 110B. Consequently, while the encoded data D11 for one bit plane 22 stored and retained in one of the stream buffers 110A and 110B is subjected to the CBM processing, the encoded data D11 for the next bit plane 22 can be written in the other of the stream buffers 110A and 110B.

In addition, SRAMS 111A and 111B, which have at least storage capacities for data of one bit plane and data of two bit plane, respectively, are provided in the EBCOT block 101. Consequently, SIG plane data D30, which is used at the time of CBM processing, can be stored and retained in the SRAM 111A, and REF plane data D31 and DONE plane data D32 can be stored and retained in the SRAM 111B.

On the other hand, the encoded data D11 stored and retained in the stream buffers 110A and 110B are read out sequentially by an arithmetic decoding unit 113 via a switcher 112 by a predetermined unit. Then, the arithmetic decoding unit 113 executes predetermined arithmetic decoding operation processing with this read-out encoded data D11 and context data D33, which is given from a bit demodel unit 114 in a later stage, as inputs. Then, the arithmetic decoding unit 113 sends symbol data D34 obtained in this way to the bit demodel unit 114.

The bit demodel unit 114 changes the symbol data D34 to be supplied to a coefficient bit demodel according to the CBM processing. In this case, the bit demodel unit 114 sequentially stores process bit plane data D35 and plus and minus signs plane data D36, which are sequentially decoded by decoding processing by an SP pass (hereinafter referred to as SP pass decoding processing), decoding processing by an MR pass (hereinafter referred to as MR pass decoding processing), and decoding processing by a CU pass (hereinafter referred to as CU pass decoding processing), in corresponding positions in bit plane buffers 116A and 116B or plus and minus signs plane buffer 115 consisting of an SRAM, respectively, in a later stage, respectively.

In addition, at the same time, while sequentially updating the SIG plane data D30, the REF plane data D31, and the DONE plane data D32, which are stored in the SRAMs 111A and 111B, as required, the bit demodel unit 114 proceeds the CBM processing using the process bit plane data D35, the plus and minus signs plane data D36, the SIG plane data D30, the REF plane data D31, and the DONE plane data D32 which have been subjected to decoding or the like partially. Moreover, in this case, the bit demodel unit 114 sequentially sends the context data D33, which has been obtained together with such process bit plane data D35, to the arithmetic decoding unit 113 as described above.

Then, the process bit plane data D35, which has been finally decoded by such CBM processing, is stored and retained in the first and the second bit plane buffers 116A and 116B, and the plus and minus signs plane data D36, which has been finally decoded by the CBM processing, is stored and retained in the plus and minus signs plane buffer 115. Thereafter, the process bit plane data D35 and the plus and minus signs plane data D36 are read out at predetermined timing, and are given to the DRAM 102 (FIG. 9) as the code block data D14 via a switcher 117 and stored and retained therein.

Moreover, the code block data D14 stored and retained in the DRAM 102 is then read out to an inverse quantization unit 14 (FIG. 29) and subjected to predetermined inverse quantization processing.

In this way, in this decoding device 100, the encoded data D11, which is given from the packetize stream disassembling unit 11, is sequentially subjected to the CBM processing. Consequently, processing in later stages can be performed while the code block data D35 is decoded and stored and retained in the DRAM 41 provided outside the IC.

(2-2-2) Structure of the Bit Demodel Unit 114

Figure 31:
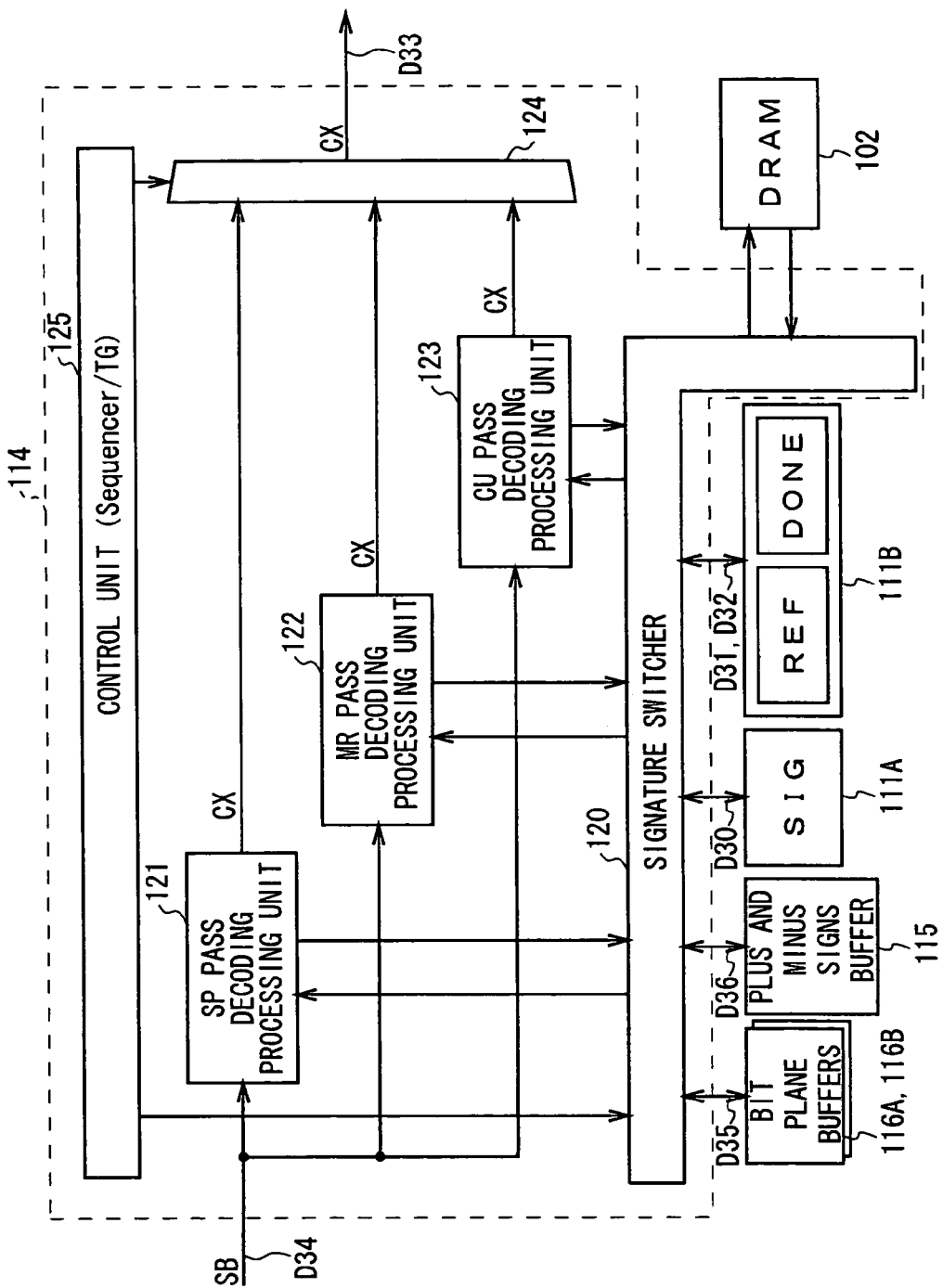
FIG. 31 is a block diagram showing a structure of a bit demodel unit in the EBCOT block shown in FIG. 31.

Here, as shown in FIG. 31, the bit demodel unit 114 includes a signal switcher 120, an SP pass decoding processing unit 121, an MR pass decoding processing unit 122, a CU pass decoding processing unit 123, an output switcher 124, and a control unit 125.

In this case, the arithmetic decoding unit 113 (FIG. 30) executes predetermined arithmetic decoding operation processing on the basis of the encoded data D11, which has been read out from the stream buffers 110A and 110B, and the context data D33, which is given from the SP pass decoding processing unit 121, the MR pass decoding processing unit 122, or the CU pass decoding processing unit 123. Then, of the symbol data D34 obtained as a result of the arithmetic decoding operation processing, the arithmetic decoding unit 113 sends the symbol data D34, which has been obtained by applying the arithmetic decoding processing as described above to the encoded data D11 obtained by being subjected to the SP pass encoding processing in an encoding device 42 (FIG. 23), to the SP pass decoding processing unit 121.

In this case, the signal switcher 120 reads out samples of the not decoded or partially decoded process bit plane data D35, which is stored and retained in the bit plane buffers 116A and 116B, one by one from the bit plane buffers 116A and 116B in accordance with a scanning order in a bit plane with four pixels constituting the one stripe column 23A shown in FIG. 25A as one sample under the control of the control unit 125 having functions as a sequencer and a timing generator. Then, the signal switcher 120 sends the process bit plane data D35 to the SP pass decoding processing unit 121.

In addition, in synchronization with the above, the signal switcher 120 sequentially reads out the not decoded or partially decoded plus and minus signs plane data D36 for four bits and bits above and below the four bits (total six bits, see FIG. 25C) on the plus and minus signs plane 30 on the same coordinates as four pixels, which have been read out from the bit plane buffers 116A and 116B, from the plus and minus signal plane buffer 115. The plus and minus signs plane data D35 is required in decoding the process bit plane data D35 for the four pixels according to the SP pass decoding processing. Then, the signal switcher 120 sends the plus and minus signs plane data D35 to the SP pass decoding processing unit 121.

Moreover, in synchronization with the above, the signal switcher 120 sequentially reads out the SIG plane data D30 for four bits and bits above and below the four bits (total six bits, see FIG. 25B) on the SIG plane 31 on the same coordinates as the four pixels, respectively, from the SRAM 111A. The SIG plane data D30 is required in subjecting the process bit plane data D31 for the four pixels to the SP pass decoding processing. Then, the signal switcher 120 sends the SIG plane data D30 to the SP pass decoding processing unit 121.

Moreover, in synchronization with the above, the signal switcher 120 sequentially reads out the REF plane data D31 for four bits (see FIG. 25E) on the REF plane 32 on the same coordinates as the four pixels, respectively, and the DONE plane data D32 for four bits (see FIG. 25D) on the DONE plane 33 on the same coordinates as the four pixels from the SRAM 111B. The REF plane data D31 and the DONE plane data D32 are required in subjecting the process bit plane data D35 for the four pixels to the SP pass decoding processing. Then, the signal switcher 120 sends the REF plane data D31 and the DONE plane data D32 to the SP pass decoding processing unit 121.

In this case, the SP pass decoding processing unit 121 can store and retain the process bit plane data D35 for the four pixels, and the plus and minus signs plane data D36, the SIG plane data D30, the REF plane data D31, and the DONE plane data D32 corresponding to the process bit plane data D35, which are supplied from the signal switcher 120 sequentially, by at least an amount of three samples in the past, respectively.

Then, when the symbol data D34 for one symbol is given from the arithmetic decoding unit 113, the SP pass decoding processing unit 121 executes detection on whether or not the SP pass decoding processing can be performed and, if the SP pass decoding processing can be performed, executes the SP pass decoding processing with respect to the symbol data D34 (for the four pixels) stored and retained at that point surrounded by bold lines in FIG. 25A using the SIG plane data D30, the plus and minus signs plane data D36, the REF plane data D31, and the DONE plane data D32, which are surrounded by bold lines in FIGS. 25B to 25E, respectively, stored and retained at that time.

In addition, when the SP pass decoding processing has been performed, the SP pass decoding processing unit 121 sends a context CX obtained in this case to the arithmetic decoding unit 113 (FIG. 30) as the context data D33 via the output switcher 124 as described above, and on the other hand, stores the decoded process bit plane data D35 and the decoded plus and minus signs plane data D36, which has been obtained together with the context CX, in corresponding positions of the bit plane buffers 116A and 116B or the plus and minus signs buffer 115, respectively.

Further, when the SP pass decoding processing has been performed, the SP pass decoding processing unit 121 updates the SIG plane data D30, the REF plane data D31 and/or the DONE plane data D32 according to the SP pass decoding processing and, then, gives these data to the corresponding SRAMs 111A and 111B via a signal switch 120 to thereby write back the SIG plane data D30, the REF plane data D31, and the DONE plane data D32 to original positions in the SRAMs 111A and 111B, respectively (Read-Modify-Write).

On the other hand, the arithmetic decoding unit 113 (FIG. 30) sends the symbol data D34 obtained by applying the arithmetic decoding operation processing to the encoded data D11, which has been obtained by performing the MR pass encoding processing in the encoding device 42 (FIG. 23), of the encoded data D11 read out from the stream buffers 110A and 110B to the MR pass decoding processing unit 122.

In this case, the signal switcher 120 sequentially reads out samples of the process bit plane data D35 partially decoded by the preceding SP pass decoding processing, which is stored and retained in the bit plane buffers 116A and 116B, one by one from the bit plane buffers 116A and 116B in accordance with a scanning order in a bit plane with four pixels constituting the one stripe column 23A shown in FIG. 25A as one sample under the control of the control unit 125. Then, the signal switcher 120 sends this process bit plane data D35 to the MR pass decoding processing unit 122.

In addition, in synchronization with the above, the signal switcher 120 sequentially reads out the SIG plane data D30 for four bits and bits above and below the four bits (total six bits, see FIG. 25B) on the SIG plane 31 on the same coordinates as four pixels, which have been read out from the bit plane buffers 116A and 116B, respectively, from the SRAM 111A. The SIG plane data D30 is required in decoding the process bit plane data D35 for the four pixels according to the MR pass decoding processing. Then, the signal switcher 120 sends the SIG plane data D30 to the MR pass encoding processing unit 122.

Moreover, in synchronization with the above, the signal switcher 120 sequentially reads out the REF plane data D31 for four bits (see FIG. 25E) on the REF plane 32 on the same coordinates as the four pixels and the DONE plane data D32 for four bits (see FIG. 25D) on the DONE plane 33 on the same coordinates as the four pixels from the SRAM 111B. The REF plane data D31 and the DONE plane data D32 are required in decoding the process bit plane data D35 for the four pixels according to the MR pass decoding processing.

In this case, the MR pass decoding processing unit 122 can store and retain the process bit plane data D35 for the four pixels, and the SIG plane data D30, the REF plane data D31, and the DONE plane data D32 corresponding to the process bit plane data D35, which are supplied from the signal switcher 120 sequentially, by at least an amount of three samples in the past, respectively.

Then, when the symbol data D34 for one symbol is given from the arithmetic decoding unit 113, the MR pass decoding processing unit 122 executes detection on whether or not the MR pass decoding processing can be performed and, if the MR pass decoding processing can be performed, executes the MR pass decoding processing with respect to the symbol data D34 (for the four pixels) for one sample at that time surrounded by bold lines in FIG. 25A using the SIG plane data D30, the REF plane data D31, and DONE plane data D32, which are surrounded by bold lines in FIGS. 25B, 25D and 25E, respectively, stored and retained at that time and the symbol data D34 given from the arithmetic decoding unit 113 at that point.

Then, in the case in which the MR pass decoding processing has been performed, the MR pass decoding processing unit 122 sends a context CX obtained in this case to the arithmetic decoding unit 113 (FIG. 30) as the context data D33 via the output switcher 124 as described above, and on the other hand, stores the decoded process bit plane data D35, which has been obtained together with the context CX, in corresponding positions of the bit plane buffers 116A and 116B.

Further, when the MR pass decoding processing has been performed, the MR pass decoding processing unit 122 updates the SIG plane data D30, the REF plane data D31 and/or the DONE plane data D32 according to the MR pass decoding processing and, then, gives these data to the corresponding SRAMs 111A and 111B via the signal switch 120 to thereby write back the SIG plane data D30, the REF plane data D31, and the DONE plane data D32 to original positions of the RAMs 111A and 111B, respectively (Read-Modify-Write).

Similarly, the arithmetic decoding unit 113 (FIG. 30) sends the symbol data D34, which has been obtained by applying predetermined arithmetic decoding operation processing to the encoded data D11, which has been obtained by performing the CU pass encoding processing in the encoding device 42 (FIG. 23), of the encoded data D11 read out from the stream buffers 110A and 110B to the CU pass decoding processing unit 123.

In this case, the signal switcher 120 sequentially reads out samples of the process bit plane data D35 partially decoded by the preceding SP pass decoding processing and MR pass decoding processing (excluding a case of decoding processing with respect to the top bit plane $22_T$), which is stored and retained in the bit plane buffers 116A and 116B, one by one from the bit plane buffers 116A and 116B in accordance with a scanning order in a bit plane with four pixels constituting the one stripe column 23A shown in FIG. 25A as one sample under the control of the control unit 125. Then, the signal switcher 120 sends this process bit plane data D35 to the CU pass decoding processing unit 123.

In addition, in synchronization with the above, the signal switcher 120 sequentially reads out the non-decoded or partially decoded plus and minus signs plane data D36 for four bits and bits above and below the four bits (total six bits, see FIG. 25C) on the plus and minus signs plane 30 on the same coordinates as four pixels, which have been read out from the process bit plane buffers 116A and 116B, respectively, from the plus and minus signs plane buffer 115. The plus and minus signs plane data D36 is required in decoding the process bit plane data D35 for the four pixels according to the CU pass decoding processing. Then, the signal switcher 120 sends the plus and minus signs plane data D36 to the CU pass decoding processing unit 123.

Moreover, in synchronization with the above, the signal switcher 120 sequentially reads out the SIG plane data D30 for four bits and bits above and below the four bits (total six bits, see FIG. 25B) on the SIG plane 31 on the same coordinates as the four pixels from the SRAM 111A. The SIG plane data D30 is required in decoding the process bit plane data D35 for the four pixels according to the CU pass decoding processing. Then, the signal switcher 120 sends the SIG plane data D30 to the CU pass decoding processing unit 123.

Moreover, in synchronization with the above, the signal switcher 120 reads out the REF plane data D31 for four bits (see FIG. 25E) on the REF plane 32 on the same coordinates as the four pixels and the DONE plane data D32 for four bits (see FIG. 25D) on the DONE plane 33 on the same coordinates as the four pixels from the SRAM 111B. The REF plane data D31 and the DONE plane data D32 are required in decoding the process bit plane data D35 for the four pixels according to the CU pass decoding processing. Then, the signal switcher 120 sends the REF plane data D31 and the DONE plane data D32 to the CU pass decoding processing unit 123.

In this case, the CU pass decoding processing unit 123 can store and retain the process bit plane data D35 for the four pixels, and the plus and minus signs plane data D36, the SIG plane data D30, the REF plane data D31, and the DONE plane data D32 corresponding to the process bit plane data D35, which are supplied from the signal switcher 120 sequentially, by at least an amount of three samples in the past, respectively.

Then, when the symbol data D34 for one symbol is given from the arithmetic decoding unit 113, the CU pass decoding processing unit 123 executes detection on whether or not the CU pass decoding processing can be performed and, if the CU pass decoding processing can be performed, executes the CU pass decoding processing with respect to the symbol data D34 (for the four pixels) for one sample stored and retained at that point surrounded by bold lines in FIG. 25A using the SIG plane data D30, the plus and minus signs plane data D36, the REF plane data D31, and the DONE plane data D32, which are surrounded by bold lines in FIGS. 25B to 25E, respectively, stored and retained at that time, and the symbol data D34 given from the arithmetic decoding unit 113 at that point.

In addition, in the case in which the CU pass decoding processing or the SP pass decoding processing has been performed, the CU pass decoding processing unit 123 sends a context CX obtained in this case to the arithmetic decoding unit 113 (FIG. 30) as the context data D33 via the output switcher 124 as described above, and on the other hand, stores the decoded process bit plane data D35 and the decoded plus and minus signs plane data D36, which have been obtained together with the context CX, in corresponding positions of the bit plane buffers 116A and 116B or the plus and minus signs buffer 115, respectively.

Further, when the CU pass decoding processing or the SP pass decoding processing has been performed, the CU pass decoding processing unit 123 updates the SIG plane data D30, the REF plane data D31 and/or the DONE plane data D32 according to the CU pass decoding processing or the SP pass decoding processing and, then, gives these data to the corresponding SRAMs 111A and 111B via the signal switch 120 to thereby write back the SIG plane data D30, the REF plane data D31, and the DONE plane data D32 to original positions in the SRAMs 111A and 111B, respectively (Read-Modify-Write).

In this way, in this bit demodel unit 114, the SP pass decoding processing, the MR pass decoding processing, and the CU pass decoding processing can be performed with four pixels on the process bit plane 22 of a decoding object as a unit, whereby the CBM processing can be performed at high speed.

(2-2-3) Specific Structure of the Respective Coding Pass Processing Units

Next, respective structures of the SP pass decoding processing unit 121, the MR pass decoding processing unit 122, and the CU pass decoding processing unit 123 will be described in order.

(2-2-3-1) Structure of the SP Pass Decoding Processing Unit 121

Figure 32:
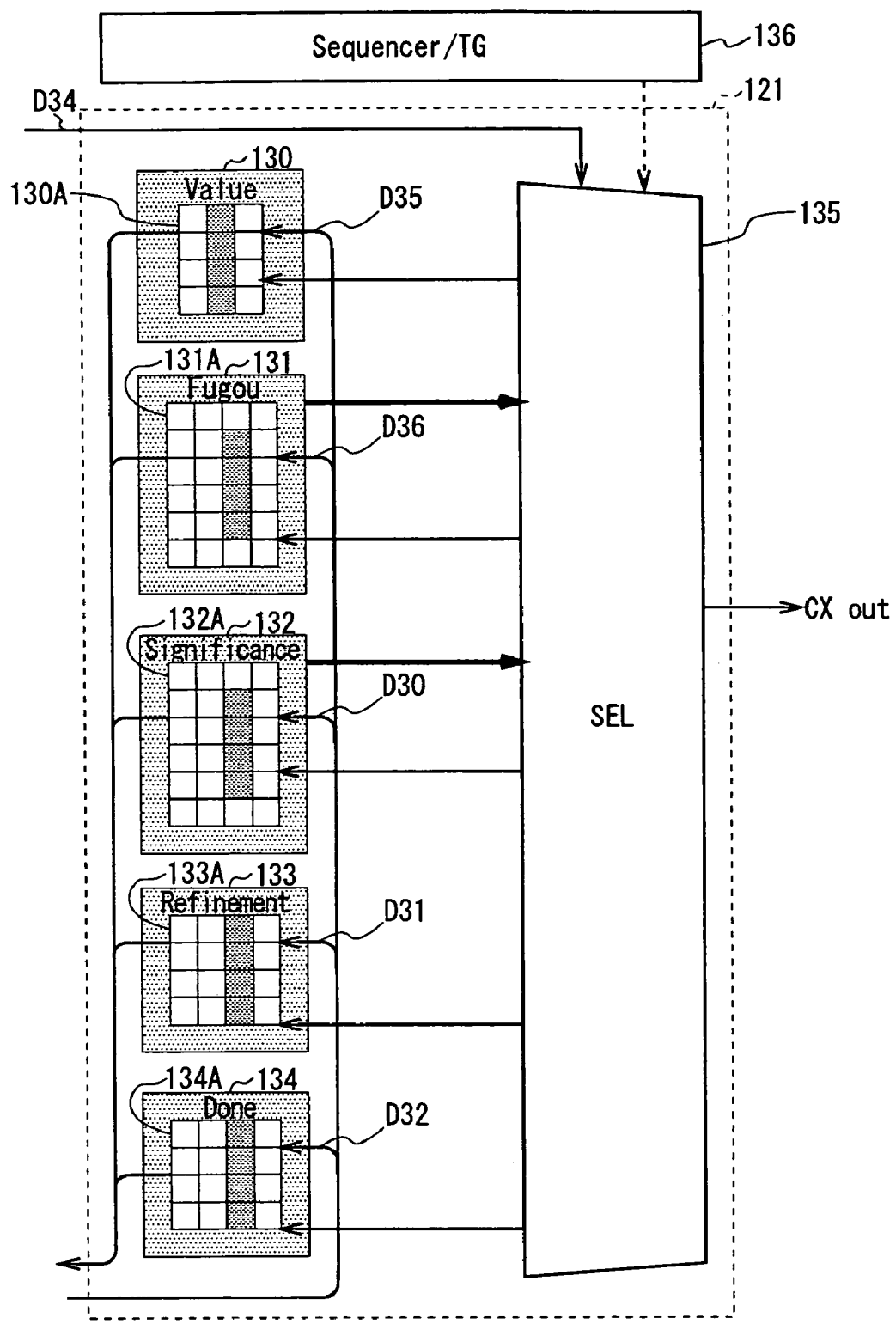
FIG. 32 is a block diagram showing a schematic structure of an SP pass decoding processing unit in the decoding device.

As shown in FIG. 32, the SP pass decoding processing unit 121 includes a process bit shift register unit 130, a plus sign shift register unit 131, an SIG shift register unit 132, an REF shift register unit 133, a DONE shift register unit 134, and a selector 135, all of which have a hardware configuration, and a control unit 136 which performs output switching control and the like with respect to the selector 135 as described later.

In addition, a shift register 130A of three stages is provided in the process bit shift register unit 130, and shift registers 131A to 134A of four stages are provided in the plus sign shift register unit 131, the SIG shift register unit 132, the REF shift register unit 133, and the DONE shift register unit 134, respectively.

Consequently, the SP pass decoding processing unit 121 can store and retain the process bit plane data D35, the plus and minus signs plane data D36, the SIG plane data D30, the REF plane data D31, and the DONE plane data D32 for one sample, which are given from the signal switcher 120 (FIG. 31) sequentially as described above, by an amount of three samples or four samples while shifting the data sequentially in the shift registers 130A to 134A of the bit shift register unit 130, the plus and minus signs shift register unit 131, the SIG shift register unit 132, the REF shift register unit 133, and the DONE shift register unit 134, respectively.

Then, when the symbol data D34 for one symbol is given from the arithmetic decoding unit 113, the SIG shift register unit 132 applies detection processing for finding whether or not conditions for performing the SP pass decoding processing are satisfied to four pixels, which have been shifted to the second stage of the shift register 130A of the process bit shift register unit 130, using the SIG plane data D30 stored and retained in the shift register 132A of the SIG shift register unit 132. Then, the SIG shift register unit 132 outputs a result of the detection to the selector 135.

In addition, in synchronization with the above, the SIG shift register unit 132 calculates a context CX for every four pixels in accordance with the rule described above with reference to FIG. 16 with respect to the four pixels, which have been shifted to the second stage of the shift register 130A of the process bit shift register unit 130, respectively. Then, the SIG shift register unit 132 outputs a result of the calculation to the selector 135.

Then, in this case, if all results of the detection about whether or not the condition for performing the SP pass decoding processing with respect to the four pixels, which have been shifted to the second stage of the shift register 130A of the process bit shift register unit 130, detected by the SIG shift register unit 132 are negative, nothing is outputted from the selector 135. The processing with respect to the process bit plane data D35 for one sample (four pixels), which has been shifted to the second stage of the shift register 130A of the process bit shift register unit 130 ends.

Then, thereafter, the process bit plane data D35 or the like for the next one sample is given to the SP pass decoding processing unit 121 from the signal switcher 120 (FIG. 31) under the control of the control unit 125 in response to a transfer request which is given to the control unit 125 (FIG. 31) of the entire bit demodel unit 114 from the control unit 136. In this way, the SP pas decoding processing unit 121 starts the same processing with respect to the process bit plane data D35 for one sample (four pixels) which has been shifted to the second stage of the process bit shift register unit 130 anew.

On the other hand, if a result of the detection about any one pixel (hereinafter referred to as SP pass decoding processing object pixel) of one sample, which has been shifted to the second stage of the shift register 130A of the process bit shift register unit 130, is affirmative, a data value (0/1) of the symbol data D34, which has been given from the arithmetic decoding unit 113 at this point, is stored in a bit corresponding to the SP pass decoding object image in the shift register 130A of the process bit shift register unit 130. At the same time, a result of the calculation of the context CX about the SP pass decoding processing object pixel outputted from the SIG shift register unit 132 is outputted from the selector 135 and given to the arithmetic decoding unit 113.

In addition, if a data value of the symbol data D34 at this point (decoded value of the SP pass decoding processing object image) is '0', thereafter, on the basis of update information to be given from the selector 135 to the DONE shift register unit 134, a value of a bit of the same coordinates as the SP pass decoding processing object pixel of the DONE plane data D32, which is stored and retained in the shift register 134A of the DONE shift register unit 134, is updated to '1' representing that bit modeling has been completed. Then, the SP pass decoding processing with respect to this SP pass decoding processing object pixel is completed.

On the other hand, if a data value of this symbol data D34 is '1', the information is given to the SIG shift register unit 132, the REF shift register unit 133, and the plus and minus signs shift register unit 131, respectively, and on the other hand, subsequently, the symbol data D34 for one symbol, which is given from the arithmetic decoding unit 113 (FIG. 31), is given to the plus and minus signs shift register unit 131A.

In this case, in the SIG shift register unit 132, a value of a bit of the same coordinates as the SP pass decoding processing object pixel in the SIG plane data D30, which is stored and retained in the shift register 132A of the SIG shift register unit 132, is updated to '1' indicating that the value is "significant". In addition, in the REF shift register unit 133, a value of a bit of the same coordinates as the SP pass decoding processing object pixel in the REF plane data D31, which is stored and retained in the shift register 133A of the REF shift register unit 133, is updated to '1' indicating that the value has changed to "significant".

Moreover, in this case, the plus and minus signs shift register unit 131 decodes plus and minus signs of the SP pass decoding processing object pixel on the basis of a data value (0/1) of the symbol data D34 to be supplied and stores obtained plus and minus signs bit in a position corresponding to the SP pass decoding processing object pixel in the shift register 131A of the plus and minus signs shift register unit 131. On the other hand, the plus and minus signs shift register unit 131 calculates a context CX of the plus and minus signs bit of the SP pass decoding processing object pixel in accordance with the rule described above with reference to FIGS. 17A to 17C. Then, the plus and minus signs shift register unit 131 sends a result of the calculation to the selector 135. In this way, this context CX is given to the arithmetic decoding unit 113 via the selector 135.

Then, thereafter, update information is given to the DONE shift register unit 134 from the selector 135. A value of a bit of the same coordinates as the SP pass decoding processing object pixel in the DONE plane data D32, which has been stored and retained in the shift register 134A of the DONE shift register unit 134, is updated to '1' on the basis of the update information. Then, the SP pass encoding processing with respect to the SP pass encoding processing object pixel is completed.

Then, thereafter, the SP pass decoding processing unit 121 sequentially repeats the same processing every time the symbol data D34 for one symbol is given from the arithmetic decoding unit 113.

In addition, in this case, every time the process bit plane data D35 or the like for one sample is given from the signal switcher 120, the SP pass decoding processing unit 121 gives the process bit plane data D35, which has been stored and retained in the third stage of the shift register 130A of the process bit shift register unit 130, and the plus and minus signs plane data D36, which has been stored and retained in the fourth stage of the shift register 131A of the plus and minus signs shift register unit 131, to the corresponding bit plane buffers 116A and 116B or plus and minus signs buffer 115 via the signal switcher 120, respectively, to be written back to original address positions. On the other hand, the SP pass decoding processing unit 121 gives the SIG plane data D30, the REF plane data D31, and the DONE plane data D32, which are stored and retained in the fourth stages of the shift registers 132A to 134A of the SIG shift register unit 132, the REF shift register unit 133, and the DONE shift register unit 134, respectively, to the corresponding SRAMs 111A and 111B via the signal switch 120, respectively, to be written back to original address positions.

In this way, in the SP pass decoding processing unit 121, the SP pass decoding processing can be performed on the basis of the symbol data D34 which is sequentially given from the arithmetic decoding unit 113.

(2-2-3-2) Structure of the MR Pass Decoding Processing Unit 122

Figure 33:
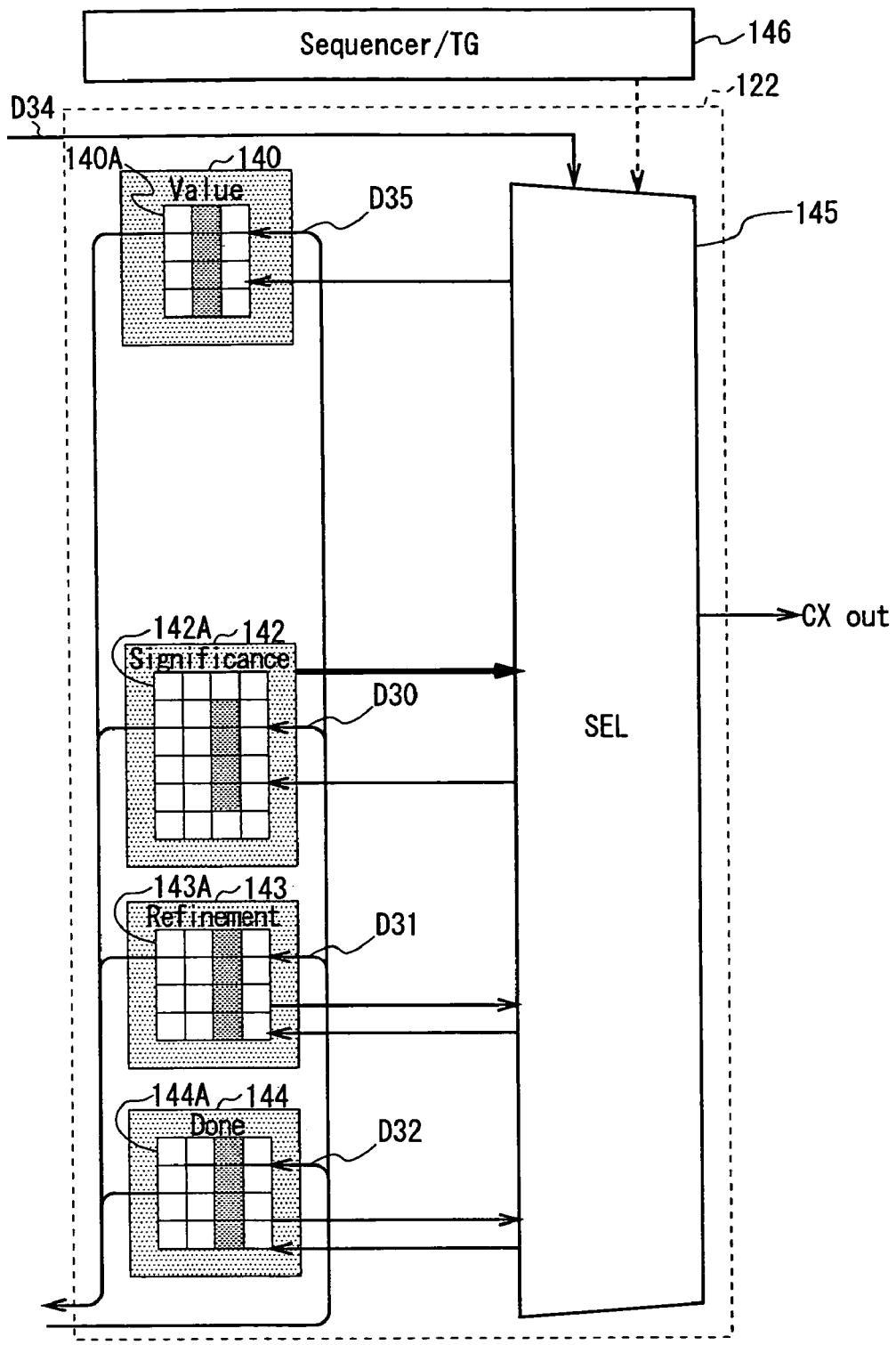
FIG. 33 is a block diagram showing a schematic structure of an MR pass decoding processing unit in the decoding device.

On the other hand, as shown in FIG. 33, the MR pass decoding processing unit 122 includes a process bit shift register unit 140, an SIG shift register unit 142, an REF shift register unit 143, a DONE shift register unit 144, and a selector 145, all of which have a hardware configuration, and a control unit 146 which performs output switching control and the like with respect to the selector 145 as described later.

In addition, a shift register 140A of three stages is provided in the process bit shift register unit 140, and shift registers 142A to 144A of four stages are provided in the SIG shift register unit 142, the REF shift register unit 143, and the DONE shift register unit 144, respectively.

Consequently, the MR pass decoding processing unit 122 can store and retain the process bit plane data D35, the SIG plane data D30, the REF plane data D31, and the DONE plane data D32 for one sample, which are given from the signal switcher 120 (FIG. 31) sequentially as described above, by an amount of three samples or four samples while shifting the data sequentially in the shift registers 140A and 142A to 144A of the process bit shift register unit 140, the SIG shift register unit 142, the REF shift register unit 143, and the DONE shift register unit 144, respectively.

Then, when the symbol data D34 for one symbol is given from the arithmetic decoding unit 113, the REF shift register unit 143 and the DONE shift register unit 144 output the REF plane data D31 or the DONE plane data D32 for one sample, which have been shifted to the second stage of the shift registers 143A and 144A of the REF shift register unit 143 and the DONE shift register unit 144, to the selector 145.

In addition, in this case, the SIG shift register unit 142 calculates a context CX in accordance with the rule described above with reference to FIGS. 19A and 19B with respect to the four pixels, which have been shifted to the second stage of the process bit shift register unit 140, with reference to an output of the REF shift register unit 143 using the SIG plane data D30 stored and retained in the shift register 142A of the SIG shift register unit 142. Then, the SIG shift register unit 142 outputs a result of the calculation to the selector 145.

Then, in this case, if all values of the DONE plane data D32 are '1' (i.e., processed), nothing is outputted from the selector 145. The processing with respect to the process bit plane data D35 for one sample, which has been shifted to the second stage of the shift register 140A of the process bit shift register unit 140, ends.

In addition, if any one data value of the DONE plane data D32 for one sample is '0' (i.e., unprocessed) and a pixel, which has been shifted to the second stage of the shift register 140A of the process bit shift register unit 140 corresponding to the DONE plane data D32 is not "significant", nothing is outputted from the selector 145 either. The processing with respect to the process bit plane data D35 for one sample, which has been shifted to the second stage of the shift register 140A of the process bit shift register unit 140, ends.

Further, in these cases, thereafter, the process bit plane data D35 or the like for the next one sample is given to the MR pass decoding processing unit 122 from the signal switcher 120 (FIG. 31) under the control of the control unit 125 in response to a transfer request which is given to the control unit 125 (FIG. 31) of the entire bit demodel unit 114 from the control unit 146. In this way, the MR pass decoding processing unit 121 starts the same processing with respect to the process bit plane data D35 for one sample (four pixels) which has been shifted to the second stage of the process bit shift register unit 130 anew.

On the other hand, if any one data value of the DONE plane data D32 for one sample is '0', and a pixel, which has been shifted to the second stage of the shift register 140A of the process bit shift register unit 140 corresponding to the DONE plane data D32, is "significant", this means that the pixel (hereinafter referred to as MR pass decoding processing object pixel) is a pixel which should be subjected to MR pass decoding processing.

In this way, in this case, a data value (0/1) of the symbol data D34, which has been given from the arithmetic decoding unit 113 (FIG. 31), is stored in a bit corresponding to the MR pass decoding processing object pixel in the shift register 140A of the process bit shift register unit 140. On the other hand, a result of calculation of a context CX about the MR pass decoding processing object pixel, which has been outputted from the SIG shift register unit 142, is outputted from the selector 145 and given to the arithmetic decoding unit 113.

In addition, in this case, in the REF shift register unit 143, if a bit of the same coordinates as the MR pass decoding processing object pixel is '1' (i.e., a flag is set), this bit is cleared. In the DONE shift register unit 144, a bit of the same coordinates as the MR pass encoding processing object pixel is updated to '1' which means that the MR pass decoding processing object pixel has been processed. The MR pass decoding processing with respect to this MR pass decoding processing object pixel is completed.

Then, thereafter, concerning a remaining pixel shifted to the second stage of the shift register 140A of the process bit shift register unit 140 at that time, if the pixel is a pixel which should be subjected to the MR pass decoding processing, the MR pass decoding processing unit 122 executes the MR pass decoding processing in the same manner as above.

Then, thereafter, the MR pass decoding processing unit 122 sequentially repeats the same processing every time the symbol data D34 for one symbol is given from the arithmetic decoding unit 113.

In addition, in this case, every time the process bit plane data D35 for new four pixels is given to the shift register 140A of the process bit shift register unit 140, the MR pass decoding processing unit 122 gives the process bit plane data D35, which has been stored and retained in the third stage of the shift register 140A of the process bit shift register unit 140, to the corresponding bit plane buffers 116A and 116B via the signal switcher 120 to write back these data to original address positions. On the other hand, the MR pass decoding processing unit 122 gives the SIG plane data D30, the REF plane data D31, and the DONE plane data D32, which are stored and retained in the fourth stages of the shift registers 142A to 144A of the SIG shift register unit 142, the REF shift register unit 143, and the DONE shift register unit 144, respectively, to the corresponding SRAMs 111A and 111B via the signal switch 120, respectively, to write back the data to original address positions.

In this way, in the MR pass decoding processing unit 122, the MR pass decoding processing can be performed on the basis of the symbol data D34 which is given from the arithmetic decoding unit 113.

(2-2-3-3) Structure of the CU Pass Decoding Processing Unit 123

Figure 34:
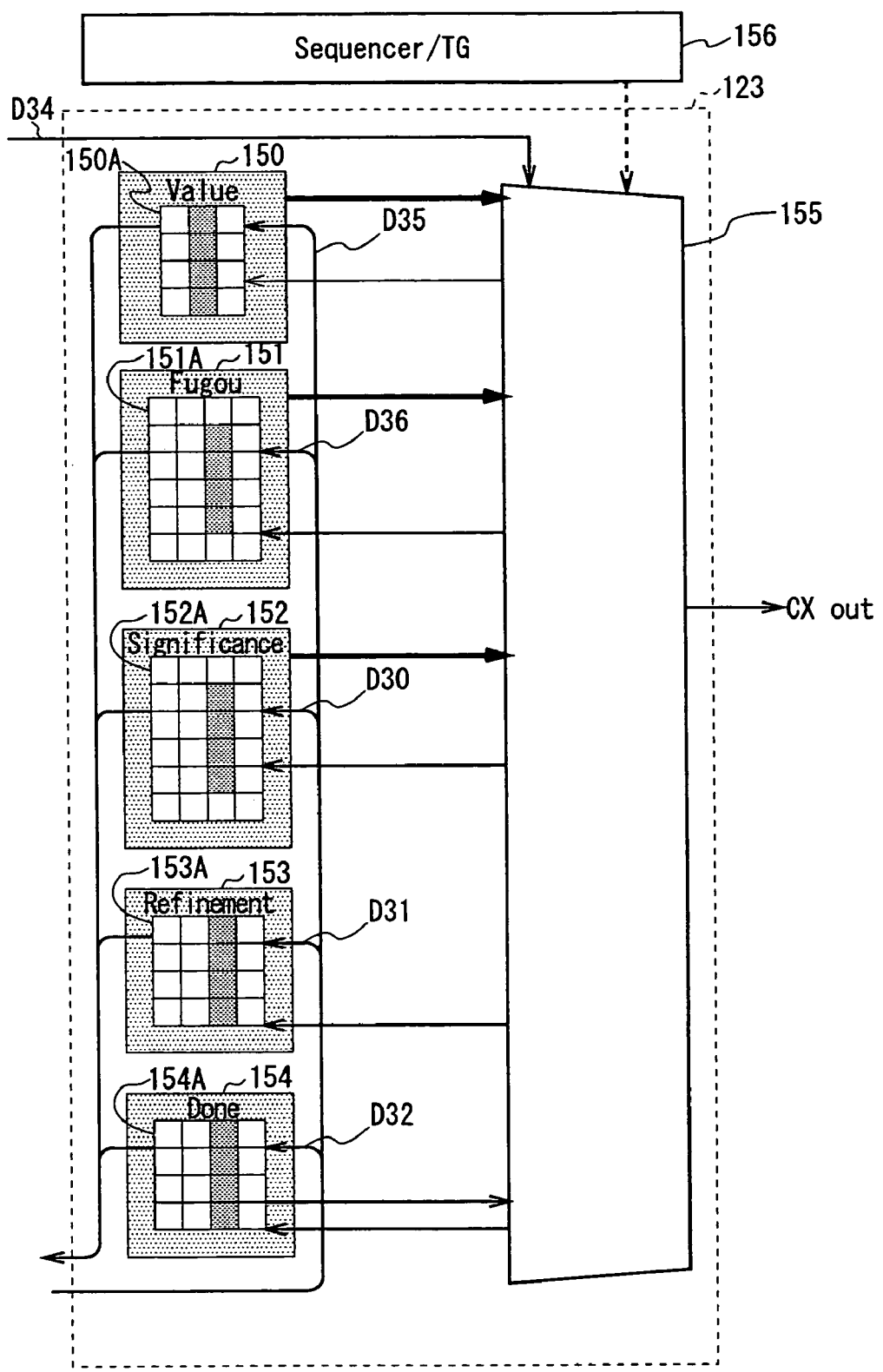
FIG. 34 is a block diagram showing a schematic structure of a CU pass decoding processing unit in the decoding device.

As shown in FIG. 34, the CU pass decoding processing unit 123 includes a process bit shift register unit 150, a plus sign shift register unit 151, an SIG shift register unit 152, an REF shift register unit 153, a DONE shift register unit 154, and a selector 155, all of which have a hardware configuration, and a control unit 156 which performs output switching control and the like with respect to the selector 155 as described later.

In addition, a shift register 150A of three stages is provided in the process bit shift register unit 150, and shift registers 151A to 154A of four stages are provided in the plus sign shift register unit 151, the SIG shift register unit 152, the REF shift register unit 153, and the DONE shift register unit 154, respectively.

Consequently, the CU pass decoding processing unit 123 can store and retain the process bit plane data D35, the plus and minus signs plane data D36, the SIG plane data D30, the REF plane data D31, and the DONE plane data D32 for one sample, which are given from the signal switcher 120 (FIG. 31) sequentially as described above, by an amount of three samples or four samples while shifting the data sequentially in the shift registers 150A to 154A of the process bit shift register unit 150, the plus sign shift register unit 151, the SIG shift register unit 152, the REF shift register unit 153, and the DONE shift register unit 154, respectively.

Then, when the symbol data D34 for one symbol is given from the arithmetic decoding unit 113, the SIG shift register unit 152 detects whether or not four pixels, which has been shifted to the second stage of the shift register 130A of the process bit shift register unit 130, satisfy conditions for performing the run-length processing using the SIG plane data D30, which has been stored and retained in the shift register 152A of the SIG shift register unit 152, and the DONE plane data D32, which has been stored and retained in the shift register 154A of the DONE shift register unit 154.

Then, if such four pixels do not satisfy the conditions for performing the run-length processing, the SP pass decoding processing is sequentially applied to the four pixels, respectively.

On the other hand, if such four pixels satisfy the conditions for performing the run-length processing, and when a data value of the symbol data D34 for one symbol given from the arithmetic decoding unit 113 (FIG. 31) at this point is '0', '0' is stored in first to fourth bits of the second stage in the shift register 150A of the process bit shift register 150, respectively. In addition, at the same time, a context CX ("run") corresponding to this is outputted from the SIG shift register unit 152. This context CX is given to the arithmetic decoding unit 113 (FIG. 31) via the selector 155, and the processing with respect to the process bit plane data D35 for one sample (four pixels), which has been shifted to the second stage of the shift register 150A of this process bit shift register unit 150, is completed.

In addition, if such four pixels satisfy the conditions for performing the run-length processing, and when a data value of the symbol data D34 for one symbol given from the arithmetic decoding unit 113 at this point is '1', thereafter, processing opposite to the processing described above with reference to FIGS. 21A to 21D is performed according to a data value of the symbol data D34 for two symbols to be given from the arithmetic decoding unit 113.

More specifically, if data values of the symbol data D34 for two symbols given from the arithmetic decoding unit 113 are '0, 0', '0' is stored in a top bit in the second stage in the shift register 150A of the process bit shift register unit 150. If the data values are '0, 1', '0' or '1' is stored in first and second bits in the second stage in the shift register 150A of the process bit shift register unit 150, respectively. In addition, if the data values of the symbol data D34 for the two symbols given from the arithmetic decoding unit 113 are '1, 0', '0', '0' or '1' is stored in first to third bits in the second stage in the shift register 150A of the process bit shift register unit 150, respectively. If the data values are '1, 1', '0', '0', '0' or '1' is stored in first to fourth bits in the second stage in the shift register 150A of the process bit shift register unit 150, respectively. Moreover, at the same time, a context CX "uniform" is outputted from the SIG shift register unit 152 twice and is given to the arithmetic decoding unit 113 via the selector 155.

Moreover, at this point, in the SIG shift register unit 152, a value of a bit of the same coordinates as a pixel in which '1' is stored (hereinafter referred to as CU pass decoding processing object pixel) of the shift register 150A of the process bit shift register unit 150 at this point in the second stage of the shift register 152A of the SIG shift register unit 152 is updated to '1' indicating "significant". In addition, in the REF shift register unit 153, a value of a bit of the same coordinates as the CU pass decoding processing object pixel in the REF plane data D31, which is stored and retained in the shift register 153A of the REF shift register unit 153, is updated to '1' indicating that the value has changed to "significant".

Moreover, thereafter, the symbol data D34 for one symbol, which is given from the arithmetic decoding unit 113, is given to the plus and minus signs shift register unit 151. Then, in the plus and minus signs shift register unit 151, plus and minus signs of such a CU pass decoding processing object pixel are calculated on the basis of this symbol data D34, and a context CX of the CU pass decoding processing object pixel is calculated in accordance with the rule described above with reference to FIGS. 17A to 17C. The calculated plus and minus signs are stored in a bit of the same coordinates as the CU pass decoding processing object pixel in the shift register 151A of the plus and minus signs shift register unit 151. The context CX is outputted to the arithmetic decoding unit 113 via the selector 155.

Then, thereafter, update information is given to the DONE shift register unit 154 from the selector 155. A value of a bit of the came coordinates as the CU pass decoding processing object pixel in the DONE plane data D32, which is stored and retained in the shift register 154A of the DONE shift register unit 154, is updated to '1'. Then, the CU pass decoding processing with respect to the CU pass decoding processing object pixel is completed.

Moreover, thereafter, concerning each pixel lower in a scanning order in a bit plane than the CU pass decoding processing object pixel in the same sample (one sample stored and retained in the second stage of the shift register 150A of the process bit shift register unit 150 at this point), the CU pass decoding processing unit 123 executes the CU pass decoding processing while sequentially updating the SIG plane data D30, the REF plane data D31, and the DONE plane data D32, which are stored and retained in the shift registers 150A to 154A of the SIG shift register unit 152, the REF shift register unit 153, and the DONE shift register unit 154, respectively, as required. Then, when such processing is finished for all the pixels in the sample, the CU pass decoding processing unit 123 completes the CU pass decoding processing with respect to the sample.

Then, thereafter, the CU pass decoding processing unit 123 repeats the same processing every time the symbol data D34 for one symbol is given from the arithmetic decoding unit 113.

In addition, in this case, every time the process bit plane data D35 or the like for one sample is given from the signal switcher 120, the CU pass decoding processing unit 123 gives the process bit plane data D35, which has been stored and retained in the third stage of the shift register 150A of the process bit shift register unit 150, and the plus and minus signs plane data D36, which has been stored and retained in the fourth stage of the shift register 151A of the plus and minus signs shift register unit 151, to the corresponding bit plane buffers 116A and 116B or plus and minus sign buffer 115 via the signal switcher 120, respectively, to write back these data to original address positions. On the other hand, the CU pass decoding processing unit 123 gives the SIG plane data D30, the REF plane data D31, and the DONE plane data D32, which have been stored and retained in the fourth stages of the shift registers 152A to 154A of the SIG shift register unit 152, the REF shift register unit 153, the DONE shift register unit 154, respectively, to the corresponding SRAMs 111A and 111B via the signal switcher 120, respectively, to write back the data to original address positions.

In this way, in the CU pass decoding processing unit 123, the CU pass decoding processing can be performed on the basis of the symbol data D34 which is sequentially given from the arithmetic decoding unit 113.

(2-3) Operations and Effects of the First Embodiment

In the above structure, in the encoding device 42 and the decoding device 100 according to this embodiment, encoding processing and decoding processing are performed so as to sequentially read only necessary parts out of the SIG plane data D22 and D30, the REF plane data D23 and D31, and the DONE plane data D24 and D32, which are stored and retained in the SRAMs 52A, 52B, 111A and 111B, in the SP pass encoding processing unit 61, the MR pass encoding processing unit 62, the CU pass encoding processing unit 63, the SP pass decoding processing unit 121, the MR pass decoding processing unit 122, and the CU pass decoding processing unit 123, and while performing encoding of the process bit plane data D21 or decoding processing of the encoded data D11, update the SIG plane data D22 and D30, the REF plane data D23 and D31, the DONE plane data D24 and D32 according to a processing state of the encoding processing or the decoding processing and, then, writing back the data to the SRAMs 52A, 52B, 111A and 111B.

Therefore, in the encoding device 42 and the decoding device 100, accessibility to the SIG plane data D22 and D30, the REF plane data D23 and D31, and the DONE plane data D24 and D32 in encoding the process bit plane data D21 or subjecting the encoded data D11 to encoding processing or decoding processing can be improved. In addition, speed-up of processing can be realized by such pipeline processing.

In this case, in the encoding device 40 and the decoding device 100, at the time of encoding processing such as SP pass encoding processing and at the time of decoding processing such as SP pass decoding processing, with four pixels constituting one stripe column of the process bit plane 22 as one sample, processing is performed by a unit of the sample. Thus, the processing can be sped up remarkably compared with the case in which the encoding processing or the decoding processing is performed by a unit of one pixel. Actually, although depending upon data, speed four times as high in an optimistic case and speed one time as high in a pessimistic case can be secured compared with the case in which processing is performed by a unit of one pixel.

In addition, in this case, in the encoding device 40 and the decoding device 101, the DRAMs 41 and 102, which store and retain the code block data D4 of an encoding object and the partially decoded code block data D14, are provided outside the devices so as to store and retain only a part of the data necessary for encoding or decoding in the SRAMs (bit plane buffers 51A, 51B, 116A and 116B) in the inside of the devices. Thus, accessibility to the code block data D4 of an encoding object and the partially decoded code block data D14 can also be improved. In addition, it is practically possible to sufficiently cope with formation of the encoding device 40 and the decoding device 101 as integrated circuits.

According to the above structure, encoding processing and decoding processing are performed so as to sequentially read only necessary parts out of the SIG plane data D22 and D30, the REF plane data D23 and D31, and the DONE plane data D24 and D32, which are stored and retained in the SRAMs 52A, 52B, 111A and 111B, in the SP pass encoding processing unit 61, the MR pass encoding processing unit 62, the CU pass encoding processing unit 63, the SP pass decoding processing unit 121, the MR pass decoding processing unit 122, and the CU pass decoding processing unit 123, and while performing encoding processing of the process bit plane data D21 or decoding processing of the encoded data D11, update the SIG plane data D22 and D30, the REF plane data D23 and D31, the DONE plane data D24 and D32 according to a processing state of the encoding processing or the decoding processing and, then, writing back the data to the SRAMs 52A, 52B, 111A and 111B. Accessibility to the SIG plane data D22 and D30, the REF plane data D23 and D31, and the DONE plane data D24 and D32 in encoding the process bit plane data D21 or subjecting the encoded data D11 to encoding processing or decoding processing can be improved. In addition, speedup of processing can be realized by such pipeline processing.

Figure 35:
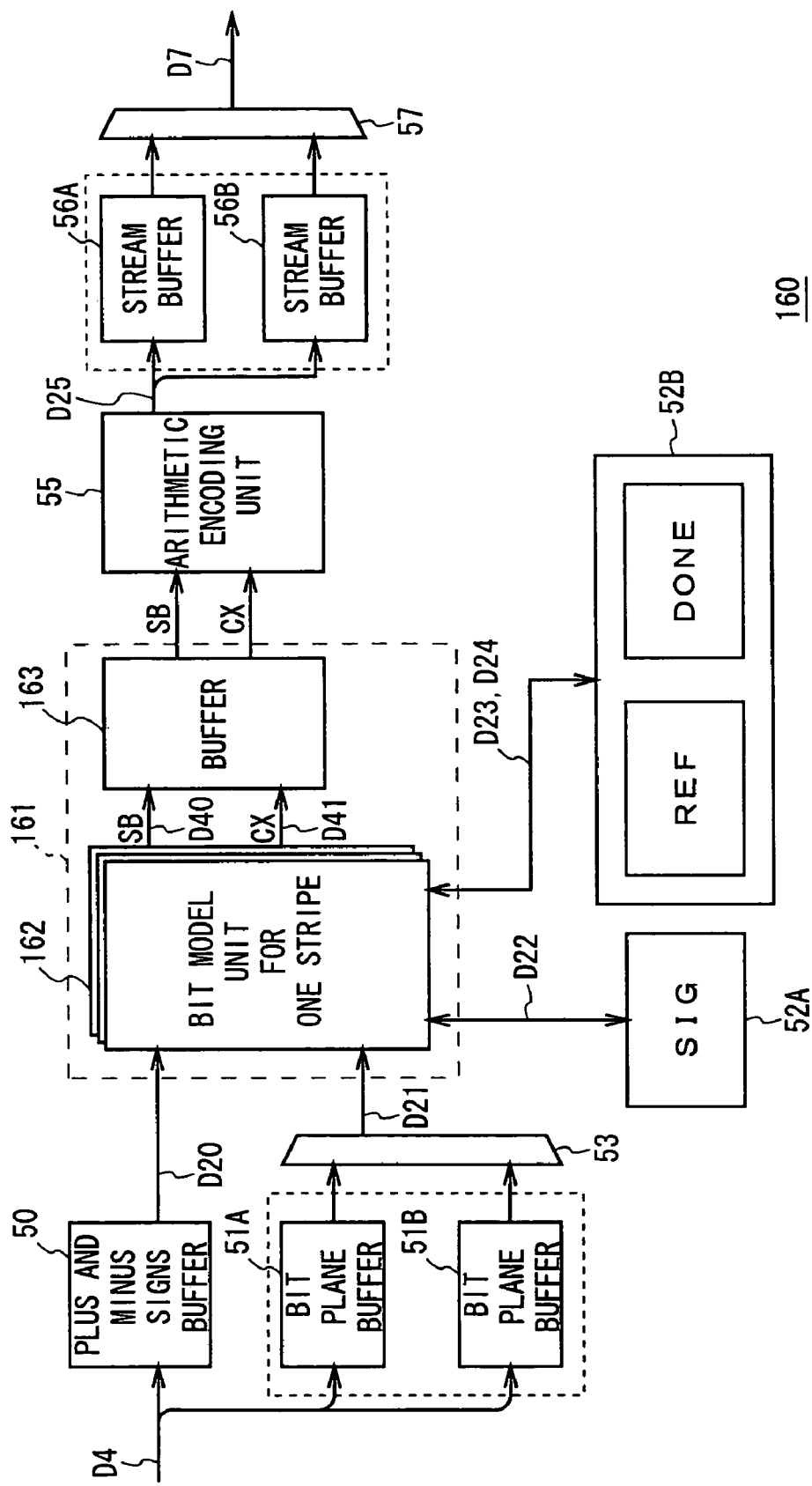
FIG. 35 is a block diagram showing a structure of an EBCOT block of an encoding device according to a second embodiment.

(3) Second Embodiment (3-1) Structure of an Encoding Device According to the Second Embodiment FIG. 35, in which components corresponding to those in FIG. 23 are denoted by the same reference numerals and signs, shows an EBCOT block 160 according to a second embodiment. This EBCOT block 160 is applied instead of the EBCOT block 42 of the encoding device 40 according to the first embodiment described above with reference to FIG. 22. The EBCOT block 160 is constituted in the same manner as the EBCOT block 42 according to the first embodiment except that a structure of a bit model unit 161 is different.

Actually, the bit model unit 161 includes a bit model unit 162 for one stripe, which has the same hardware configuration as the bit model unit 54 of the EBCOT block 42 according to the first embodiment shown in FIG. 24, and a buffer 163. Further, the bit model unit for one stripe 162 is provided in the same number as the number of stripes of the process bit plane 22 (FIG. 13) in association with a code block size decided in advance.

Figure 36:
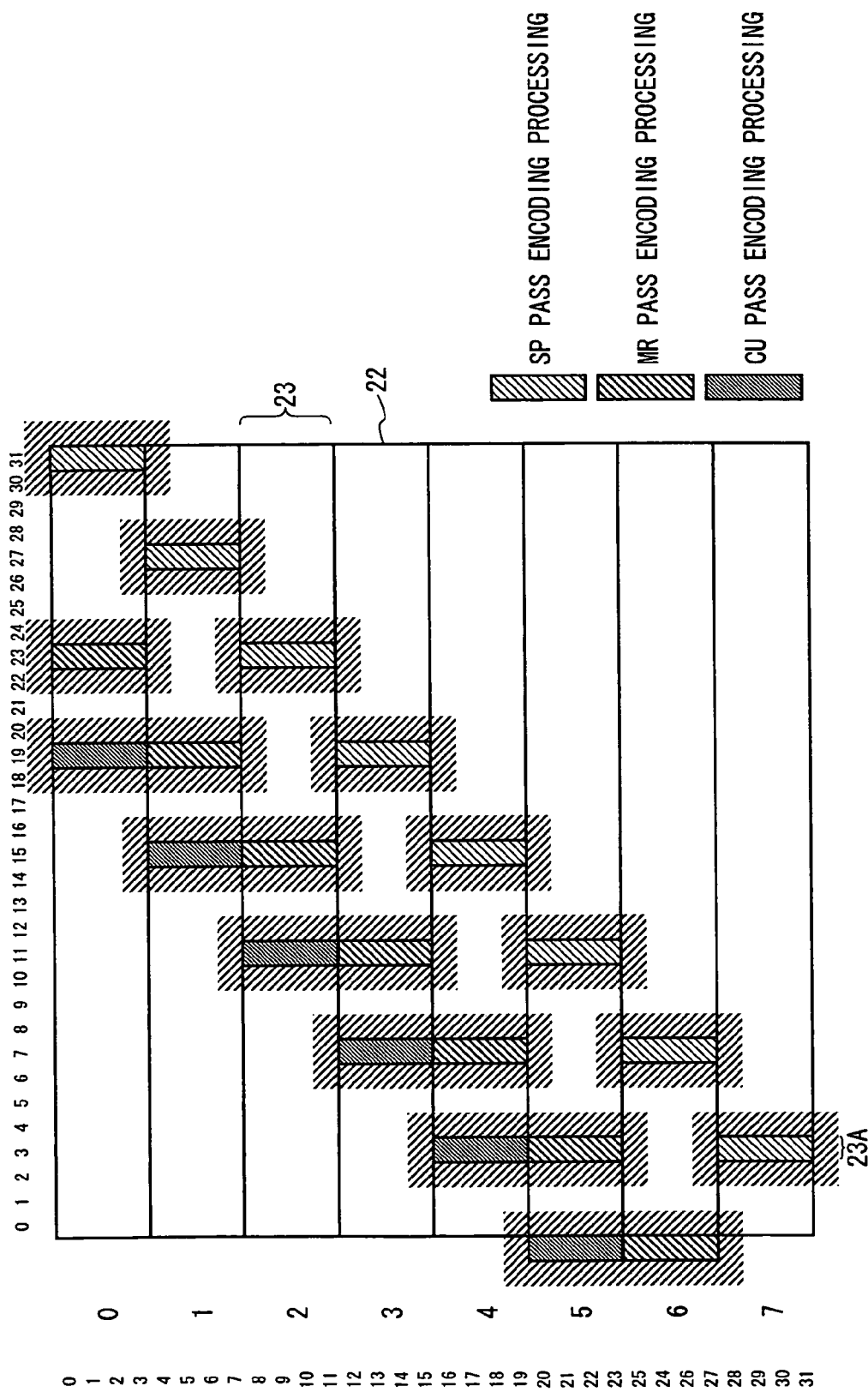
FIG. 36 is a conceptual diagram served for explanation of a phase difference of SP pass encoding processing, MR pass encoding processing, and CU pass encoding processing in the second embodiment.

In this case, stripes 23 (FIG. 36) in the process bit plane 22 different from each other are allocated to these bit model units for one stripe 162. As shown in FIG. 36, these bit model units for one stripe 162 are adapted such that, for the respective allocated stripes 23, SP pass encoding processing, MR pass encoding processing, and CU pass encoding processing are performed for one stripe in parallel by the SP pass encoding processing unit 61 (FIG. 24), the MR pass encoding processing unit 62 (FIG. 24), and the CU pass encoding processing unit 63 (FIG. 24) while keeping a fixed phase difference, respectively.

Figure 37:
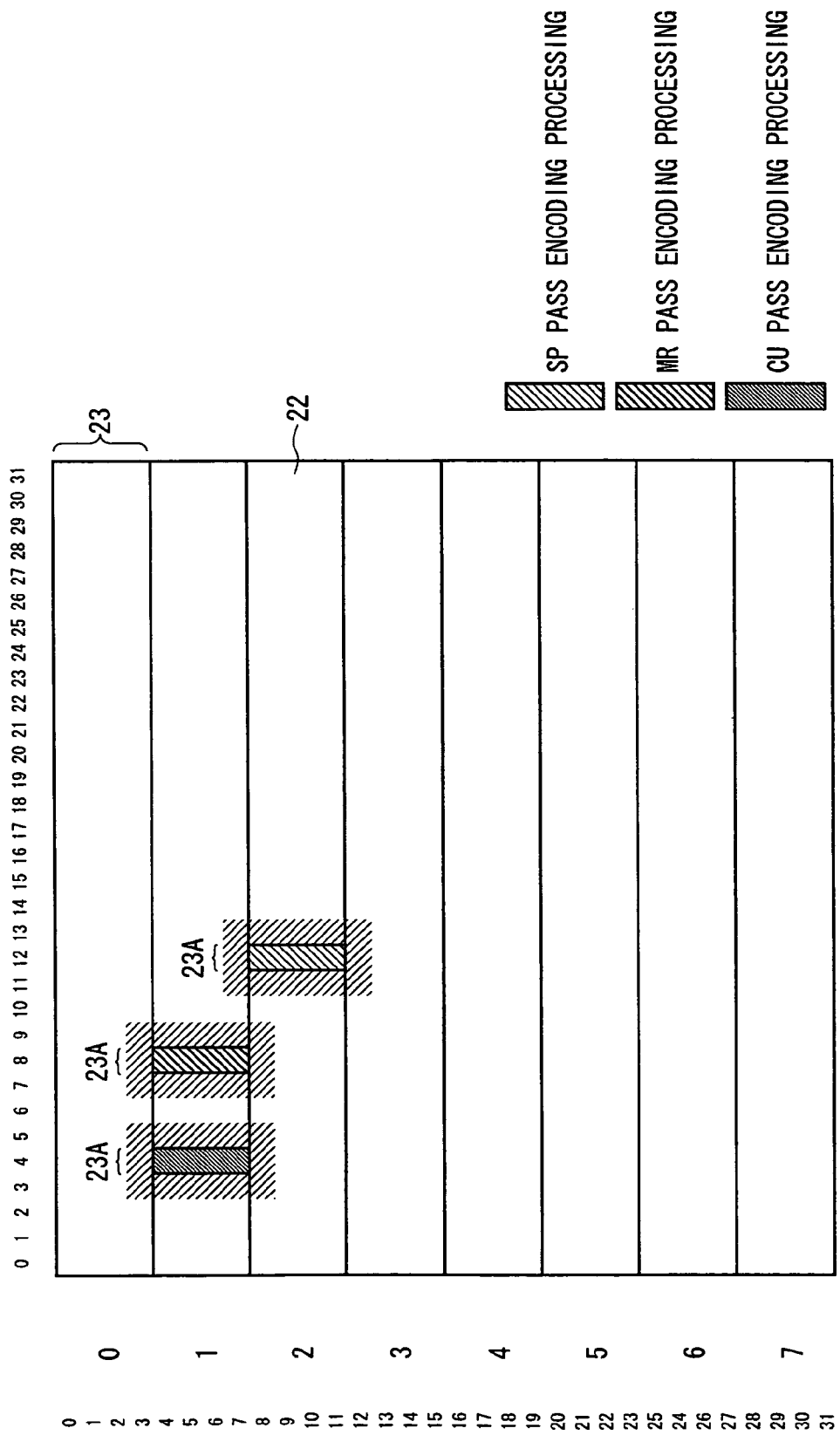
FIG. 37 is a conceptual diagram served for explanation of another embodiment.

More specifically, as it is evident from FIG. 37, starting from the SP pass encoding processing by the SP pass encoding processing unit 61, the respective bit model units for one stripe 162 start the MR pass processing by the MR pass encoding processing unit 62 with respect to the stripe 23 at timing at which the SP pass encoding processing unit 61 starts the SP pass encoding processing with respect to the eighth stripe column 23A in the stripe 23 (i.e., starts the MR pass processing with a phase delayed by an amount of eight stripe columns from the SP pass encoding processing). Then, the respective bit model units for one stripe 162 start the CU pass processing by the CU pass encoding processing unit 63 with respect to the same stripe 23 at timing at which the MR pass encoding processing unit 62 starts the MR pass encoding processing with respect to the fourth stripe column 23A in the strip 23 (i.e., starts the CU pass processing with a phase delayed by an amount of four stripe column from the MR pass processing).

Note that such a phase difference of the SP pass encoding processing, the MR pass encoding processing, and the CU pass encoding processing by the SP pass encoding processing unit 61, the MR pass encoding processing unit 62, and the CU pass encoding processing unit 63 is controlled by the control unit 165 (FIG. 24) in the bit model unit for one stripe 162.

Moreover, in the bit model unit 161, start timing of the CBM processing by the bit model unit for one stripe 163 is controlled by a not shown control unit for managing operation control for the entire bit model unit 161.

More specifically, as shown in FIG. 36, the start timing of the CBM processing (the SP pass encoding processing, the MR pass encoding processing, and the CU pass encoding processing) of the respective bit model units for one stripe 162 is controlled such that the bit model unit for one stripe 162, to which the stripe 23 of the next stage is allocated, starts the SP pass encoding processing with respect to the stripe 23 at timing at which the bit model unit for one stripe 162, to which the stripe 23 of the upper stage is allocated, starts the SP pass encoding processing with respect to the fourth stripe column 23A of the stripe 23.

On the other hand, symbol data D40 consisting of respective symbols SB obtained by the CBM processing, which are outputted from the bit model units for one strip 162, and context data D41 consisting of respective contexts CX are given to the buffer 163 in the later stage, respectively. In this case, the respective bit model units for one stripe 162 stores the process bit plane data D42 and the context data D40, which are obtained by the SP pass encoding processing, the MR pass encoding processing, and the CU pass encoding processing, respectively, in storage areas for the SP pass encoding processing, the MR pass encoding processing, or the CU pass encoding processing in the buffer 163, respectively.

As a result, the symbol data D40 and the context data D41 outputted from the bit mode units for one strip 162 are collectively retained in the buffer 163 for each of the SP pass encoding processing, the MR pass encoding processing, and the CU pass encoding processing in this order and, in the same SP pass encoding processing, MR pass encoding processing, and CU pass encoding processing, in an order of stripes in the process bit plane 22. Then, thereafter, the symbol data D40 and the context data D41 stored and retained in this buffer 163 are sequentially read out by the arithmetic coding unit 55 in that order.

In this way, in this EBCOT block 160, the CBM processing can be performed in parallel for each of the SP pass encoding processing, the MR pass encoding processing, and the CU pass encoding processing. In addition, the SP pass encoding processing, the MR pass encoding processing, and the CU pass encoding processing can also be performed in parallel for each of the stripes 23.

(3-2) Operations and Effects of the Second Embodiment

In the above structure, in the EBCOT block 160 according to the second embodiment, the CBM processing is performed in parallel for each of the SP pass encoding processing, the MR pass encoding processing, and the CU pass encoding processing. In addition, the SP pass encoding processing, the MR pass encoding processing, and the CU pass encoding processing are performed in parallel for each of the stripes 23.

Therefore, in the EBCOT block 160 according to the second embodiment, the CBM processing can be performed at higher speed compared with the EBCOT block 42 mounted to the encoding device 40 (FIG. 22) according to the first embodiment.

Actually, for example, in the case in which a bit plane size is 32 pixels×32 pixels, compared with the EBCOT block 42 mounted to the encoding device 40 according to the first embodiment, process speed can be reduced to as low as about 2/24 (=(1+1)/8×3).

According to the above structure, the CBM processing is performed in parallel for each of the SP pass encoding processing, the MR pass encoding processing, and the CU pass encoding processing, and the SP pass encoding processing, the MR pass encoding processing, and the CU pass encoding processing are also performed in parallel for each of the stripes 23. Consequently, an encoding device, which can perform the CBM processing at higher speed, can be realized.

(4) Other Embodiments

Note that, the first and the second embodiments describe the case in which the present invention is applied to the encoding device 40 (FIG. 22) or the decoding device 100 (FIG. 30) abiding by the JPEG 2000 standard. However, the present invention is not limited to this case but can be applied to encoding devices and decoding devices abide by other image formats. In short, the present invention can be widely applied to other various encoding devices, decoding devices, image information processing systems, and the like which can handle image information.

In addition, the first and the second embodiments describe the case in which the SRAMs (the bit plane buffers 51A and 51B (FIG. 23) or the stream buffers 110A and 110B (FIG. 30) and the bit plane buffers 116A and 116B (FIG. 30)) are applied as storing means for storing the process bit plane data D21 or the encoding data D11 which are image information of encoding or decoding objects. However, the present invention is not limited to this case, and other various storage media can be applied widely.

Similarly, the first and the second embodiments describe the case in which the SRAMs 52A, 52B, 111A and 111B are applied as storing means for storing the SIG plane data D22 and D30, the REF plane data D23 and D31, and the DONE plane data D24 and D32 which are state quantity information representing predetermined state quantity which is used, when the bit model units 54 and 161 and the bit demodel unit 114 apply encoding or decoding processing to the process bit plane data D21 or the encoded data D11, while being sequentially updated according to the encoding or decoding processing. However, the present invention is not limited to this case, and other various storage medium, for example, a memory other than an SRAM, a disk-like storage medium such as hard disk other than a memory, and the like can be widely applied.

Moreover, the first and the second embodiments described the case in which the bit model units 54 (FIG. 23) and 161 (FIG. 35) serving as encoding means, which applies encoding processing to the process bit plane data D21 stored in the bit plane buffers 51A and 51B, is constituted as shown in FIG. 24. However, the present invention is not limited to this case, and other various structures can be widely applied.

In this case, the first embodiment describes the case in which the SP pass encoding processing unit 61, the MR pass encoding processing unit 62, and the CU pass encoding processing unit 63 are provided in the bit model unit 54 in association with the SP pass encoding processing, the MR pass encoding processing, and the CU pass encoding processing, respectively. However, the present invention is not limited to this case, and the bit model unit 54 may be constituted by one coding pass processing unit which can perform the SP pass encoding processing, the MR pass encoding processing, and the CU pass encoding processing.

Similarly, the second embodiment describes the case in which the bit demodel unit 114 (FIG. 30) serving as decoding means, which applies decoding processing to the encoded data D11 serving as encoded image information consisting of encoded image information to be inputted, is constituted as shown in FIG. 31. However, the present invention is not limited to this case, and various structures can be widely applied.

In this case, the first embodiment describes the case in which the SP pass decoding processing unit 121, the MR pass decoding processing unit 122, and the CU pass decoding processing unit 123 are provided in the bit demodel unit 114 in association with the SP pass decoding processing, the MR pass decoding processing, and the CU pass decoding processing, respectively. However, the present invention is not limited to this, and the bit demodel unit 114 may be constituted by one coding pass processing unit which can perform the SP pass decoding processing, the MR pass decoding processing, and the CU pass decoding processing.

In addition, the first and the second embodiments describe the case in which the SP pass encoding processing unit 61 or the like of the bit model unit 54 (FIG. 24), the SP pass decoding processing unit 121 or the like of the bit demodel unit 114 (FIG. 31), and the respective bit model units for one stripe 162 of the bit model unit 161 (FIG. 35) perform the SP pass encoding processing or the like and the SP pass decoding processing or the like with four pixels constituting one stripe column as a unit. However, the present invention is not limited to this, and such SP pass encoding processing or the like and SP pass decoding processing or the like may be performed with plural pixels other than four pixels constituting one stripe column as a unit.

Further, the first and the second embodiments describe the case in which, in the bit model units 54 and 161 or the bit demodel unit 114, temporary storing means, which temporarily stores the process bit plane data D21 and D35 read out from the bit plane buffers 51A and 51B or the bit plane buffers 116A and 116B, and temporary storing means, which temporarily stores the SIG plane data D22 and D30, the REF plane data D23 and D31, and the DONE plane data D24 and D32 read out from the SRAMs 52A, 52B, 111A and 111B, are constituted by shift registers 70A to 74A, 80A to 84A, 90A to 94A, 130A to 134A, 140A to 144A, and 150A to 154A. However, the present invention is not limited to this case, and other various types of storage media can be widely applied.

Moreover, the first and the second embodiments describe the case in which the encoding device 40 and the decoding device 100 are constituted as ICs as a whole, the DRAMs 41 (FIG. 22) and 102 (FIG. 29) serving as external storing means are provided outside the ICs, and the code block data D4 (FIG. 22) and D14 (FIG. 29), which are outputted from the quantization unit 4 (FIG. 22) and the EBCOT block 101 (FIG. 29) serving as signal processing units in side the ICs, are stored in the DRAMs 41 and 102. However, the present invention is not limited to this, and memories other than DRAMs and other external storage medium other than memories can be widely applied as the external storing means.

Furthermore, the first embodiment describes the case in which one SP pass encoding processing unit 61, one MR pass encoding processing unit 62, and one CU pass encoding processing unit 63 are provided inside the bit model unit 54 are provided (FIG. 24). However, the present invention is not limited to this case, and the SP pass encoding processing unit 61, the MR pass encoding unit 62, the CU pass encoding processing unit 63 may be provided in plural form inside the bit model unit 54, respectively, such that the SP pass encoding processing is performed by the plural SP pass encoding processing units 61 in parallel at the time of the SP pass encoding processing, the MR pass encoding processing is performed by the plural MR pass encoding processing units 62 in parallel at the time of the MR pass encoding processing, and the CU pass encoding processing is performed by the plural CU pass encoding processing units 63 in parallel at the time of the CU pass encoding processing.

Figure 39:
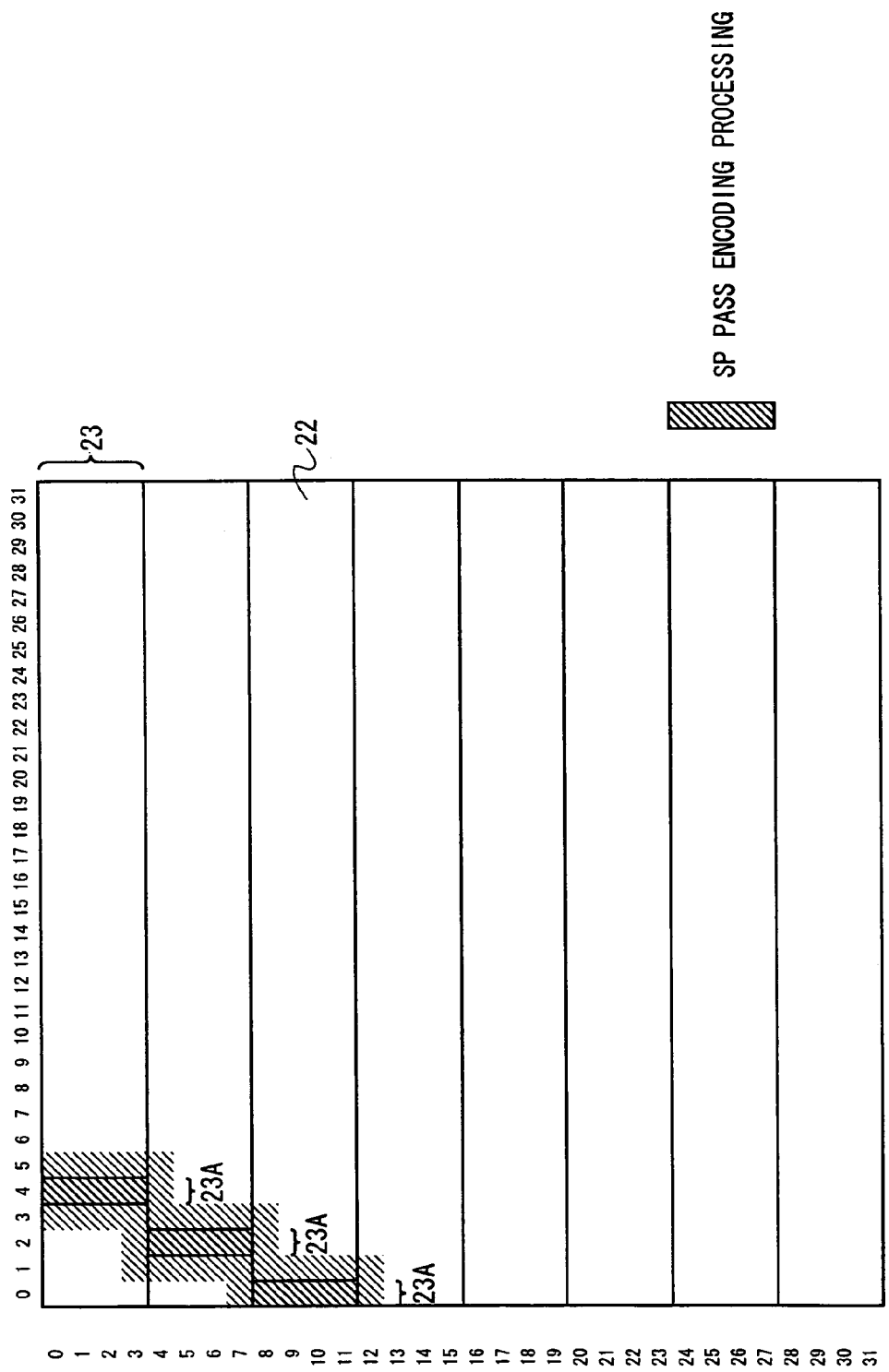
FIG. 39 is a conceptual diagram served for explanation of another embodiment.

In this case, as a phase difference of the SP pass encoding processing by the respective SP pass encoding processing units 61 at the time of the SP pass encoding processing, a phase difference of the MR pass encoding processing by the respective MR pass encoding processing units 62 at the time of the MR pass encoding processing, and a phase difference of the CU pass encoding processing by the respective CU pass encoding processing unit 63 at the time of the CU pass encoding processing, for example, as shown in FIG. 39, it is sufficient that, with respect to the SP pass encoding processing unit 61 or the like which performs the SP pass encoding processing or the like for the stripe 23 of an upper stage in the process bit plane 22, the SP pass encoding processing unit 61 or the like, which performs the SP pass encoding processing or the like for the stripe 22 of the next stage, performs the SP pass encoding processing or the like with a phase delayed by at least two stripe columns.

Figure 40:
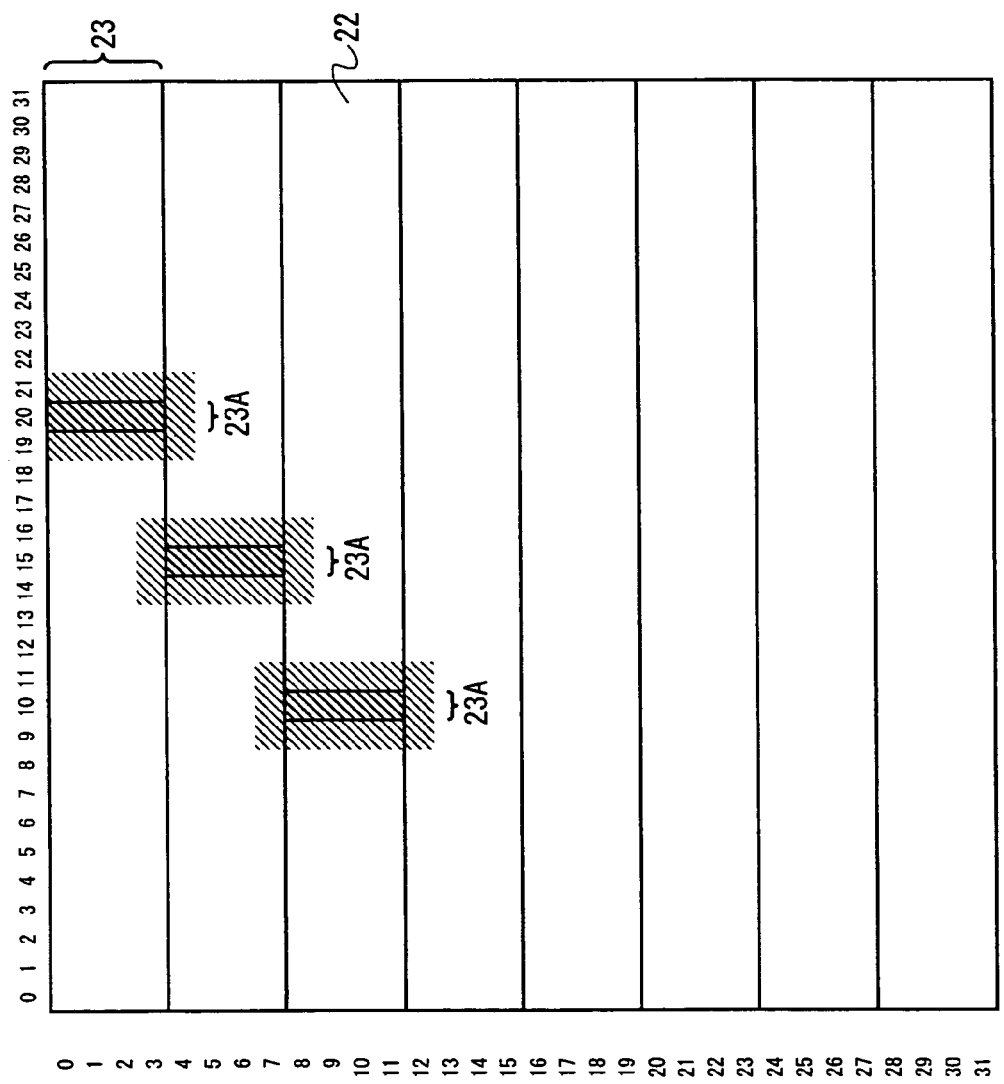
FIG. 40 is a conceptual diagram served for explanation of another embodiment.

In addition, in the case in which reading from and writing in the SRAMs 52A and 52B (FIG. 24) of the SIG plane data D22 (FIG. 24) are taken into account, for example, as shown in FIG. 40, it is sufficient that, with respect to the SP pass encoding processing unit 61 or the like which performs the SP pass encoding processing or the like for the stripe 23 of an upper stage in the process bit plane 22, the SP pass encoding processing unit 61 or the like, which performs the SP pass encoding processing or the like for the stripe 22 of the next stage, performs the SP pass encoding processing or the like with a phase delayed by five stripe columns. As processing timing of the respective SP pass encoding processing unit 61 or the like in the case in which the SP pass encoding processing or the like is performed in parallel (a phase difference at the time when the respective SP pass encoding processing unit 61 or the like performs the SP pass encoding processing or the like), other various processing timing can be applied widely.

Further, the second embodiment describes the case in which a phase difference of the SP pass encoding processing, the MR pass encoding processing, and the CU pass encoding processing in the bit model unit 161 (FIG. 35) is set as shown in FIG. 36. However, the present invention is not limited to this case. For example, as shown in FIG. 37, it is also possible that the MR pass encoding processing is delayed by one stripe and four stripe columns with respect to the SP pass encoding processing, and the CU pass encoding processing is delayed by four stripe columns with respect to the MR pass encoding processing.

Figure 38:
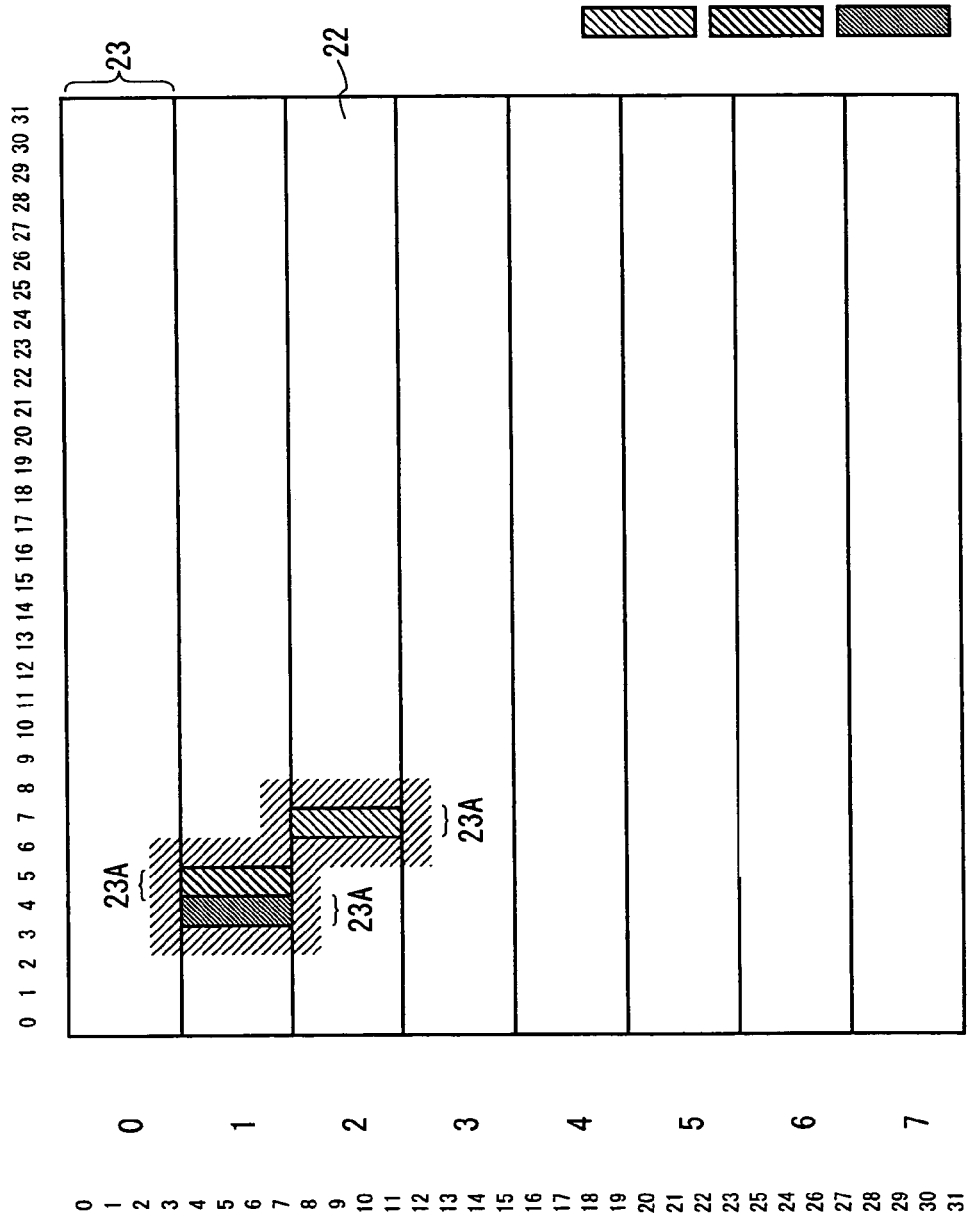
FIG. 38 is a conceptual diagram served for explanation of another embodiment.

Other than the above, for example, as shown in FIG. 38, it is also possible that the MR pass encoding processing is delayed by one stripe and two stripe columns with respect to the SP pass encoding processing, and the CU pass encoding processing is delayed by one stripe column with respect to the MR pass encoding processing. As a phase difference of the SP pass encoding processing, the MR pass encoding processing, and the CU pass encoding processing in the case in which the SP pass encoding processing, the MR pass encoding processing, and the CU pass encoding processing are performed in parallel, other phase differences can be widely applied.

Moreover, the second embodiment describes the case in which the bit mode unit for one stripe 162 (FIG. 35) is provided in the same number as the number of stripes of the process bit plane 22 (FIG. 13). However, the present invention is not limited to this case. In short, the bit model unit for one stripe 162 of the number different from the number of the strips 23 of the process bit plane 22 may be provided as long as the SP pass encoding processing, the MR pass encoding processing, and the CU pass encoding processing can be performed in parallel.

As described above, according to the present invention, there is provided an encoding device for encoding image information to be inputted. The encoding device includes: encoding means which applies predetermined encoding processing to the image information; and first storing means which, when the encoding means applies the encoding processing to the image information, stores state quantity information representing a predetermined state quantity which is used while being sequentially updated according to a processing state of the encoding processing. The encoding means reads out only a necessary part of the state quantity information, which is stored in the first storing means, from the first storing means and changes the state quantity information according to the processing state of the encoding processing with respect to the image information, and then writes back the state quantity information to the first storing means. Consequently, accessibility to the state quantity information at the time when the image information is subjected to the encoding processing can be improved. In this way, an encoding device which can speed up encoding processing can be realized.

According to the present invention, there is provided an encoding method of encoding image information to be inputted. The encoding method includes: a first step of, when predetermined encoding processing is applied to image information, storing state quantity information representing a predetermined state quantity, which is used while being sequentially updated according to a processing state of the encoding processing, in first storing means; and a second step of applying encoding processing to the image information. In the second step, only a necessary part of the state quantity information, which is stored in the first storing means, is read out from the first storing means, and the state quantity information is changed according to the processing state of the encoding processing with respect to the image information, and then the state quantity information is written back to the first storing means. Consequently, accessibility to the state quantity information at the time when the image information is subjected to the encoding processing can be improved. In this way, an encoding method which can speed up encoding processing can be realized.

According to the present invention, there is provided a decoding device for decoding encoded image information consisting of encoded image information to be inputted. The decoding device includes: decoding means which applies predetermined decoding processing to the encoded image information; and first storing means which, when the decoding means applies the decoding processing to the encoded image information, stores state quantity information representing a predetermined state quantity which is used while being sequentially updated according to a processing state of the decoding processing. The decoding means reads out only a necessary part of the state quantity information, which is stored in the first storing means, from the first storing means and changes the state quantity information according to the processing state of the decoding processing with respect to the encoded image information, and then writes back the state quantity information to the first storing means. Consequently, accessibility to the state quantity information at the time when the image information is subjected to the decoding processing can be improved. In this way, a decoding device which can speed up decoding processing can be realized.

According to the present invention, there is provided a decoding method of decoding encoded image information consisting of encoded information to be inputted. The decoding method includes: a first step of, when decoding processing is applied to the encoded image information, storing state quantity information representing a predetermined state quantity, which is used while being sequentially updated according to a processing state of the decoding processing; and a second step of applying predetermined decoding processing to the encoded image information. In the second step, only a necessary part of the state quantity information, which is stored in the first storing means, is read out from the first storing means, and the state quantity information is changed according to the processing state of the decoding processing with respect to the encoded image information, and then the state quantity information is written back to the first storing means. Consequently, accessibility to the state quantity information at the time when the image information is subjected to the decoding processing can be improved. In this way, a decoding method which can speed up decoding processing can be realized.

In addition, according to the present invention, there is provided an encoding device, which applies plural kinds of predetermined encoding processing in order to image information to be inputted. The encoding device includes plural encoding processing means which are provided in association with the respective kinds of encoding processing. The plural kinds of encoding processing with respect to the image information are performed in parallel with the preceding encoding processing by the respective corresponding encoding processing means with a predetermined first phase difference according to contents of the encoding processing. Consequently, the encoding processing with respect to the image information can be performed at remarkably higher speed compared with the case in which the respective kinds of encoding processing are performed independently in order. In this way, an encoding device which can speed up encoding processing can be realized.

Further, according to the present invention, there is provided an encoding method of applying plural kinds of predetermined encoding processing in order to image information to be inputted. The encoding method includes an encoding step of performing the plural kinds of encoding processing with respect to the image information in parallel with the respective preceding encoding processing with a predetermined first phase difference according to contents of the encoding processing. Consequently, the encoding processing with respect to the image information can be performed at remarkably higher speed compared with the case in which the respective kinds of encoding processing are performed independently in order. In this way, an encoding method which can speed up encoding processing can be realized.

Moreover, according to the present invention, there is provided an image information processing system including an encoding device for encoding image information and a decoding device for decoding the encoded image information. The encoding device includes: encoding means which applies predetermined encoding processing to image information; and first storing means which, when the encoding means applies encoding processing to image information, stores state quantity information representing a predetermined state quantity which is used while being sequentially updated according to a processing state of the encoding processing. The encoding means reads out only a necessary part of the state quantity information, which is stored in the first storing means, from the first storing means and changes the state quantity information according to the processing state of the encoding processing with respect to the image information, and then writes back the state quantity information to the first storing means. The decoding device includes: decoding means which applies predetermined decoding processing to encoded image information; and first storing means which, when the decoding means applies decoding processing to encoded image information, stores state quantity information representing a predetermined state quantity which is used while being sequentially updated according to a processing state of the decoding processing. The decoding means reads out only a necessary part of the state quantity information, which is stored in the first storing means, from the first storing means and changes the state quantity information according to the processing state of the decoding processing with respect to the encoded image information, and then writes back the state quantity information to the first storing means. Consequently, accessibility to the state quantity information at the time when the image information is subjected to the encoding processing or the decoding processing can be improved. In this way, an image information processing system which can speed up encoding processing and decoding processing can be realized.

Furthermore, according to the present invention, there is provided an image information processing method including an encoding step of encoding image information and a decoding step of decoding the encoded image information. The encoding step includes: a first step of, when predetermined encoding processing is applied to image information, storing state quantity information representing a predetermined state quantity, which is used while being sequentially updated according to a processing state of the encoding processing, in first storing means; and a second step of applying encoding processing to the image information. In the second step, only a necessary part of the state quantity information, which is stored in the first storing means, is read out from the first storing means, and the state quantity information is changed according to the processing state of the encoding processing with respect to the image information, and then the state quantity information is written back to the first storing means. The decoding step includes: a first step of, when decoding processing is applied to encoded image information, storing state quantity information representing a predetermined state quantity, which is used while being sequentially updated according to a processing state of the decoding processing; and a second step of applying predetermined decoding processing to the encoded image information. In the second step, only a necessary part of the state quantity information, which is stored in the first storing means, is read out from the first storing means, and the state quantity information is changed according to the processing state of the decoding processing with respect to the encoded image information, and then the state quantity information is written back to the first storing means. Consequently, accessibility to the state quantity information at the time when the image information is subjected to the encoding processing or the decoding processing can be improved. In this way, an image information processing method which can speed up encoding processing and decoding processing can be realized.

While there has been described in connection with the preferred embodiments of the invention, it will be obvious to those skilled in the art that various changed and modifications may be aimed, therefore, to cover in the appended claims all such changed and modifications as fall within the true spirit and scope of the invention.

What is claimed is:

1. An encoding device for encoding image information to be inputted, comprising:
   encoding means which applies predetermined encoding processing to the image information; and
   first storing means which, when said encoding means applies said encoding processing to the image information, stores state quantity information representing a predetermined state quantity which is used while being sequentially updated according to a processing state of said encoding processing, wherein
   said encoding means reads out only a necessary part of the state quantity information, which is stored in said first storing means, from said first storing means and changes the state quantity information according to the processing state of said encoding processing with respect to the image information, and then writes back the state quantity information to said first storing means.

2. The encoding device according to claim 1, further comprising:
   second means which stores the image information to be inputted;
   first temporary storing means which is provided in said encoding means and temporarily stores the state quantity information read out from said first storing means; and
   second temporary storing means which is provided in said encoding means and temporarily stores the image information read out from said second storing means, wherein
   said encoding means reads out a part of the image information from said second storing means and temporarily stores the part of the image information in said second temporary storing means, and in synchronization with this, reads out a part of the state quantity information, which is necessary when said encoding processing is applied to the image information, from said first storing means and temporarily stores the part of the state quantity information in said first temporary storing means, changes the state quantity information according to the processing state of said encoding processing with respect to the image information temporarily stored in said second temporary storing means, and then writes back the state quantity information to said first storing means.

3. The encoding device according to claim 2, wherein:

said first storing means stores plural kinds of the state quantity information which is necessary when said encoding means applies said encoding processing to the image information; and said encoding means reads out a part of the state quantity information, which is necessary when said encoding processing is applied to the image information temporarily stored in said second temporary storing means, from said first storing means for each of the necessary kinds, temporarily stores the part of the state quantity information in said first temporary storing means, changes the respective kinds of state quantity information according to the processing state of said encoding processing with respect to the image information temporarily stored in said second temporary storing means, and then writes back the state quantity information to said first storing means.

4. The encoding device according to claim 1, wherein said encoding means applies said encoding processing to the image information with predetermined plural pixels as a unit.

5. The encoding device according to claim 1, wherein:

said encoding means comprises plural encoding processing means which are provided in association with the plural kinds of encoding processing, which should be applied to the image information in order, respectively; and said plural kinds of encoding processing with respect to the image information is performed in parallel with preceding said encoding processing by said respective corresponding encoding processing means with a predetermined first phase difference according to contents of said encoding processing, respectively.

6. The encoding device according to claim 5, wherein said encoding processing means, which corresponding to said plural kinds of encoding processing, are provided for each a predetermined unit of said image information, respectively, and said encoding processing means for each predetermined unit of the image information performs said plural kinds of encoding processing in parallel, respectively, with predetermined second phase difference.

7. The encoding device according to claim 1, wherein:

said encoding means and said first storing means are integrally formed as an integrated circuit; and the encoding device comprises external storing means which is provided outside said encoding means and said first storing means which are formed as the integrated circuit, and stores the image information outputted from a signal processing unit, which is integrally formed as the integrated circuit together with the encoding means and the first storing means, in said external storing means, sequentially reads out only necessary image information from the external storing means, and subjects the image information to said encoding processing with said encoding means.

8. An encoding method of encoding image information to be inputted, comprising:

a first step of, when predetermined encoding processing is applied to image information, storing state quantity information representing a predetermined state quantity, which is used while being sequentially updated according to a processing state of said encoding processing, in first storing means; and a second step of applying said encoding processing to the image information, wherein, in the second step, only a necessary part of the state quantity information, which is stored in said first storing means, is read out from said first storing means, and the state quantity information is changed according to the processing state of said encoding processing with respect to the image information, and then the state quantity information is written back to said first storing means.

9. The encoding method according to claim 8, wherein:

in said first step, the image information to be inputted is stored in second storing means; and in said second step, a part of the image information is read out from said second storing means and temporarily stored in predetermined second temporary storing means, and in synchronization with this, a part of the state quantity information, which is necessary when said encoding processing is applied to the image information, is read out from said first storing means and temporarily stored in predetermined first temporary storing means, the state quantity information is changed according to the processing state of said encoding processing with respect to the image information temporarily stored in said second temporary storing means, and then the state quantity information is written back to said first storing means.

10. The encoding method according to claim 9, wherein:

in said first step, plural kinds of the state quantity information, which is necessary when said encoding means applies said encoding processing to the image information, is stored in said storing means; and in said second step, a part of the state quantity information, which is necessary when said encoding processing is applied to the image information temporarily stored in said second temporary storing means, is read out from said first storing means for each of the necessary kinds and temporarily stored in said first temporary storing means, the respective kinds of state quantity information are changed according to the processing state of said encoding processing with respect to the image information temporarily stored in said second temporary storing means, and then the state quantity information is written back to said first storing means.

11. The encoding method according to claim 8, wherein, in said second step, said encoding processing is applied to the image information with predetermined plural pixels as a unit.

12. The encoding method according to claim 8, wherein, in said second step, plural kinds of said encoding processing, which should be applied to the image information in order, is performed in parallel with preceding said encoding processing with a predetermined first phase difference according to contents of said encoding processing, respectively.

13. The encoding method according to claim 12, wherein, in said second step, respective kinds of said encoding processing are performed in parallel for each predetermined unit of the image information with a predetermined second phase difference.

14. A decoding device for decoding encoded image information consisting of encoded image information to be inputted, comprising:

decoding means which applies predetermined decoding processing to the encoded image information; and first storing means which, when the decoding means applies said decoding processing to the encoded image information, stores state quantity information representing a predetermined state quantity which is used while being sequentially updated according to a processing state of said decoding processing, wherein said decoding means reads out only a necessary part of the state quantity information, which is stored in said first storing means, from said first storing means and changes the state quantity information according to the processing state of said decoding processing with respect to the encoded image information, and then writes back the state quantity information to said first storing means.

15. The decoding device according to claim 14, further comprising second storing means which stores decoded said image information, wherein:

said decoding means comprises: first temporary storing means which temporarily stores the state quantity information read out from said first storing means; and second temporary storing means which temporarily stores the decoded image information, wherein said decoding means reads out a part of the state quantity information, which is necessary when said decoding processing is applied to the encoded image information, from said first storing means and temporarily stores the part of the state quantity information in said first temporary storing means, changes the state quantity information according to the processing state of said decoding processing with respect to the encoded image information, and then writes back the state quantity information to said first storing means, and also writes the image information, which is stored in said second temporary storing means, decoded by said decoding processing in said second storing means in synchronization with the writing back of the state quantity information to said first storing means.

16. The decoding device according to claim 15, wherein said first storing means stores plural kinds of said stage quantity information which is necessary when said decoding means applies said decoding processing to said encoded image information; and said decoding means reads out a part of the state quantity information, which is necessary when said decoding processing is applied to the encoded image information of the decoding object, from said first storing means for each of the necessary kinds, temporarily stores the part of the state quantity information in said first temporary storing means, changes the respective kinds of state quantity information according to the processing state of said decoding processing with respect to the encoded image information, and then writes back the state quantity information to said first storing means.

17. The decoding device according to claim 14, wherein said decoding means applies said decoding processing to the encoded image information with predetermined plural pixels as a unit.

18. A decoding method of decoding encoded image information consisting of encoded information to be inputted, comprising:

a first step of, when decoding processing is applied to the encoded image information, storing state quantity information representing a predetermined state quantity, which is used while being sequentially updated according to a processing state of said decoding processing; and a second step of applying predetermined decoding processing to the encoded image information, wherein, in said second step, only a necessary part of the state quantity information, which is stored in said first storing means, is read out from said first storing means, and the state quantity information is changed according to the processing state of said decoding processing with respect to the encoded image information, and then the state quantity information is written back to said first storing means.

19. The decoding method according to claim 18, wherein, in said second step, a part of the state quantity information, which is necessary when said decoding processing is applied to the encoded image information, is read out from said first storing means and temporarily stored in said first temporary storing means, the state quantity information is changed according to the processing state of said decoding processing with respect to the encoded image information, and then the state quantity information is written back to said first storing means, and the image information, which is stored in said second temporary storing means, decoded by said decoding processing is also written in said second storing means in synchronization with the writing back of the state quantity information to said first storing means.

20. The decoding method according to claim 19, wherein:

in said first step, plural kinds of the state quantity information, which is necessary when said decoding processing is applied to the encoded image information, is stored in said first storing means; and in said second step, a part of the state quantity information, which is necessary when said decoding processing is applied to the encoded image information of the decoding object, is read out from said first storing means for each of the necessary kinds and temporarily stored in said first temporary storing means, the respective kinds of state quantity information are changed according to the processing state of said decoding processing with respect to the encoded image information, and then the state quantity information is written back to said first storing means.

21. The decoding method according to claim 18, wherein, in said second step, said decoding processing is applied to the encoded image information with predetermined plural pixels as a unit.

22. An image information processing system comprising an encoding device for encoding image information and a decoding device for decoding the encoded image information, wherein:

said encoding device comprises:

encoding means which applies predetermined encoding processing to the image information; and first storing means which, when said encoding means applies said encoding processing to the image information, stores state quantity information representing a predetermined state quantity which is used while being sequentially updated according to a processing state of said encoding processing, wherein said encoding means reads out only a necessary part of the state quantity information, which is stored in said first storing means, from said first storing means and changes the state quantity information according to the processing state of said encoding processing with respect to the image information, and then writes back the state quantity information to said first storing means, and said decoding device comprises:

decoding means which applies predetermined decoding processing to the encoded image information; and first storing means which, when said decoding means applies said decoding processing to the encoded image information, stores state quantity information representing a predetermined state quantity which is used while being sequentially updated according to a processing state of said decoding processing, wherein said decoding means reads out only a necessary part of the state quantity information, which is stored in said first storing means, from said first storing means and changes the state quantity information according to the processing state of said decoding processing with respect to the encoded image information, and then writes back the state quantity information to said first storing means.

23. An image information processing method comprising an encoding step of encoding image information and a decoding step of decoding the encoded image information, wherein:

said encoding step includes:

a first step of, when predetermined encoding processing is applied to the image information, storing state quantity information representing a predetermined state quantity, which is used while being sequentially updated according to a processing state of said encoding processing, in first storing means; and a second step of applying said encoding processing to the image information, wherein, in said second step, only a necessary part of the state quantity information, which is stored in said first storing means, is read out from said first storing means, and the state quantity information is changed according to the processing state of said encoding processing with respect to the image information, and then the state quantity information is written back to said first storing means, and said decoding step comprises:

a first step of, when said decoding processing is applied to the encoded image information, storing state quantity information representing a predetermined state quantity, which is used while being sequentially updated according to a processing state of said decoding processing; and a second step of applying predetermined decoding processing to said encoded image information, wherein, in said second step, only a necessary part of the state quantity information, which is stored in said first storing means, is read out from said first storing means, and the state quantity information is changed according to the processing state of said decoding processing with respect to the encoded image information, and then the state quantity information is written back to said first storing means.

* * * * *